United States Patent [19]
Dickerman et al.

[11] Patent Number: 5,987,118
[45] Date of Patent: Nov. 16, 1999

[54] METHOD AND COMPUTER PROGRAM LOGIC FOR PROVIDING AN INTELLIGENT NETWORK OPERATOR CONSOLE WITH ENHANCED SERVICES

[75] Inventors: Robert Frank Dickerman; Shawn Paul Furgason, both of Cedar Rapids, Iowa; Patty Marie Bartels, Belmont, Wis.

[73] Assignee: MCI Communiations Corporation, Washington, D.C.

[21] Appl. No.: 08/956,221

[22] Filed: Oct. 21, 1997

[51] Int. Cl.[6] ..................................................... H04M 3/42
[52] U.S. Cl. .................. 379/265; 379/91.01; 379/93.03; 379/207; 379/212; 379/220; 379/230; 379/267
[58] Field of Search ................................. 379/91.01, 207, 379/210, 219, 220, 221, 229, 230, 260, 265, 223, 267, 93.03, 211, 212

[56] References Cited

U.S. PATENT DOCUMENTS

| | | |
|---|---|---|
| 4,232,199 | 11/1980 | Boatwright et al. . |
| 4,577,061 | 3/1986 | Katzeff et al. . |
| 4,611,096 | 9/1986 | Asmuth et al. . |
| 4,625,081 | 11/1986 | Lotito et al. . |
| 4,685,127 | 8/1987 | Miller et al. . |
| 4,706,275 | 11/1987 | Kamil et al. . |
| 4,782,519 | 11/1988 | Patel et al. . |
| 4,791,640 | 12/1988 | Sand et al. . |
| 4,893,330 | 1/1990 | Franco . |
| 5,068,891 | 11/1991 | Marshall . |
| 5,210,789 | 5/1993 | Jeffus et al. ........................ 379/91.01 |
| 5,222,120 | 6/1993 | McLeod et al. . |
| 5,452,350 | 9/1995 | Reynolds et al. . |
| 5,463,677 | 10/1995 | Bash et al. ........................... 379/91.01 |
| 5,590,181 | 12/1996 | Hogan et al. . |

(List continued on next page.)

FOREIGN PATENT DOCUMENTS

WO/91/16779  10/1991  WIPO .

OTHER PUBLICATIONS

"Gazing into the SPC network future reveals vista of new features," Gordon and Hodges, Telephony Magazine, Mar. 21, 1983.
"Signaling System 7 Rescues antiquated billing system," Jonelit, Telephony Magazine, undated.
"Smart Credit Cards: the answer to cashless shopping," Weinstein, IEEE Spectrum, Feb. 1984.
"Excel Switching", electronic brochure, www.xl.com/prod.htm, undated.
"VCO Open Programmable Switches," electronic brochure, www.summa4.com/products/wpswitch.htm, undated.
"The Centrex Call Center Advantage," electronic brochure, www.nortel.com/pen/solutions/acd.html, undated.

(List continued on next page.)

Primary Examiner—Scott Wolinsky

[57] ABSTRACT

A method and apparatus for providing operator consoles with enhanced customer support for automated telecommunication services on an intelligent overlay network (104) is disclosed. Operator and customer services are provided by an intelligent network (102). The intelligent network (102) comprises: an automated call distributor (116); an application processor (118); an advanced intelligent network gateway (AIN Gateway) (120); a validation gateway (122); and enhanced operator consoles (126). The AIN Gateway provides the intelligent network with an interface to the intelligent overlay network. This allows components within the intelligent network to communicate with components in the intelligent overlay network, and vice-versa. The validation gateway provides the intelligent network with an interface to credit card validation systems (114), and is used to apply charges to customer credit cards. Enhanced operator consoles provide for efficient and seamless integration of operator and customer services to automated services running on the intelligent overlay network. Such enhanced operator consoles are provided in the form of customized application programs that are executed by the operator consoles based on the context of calls that are transferred from the intelligent overlay network.

24 Claims, 43 Drawing Sheets

U.S. PATENT DOCUMENTS

| | | | |
|---|---|---|---|
| 5,629,974 | 5/1997 | Rajala et al. | 455/466 |
| 5,675,607 | 10/1997 | Alesio et al. | 379/91.01 |
| 5,680,448 | 10/1997 | Becker | 379/265 |
| 5,684,870 | 11/1997 | Maloney et al. | 379/265 |
| 5,696,809 | 12/1997 | Voit | 379/265 |
| 5,812,639 | 9/1998 | Bartholomew et al. | 379/207 |
| 5,825,857 | 10/1998 | Reto et al. | 379/91.01 |

OTHER PUBLICATIONS

"Centrex Call Center Tailoring for your Business", electronic brochure, www.nortel.com/pen/solutions/tailoring-.html, undated.

"Centrex CTI", electronic brochure, www.nortel.com/pen/solutions/cti.html, undated.

"Centrex Call Center Reporting Options," electronic brochure, www.nortel.com/pen/solutions/reporting.html, undated.

"Quick Product Index," electronic brochure, www.nortel.com/home/quick/#A, undated.

METHOD AND COMPUTER PROGRAM LOGIC FOR PROVIDING AN INTELLIGENT NETWORK OPERATOR CONSOLE WITH ENHANCED SERVICES

CROSS-REFERENCE TO OTHER APPLICATIONS

The following applications of common assignee contain some common disclosure as the present application:

U.S. patent application entitled "System and Method for Inter-Process Communication", appl. Ser. No. 08/671,027, filed Jun. 25, 1996.

U.S. patent application entitled "A Communication Gateway", appl. Ser. No. 08/672,139, filed Jun. 27, 1996, which issued Aug. 11, 1998 as U.S. Pat. No. 5,793,771.

U.S. patent application Ser. No. 08/967,339, filed Oct. 21, 1997, entitled "Advanced Intelligent Network Gateway", filed concurrently herewith, Attorney Docket No. CDR-96-009 (1575.2240000).

U.S. patent application Ser. No. 08/956,220 filed Oct. 21, 1997, entitled "Validation Gateway", filed concurrently herewith, Attorney Docket No. CDR-96-011 (1575.2250000).

U.S. patent application Ser. No. 08/956,232 filed Oct. 21, 1997, entitled "System and Method for Providing Operator and Customer Services for Intelligent Overlay Networks", filed concurrently herewith, Attorney Docket No. CDR-96-008 (1575.2230000).

The above-listed applications are incorporated herein by reference in their entireties.

BACKGROUND OF THE INVENTION

1. Field of the Invention

The present invention relates generally to telecommunication systems, and more particularly to a system and method for providing customer and operator services to automated telecommunication platforms.

2. Related Art

In today's environment of increased competition and technological advancements in the telecommunications industry, service providers are constantly offering new products and services (hereinafter "services") to their customers. In order to support the new services, a wide variety of new and revised network components are continuously being deployed into the telecommunications network. Many of these new services are provided by automated systems that require little or no human intervention. Typically, customers interact with such systems by responding to digitized voice prompts provided by audio response units (ARUs) and the like. Customers typically enter data and select options by using their telephone keypads which generate Dual Tone Multi-Frequency (DTMF) signals. Alternatively, some automated systems are equipped with voice recognition devices that allow customers to enter data and select options by speaking into their telephone handsets.

An example of a service that is typically provided by an automated platform is a telephone debit card service. Such services allow customers to make long distance telephone calls using prepaid cards (also referred to as "debit cards"). The debit cards are generally purchased by customers in predetermined dollar amounts. Once purchased, customers dial the telephone number printed on the card to access a particular automated debit card service platform. This telephone number is referred to herein as the "access number". Customers are then prompted to enter their account and personal identification numbers (PINs). Such numbers are typically printed on the debit card product. After such numbers are verified by the system, long distance telephone calls are charged against a debit card account associated with the debit card. The debit card accounts are setup and maintained by the service provider and are accessible by debit card service platform associated with the telephone number printed on the card.

Telecommunication platforms referred to herein as "intelligent overlay networks" comprise computer and telecommunication elements used to implement a variety of automated telecommunication services. For example, an Intelligent overlay network used to implement a debit card service typically comprises: (1) a database containing debit card account information, (2) a computer controller, (3) an ARU, and (4) a conventional telecommunication switch. As stated, intelligent overlay networks are typically designed to run automatically without human operator intervention.

However, it is often desired to provide callers with an option to connect with human operators and/or customer service personnel. For example, callers equipped with rotary telephones often require operator assistance because they cannot interact with automated platforms that respond only to DTMF signals. Furthermore, customers needing additional operating instructions or instructions spoken in different languages, often need to be connected with customer service representatives. In addition, because service providers often lock customer PINs when fraud is suspected, customers often need to connect with customer service representatives to have their PINs unlocked. These are just a few of many examples that demonstrate why it is desirable to allow customers to connect with live operators from such automated service platforms.

However, as previously stated, many services that are implemented using intelligent overlay networks are designed to operate without operator services. Further, it has proven difficult to provide conventional operator services to intelligent overlay networks because of the unique resources located within such intelligent overlay networks. Such unique resources are generally not accessible from conventional operator service platforms.

Generally, conventional operator and customer services are provided by network platforms referred to herein as "intelligent netwvorks". Typically, when operator services are desired, calls are transferred to such intelligent networks. Once a call is transferred, operators can be used to assist callers and to complete calls. However, because operator consoles within intelligent networks do not have access to unique resources within intelligent overlay networks, operators cannot adequately assist such callers.

For example, conventional intelligent networks do not have access to debit account databases located within intelligent overlay networks. Thus, even if a call is transferred from an intelligent overlay network to an intelligent network, the operator cannot complete the call because of the inaccessibility of the customer debit account balance.

Therefore, what is needed is a system and method for providing live operator and customer services for automated services implemented using intelligent overlay network platforms.

SUMMARY OF THE INVENTION

Accordingly, the present invention is directed toward a method for providing operator consoles with enhanced customer support for automated telecommunication services on intelligent overlay networks. An example of such an automated service is a debit card service, as previously described. The present invention works in combination with conventional intelligent networks that provide operator services. Conventional intelligent networks typically comprise one or more automated call distributors (ACDs), one or more application processors (APs) and a pluality of manual operator consoles (OCs).

Additional components are added to conventional intelligent networks accordance with the present invention. Specifically, the present invention adds the following components to a conventional intelligent network: an advanced intelligent network gateway (AIN Gateway); a validation gateway; and enhanced operator consoles.

An AIN Gateway is added to provide the intelligent network with an interface to the intelligent overlay network. This allows components within the intelligent network to access unique resources located within the intelligent overlay network. For example, an operator at an operator console within the intelligent network can access records within a customer debit account database within the intelligent overlay network, as previously described. This allows the operator to assist customers with debit card telephone calls.

A validation gateway is added to provide the intelligent network with an interface to a credit card validation system. This is used to apply charges to customer credit cards. Such charges can be applied in real time. Thus, additional services can be offered to customers. One example of an additional service that can be offered to customers using this feature of the present invention is a service to recharge a debit card account. As described below, this feature can be implemented from the automated service on the intelligent overlay network, or from an operator console within the intelligent network, after a call has been transferred thereto.

The enhanced operator consoles of the present invention are added to the intelligent network to provide for efficient and seamless integration of operator and customer services to automated services running on the intelligent overlay network. Enhanced operator consoles are provided in the form of customized application programs. Such programs are executed on the operator consoles within the intelligent network, after calls have been transferred from the intelligent overlay network. The customized application programs are contextually based on each telephone call that is transferred to the operator console. Thus, for example, if a caller has already entered an account number, PIN, and/or calling telephone number during the automated portion of the call, the operator at the enhanced operator console will have the information needed to complete the call, without having to ask the customer to repeat such information.

As stated, the present invention provides a means for selectively transferring calls from automated services on intelligent overlay networks to customer and operator services on intelligent networks. Typically, customers select this option by pressing a key on their telephone keypads in response to a vocal prompt from the automated system. Additionally, in a preferred embodiment, callers with rotary telephones are automatically transferred to live operators upon the expiration of a predetermined timeout period.

Once a call is transferred, the operator console automatically executes a customized application program that allows the operator to perform appropriate steps that depend on the context of each call. Additional information relating to each call is provided to the operator console via the AIN gateway. Further, the AIN gateway provides the operator console with a means for accessing unique resources within the intelligent overlay network. An example of such a unique resource is a customer debit account database associated with debit card calls. Thus, the AIN gateway enables the operator within the intelligent network to appropriately debit a customer's account after completing a debit card call.

Accordingly, the present invention provides a means to augment automated services on intelligent overlay networks with efficient and valuable operator and customer services. The operators and customer service representative are provided with enough information and resources to efficiently assist customers with all aspects of the call. That is, in addition to the additional support typically provided by live operators, all of the functions capable of being performed by the automated service on the intelligent overlay network can also be performed by the live operators and customer service representatives on the intelligent network.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Table of contents for the Detailed Description
1.0 Example Embodiment
    1.1 Network Architecture
        1.11 Switch Network and Intelligent Overlay Network
        1.12 Intelligent Network
        1.13 Operator Consoles
        1.14 Application Processor
        1.15 Local Area Network
        1.16 AIN Gateway
        1.17 Validation Gateway
    1.2 Scaleability of the Network Architecture
    1.3 Overview of debit card service processing
    1.4 Process Flowcharts
        1.41 Transfer to customer or operator services
        1.42 Direct dial customer service
        1.43 Set-up for re-charging a debit card account
        1.44 Originating an outbound call from operator console after destination number has been collected
        1.45 Originating an outbound call from operator console before destination number has been collected
        1.46 Releasing a call from operator console to SSCP
        1.47 Recharging a debit card account
    1.5 Details of AIN Gateway, Validation Gateway and Operator Console
        1.51 Internal Architecture of AIN Gateway
        1.52 Architecture of Validation Gateway
            1.521 Example of a validate process for the Validation
        1.53 Operator Console
            1.531 Processes for Operator Console
            1.532 Detailed Processes for Operator Console

1.0 Example Embodiment

The present invention is directed toward a system and method for providing operator consoles with enhanced operator and customer support for telecommunication services that are provided by automated services on intelligent overlay networks. The present invention works in combination with conventional intelligent networks that provide operator services. An example of a telecommunication service that is provided by an intelligent overlay network is a debit card service.

The present invention is described in terms of an example embodiment. Specifically, the present invention is described in terms of a debit card service platform. The description in terms of a debit card service platform is provided for convenience only. It is not intended that the invention be limited to this example embodiment. In fact, after reading the following description, it will become apparent to persons skilled in the relevant art(s) how the implement the present invention in alternative embodiments.

1.1 Network Architecture

Figure 1:
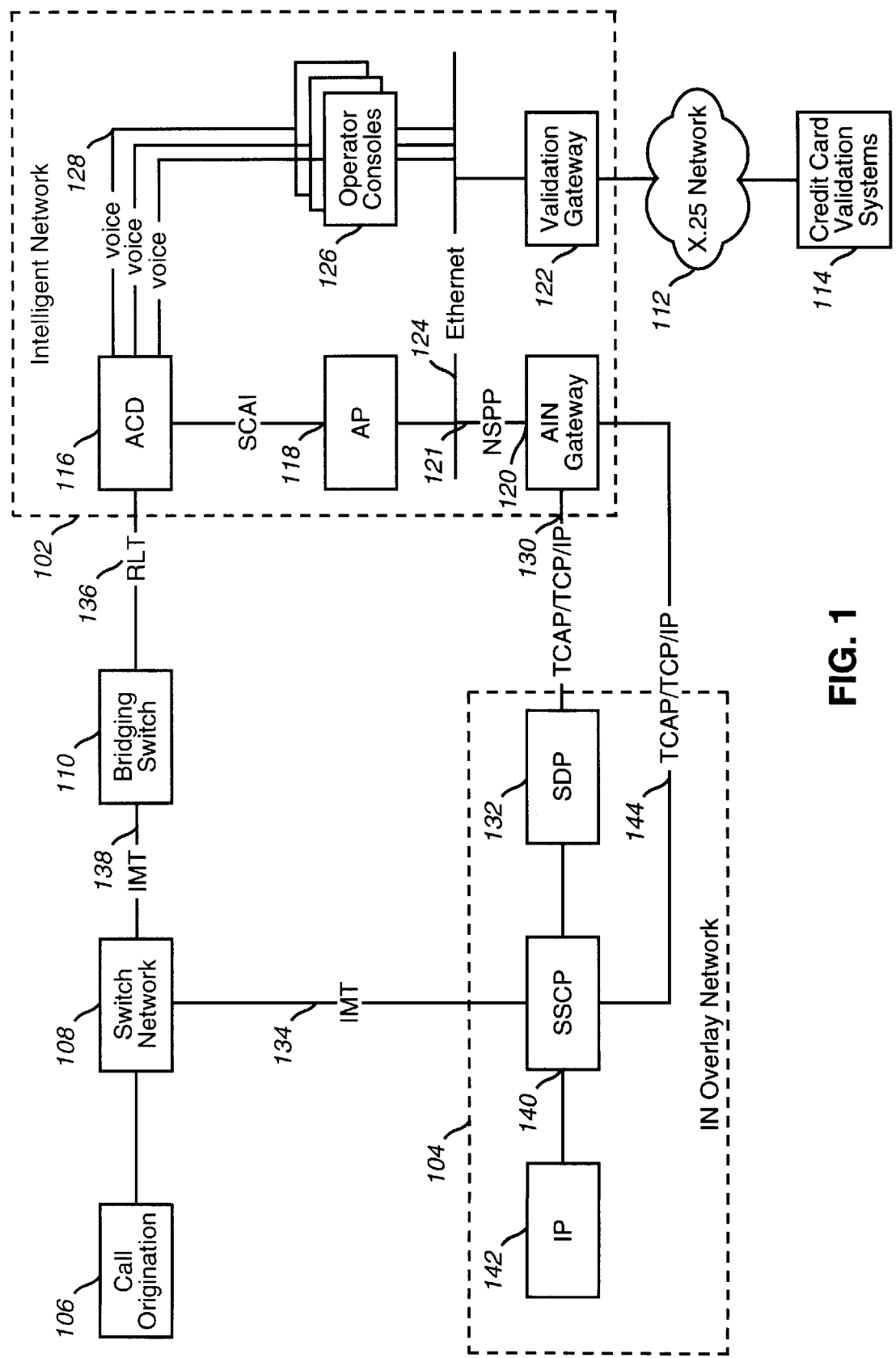
FIG. 1 is a block diagram depicting an example of a network architecture that can be used to implement a preferred embodiment of the present invention.

FIG. 1 is a block diagram depicting an example of a network architecture that can be used to implement a preferred embodiment of the present invention. Specifically, FIG. 1 depicts a platform that provides operator and customer services residing in an intelligent network 102, to an automated debit card service residing on an intelligent overlay network 104. Also depicted in FIG. 1 is a switch network 108, which is coupled between a bridging switch 110 and a call origination point 106. The call origination point 106 can be a common telephone station (not shown), such as a residential telephone that is coupled with the switch network 108. In addition, an X.25 network 112 is coupled between a credit card validation system 114 and the intelligent network 102.

1.11 Switch Network and Intelligent Overlay Network

In general, the switch network 108 is used to route telephone calls from the call origination point 106 to various destinations in a well known manner. In this example, the intelligent overlay network 104 provides the functionality needed to support an automated debit card service. In general, intelligent overlay networks, such as the intelligent overlay network 104, is a specific implementation of well known telecommunication and computer components that provide enhanced call processing services for callers in an automated fashion. Specifically, the intelligent overlay network 104 comprises a switching component 140 that combines the functionality of two well known components of a typical Signaling System 7 (SS7) network, namely—a service switching point and a service control point. This switching component is referred to herein as a service switching and control point (SSCP) 140. In the preferred embodiment, the SSCP 140 is a switching and control point manufactured by Ericsson Corporation.

The SSCP 140 receives and processes telephone calls. It uses an intelligent peripheral (IP) 142 to provide call processing applications. The SSCP 140 also uses a service data point (SDP)132 for the storage and retrieval of data related to call processing functions. In this example, the SDP 132 comprises one or more databases that contain customer debit card account information. Such databases include access numbers, account numbers, PINs and account balances. The SDP 132 also contains a table of call transfer records which are used to temporarily store information relating to particular telephone calls that are transferred to the intelligent network 102 for operator and customer services.

1.12 Intelligent Network

The intelligent network 102 provides functionality for operator and customer services. An Automated Call Distributor (ACD) 116 is a digital matrix switch enhanced with software to provide call queuing and call distribution functions. The ACD 116 is coupled with the switch network 108 via the bridging switch 110.

The bridging switch 110 can be any digital matrix switch that is capable of supporting release link trunk (RLT) technology. An RLT 136 is a voice trunk that connects the ACD 116 with the bridging switch 110. RLT technology is used to transfer calls by sending a release message to a bridging switch, such as the bridging switch 110.

For example, a call is received from the switch network 108 by the ACD 116, over a first RLT 136 channel. The ACD 116 is used to originate a second call over a second RLT 136 channel. The second call is terminated in the switch network 108. When the second call connection is complete, a release message is sent from the intelligent network 102 to the bridging switch 110. This causes the bridging switch 110 to bridge the connections between the first and second calls. The ACD is then released from both calls, thereby freeing both RLT 136 channels from the connection. At this point, the RLT 136 channels can be reused for subsequent calls.

1.13 Operator Consoles

The intelligent network 102 comprises a plurality of manual operator consoles 126. The operator consoles 126 are typically comprised of general purpose workstations that are operated by human operators. Operator consoles 126 provide operator and customer services for callers. Typically, operator consoles are programmed with service-specific application programs. Accordingly, when an operator console 126 receives a call, it executes an application program. One function of the application program is to provide a human operator (not shown) with instructions or scripts. The human operator typically prompts callers for information according to such scripts and enters such information into the operator console 126.

A plurality of operator consoles 126, up to thousands, can be used as needed to handle various demands of telecommunication traffic. Such operator consoles 126 are typically organized according to particular operator skill sets, such as language, training and the like. Thus, particular operator console groups are used to provide particular services. The operator consoles 126 are capable of providing both operator services and customer services.

1.14 Application Processor

The Application Processor (AP) 118 is a computer adjunct to the ACD 116, and is used for ACD 116 call processing functions. The use of the AP 118 allows for an off-load of processing from the ACD 116, so that ACD 116 resources may be dedicated to switching functions. When the ACD 116 receives a call, it queries the AP 118 for distribution instructions. The AP 118 determines where to route the call. This is generally done by a group select function. The AP 118 selects a group of operator consoles 126 based on the application and/or the operator skill set as previously described. The AP 118 then returns an identification of the selected group of operator consoles 126 to the ACD 116 for call routing purposes.

1.15 Local Area Network

The AP 118 and operator consoles 126 are linked via one or more local area networks (LANs). An Ethernet LAN 124 is shown in FIG. 1 for illustrative purposes. In other embodiments, token ring LANs or multiple LANs that are linked via routers, etc., can be used instead of the Ethernet LAN 124. The AP 118 and operator consoles 126 pass messages back and forth via the Ethernet LAN 124. For example, after the AP 118 instructs the ACD 116 to route a call to a particular operator console 126, it sends a "call offered" message to the particular operator console 126, indicating that it is about to receive a call. The "call offered" message includes information about which application to run in the operator console 126. Similarly, the Ethernet LAN 124 is used to send a "release" message from an operator console 126 to the AP 118 so that the ACD 116 will release a call to the bridging switch 110.

1.16 AIN Gateway

The advanced intelligent network gateway (AIN Gateway) 120 provides the interface between the intelligent network 102 and the intelligent overlay network 104. As described in detail below with reference to FIGS. 2–7, messages are passed between the operator consoles 126 and the SDP 132 during the processing of operator services related to the processing of a debit card call originating from the intelligent overlay network 104. The AIN Gateway 120 provides protocol conversion, message addressing and distribution. In addition, the AIN Gateway 120 manages the communications between the operator consoles 126 and the various SDPs in use, such as the SDP 132.

Accordingly, the AIN gateway 120 provides a single interface to multiple SDPs for thousands of operator consoles 126. The AIN gateway 120 provides the conversions needed for communications between the SDPs 132 and the operator consoles 126. This feature allows for optimal communication protocols and messaging formats to be used for both the operator consoles 126 and the SDPs 132. In a preferred embodiment, connection-less-oriented UDP/IP is used by components within the intelligent network 102 on the Ethernet LAN 124. Connection-oriented TCP/IP is used by components in the intelligent overlay network 104 and between the AIN Gateway 120 and the SDP 132.

The AIN Gateway 120 also exchanges TCAP messages over TCP/IP with the SSCP 104 as shown by the communication channel 144. This link 144 is used for automated recharges of debit card, as described below.

1.17 Validation Gateway

The validation gateway 122 provides an interface between the intelligent network 102 and one or more credit card validation systems 114. A credit card validation system 114 is a system provided by a credit validator, such as a bank or the like, for validating credit cards in a real time fashion.

As stated, a feature of the present invention is that it provides a means for recharging debit cards by authorizing charges to a caller's credit card. Preferably, the authorization of credit card charges and the settlement of charges with the debit card service provider are performed in real time. The validation gateway 122 receives a request for a credit card charge authorization from the operator consoles 126. In this fashion, operators can perform manual recharges of customer debit card accounts.

The validation gateway 122 converts UDP/IP request messages from the Ethernet LAN 124 to X.25 messages for the X.25 network 112. The validation gateway 122 then sends the request to the appropriate credit card validation system 114. When an X.25 response is received from the credit card validation system 114, the validation gateway 122 converts the response to a response code used by the operator console 126 and adds the response code to the original UDP/IP request message. It then sends this message back to the operator console 126 that originated the request. The response is a confirmation of the authorization and settlement of charges to the caller's credit card.

Similarly, the validation gateway 122 can receive credit requests from the SSCP 140 via the AIN Gateway 120. In this fashion, automated recharges can be performed by the debit card service on the intelligent overlay network 104.

In a preferred embodiment, novel processing is employed by the validation gateway 122 to ensure that duplicate charges are not applied to a credit card. For example, if a request message is sent to the credit card validation system 114, but a response is not received, the validation gateway 122 sends a message to the operator console confirming authorization. This may be preferable to re-sending the request to the credit card validation system 114, as such action can result in duplicate credit card charges.

1.2 Scaleability of the Network Architecture

One feature of the present invention is that the architecture is scalable. The single intelligent overlay network 104 and the single intelligent network 102 shown in FIG. 1 are for illustrative purposes only. A preferred embodiment of the present invention comprises a plurality of intelligent overlay networks 104 and a plurality of intelligent networks 102. For example, one embodiment includes many SSCPs 104, each interfacing with multiple intelligent networks 102, via AIN Gateways 120. Each intelligent overlay network 104 and each intelligent network 102 are connected to each other and to the switch network 108 as illustrated in FIG. 1.

For example, suppose a debit card service is implemented on an intelligent overlay network 104 comprising multiple SSCP 104 and SDP 132 pairs. In this case, customers are given access numbers that are associated with a SSCP 140. Note that each particular SDP 132 contains only data relating to specific debt card accounts. Thus, each designated access number is routed to a specific SSCP 140 that is coupled with the specific SDP 132 that contains the account data associated with the particular access number. In some embodiments, multiple, redundant SDPs 132 are used. In this case, calls to a specific access number are routed to one of multiple redundant SDPs 132 based on load balancing, round-robin, random, or other algorithms.

1.3 Overview of debit card service processing

As stated, the present invention is described in terms of an example embodiment of a debit card service platform. A brief description of the functionality of such an example embodiment will now be described with reference to FIG. 1.

First, a caller from the call origination point 106 dials the access number printed on a pre-purchased debit card. The call is routed by the switch network 108 to a particular SSCP 140, via the inter-machine trunk 134. When the call reaches the SSCP 140 audio response unit (ARU) functions are performed. That is, the SSCP 140 functions as an ARU by prompting the caller with audio prompts for entering data. The caller responds by selecting menu options and by entering data via DTMF or voice signals. Such information typically includes the caller's PIN and destination calling number. During the call, the caller can request operator assistance by entering a specific DTMF signal in response to a menu option. Alternatively, in a preferred embodiment callers are automatically transferred to a live operator after a specified timeout period has elapsed. In addition, the caller may also request customer service by entering a different DTMF signal. In either case, the SSCP 140 transfers the call to an operator console 126 on the intelligent network 102. In a preferred embodiment of the present invention, the same operator consoles can perform both operator and customer services.

It is sometimes desired that operator services be distinguished from customer services. Generally, operator services provide call routing functions while customer services do not. Accordingly, the present invention allows for this distinction by providing different operator console application programs for each type of service, while allowing for efficiency of resources by providing operator consoles 126 that can perform both applications.

Different applications are performed by the operator consoles 126 in accordance with whether the caller requests operator or customer services. The operator console 126 is aware of the type of request and selects the appropriate application accordingly. For example, this information can be passed to the operator console 126 via data records retrieved from the SDP 132 for the call. In other embodiments, the operator console can determine whether customer or operator service is requested based on the telephone number dialed by the SSCP 140 used to transfer the call to the intelligent network 102. These functions are described in greater detail below.

In addition, callers may also place a debit card call, and perform other functions, by calling a customer service number directly. Using this feature of the present invention, the call is still routed to an SSCP 140, but the SSCP does not process the call. Instead, the SSCP 140 immediately routes the call to an operator console 126 on the Intelligent Network 102. This routing is based on the dialed customer service number. Once connected to the operator, the caller may place an outbound call by providing the operator with the debit card access number, their PIN, and a destination calling number. The access number is used to identify the particular SDP 132 that contains the caller's account data. Then, the operator console 126 queries the SDP 132, via the AIN Gateway 120 to validate the account. The operator can then place the outbound call from the operator console 126, or release the call to the SSCP 140 for debit card processing. These processes are described below with reference to FIGS. 2–7.

1.4 Process Flowcharts

1.41 Transfer to customer or operator services

Figure 2A:
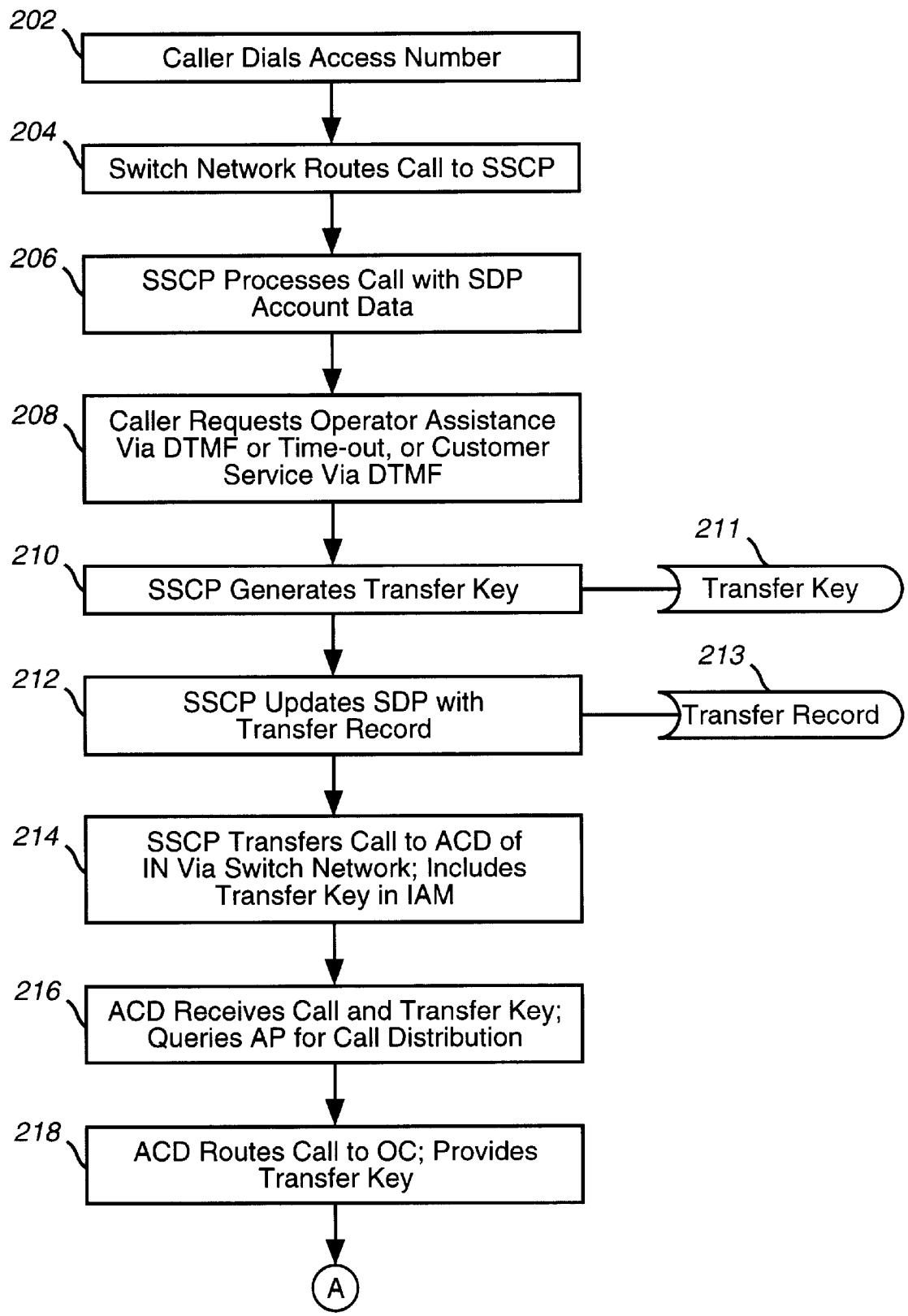
FIGS. 2a and 2b comprise a flowchart illustrating process steps that can occur when a caller dials a debit card access number to access an automated debit card service and then selects an option to be transferred to operator or customer services, according to a preferred embodiment of the present invention.
Figure 2B:
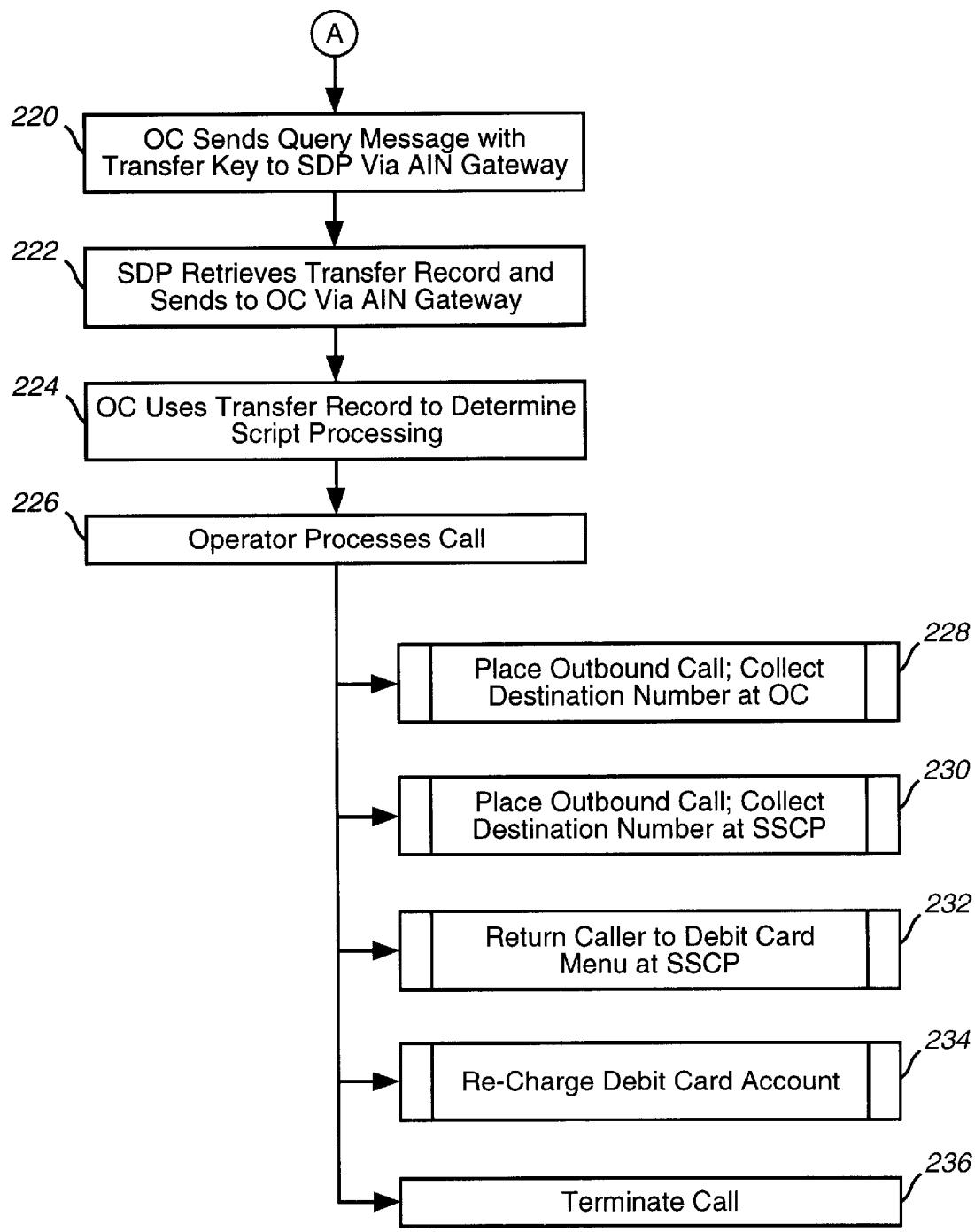

FIGS. 2a and 2b are a flowcharts illustrating a process that can be performed according to a preferred embodiment of the present invention. In particular, this process illustrates the steps performed when a caller dials a debit card access number to place a call and then requests operator or customer services.

The process begins with step 202. In step 202, a caller with a debit card dials a debit card access number. As stated, this number is generally printed on the debit card and is typically a toll-free telephone number.

In step 204, the switch network 108 routes the call to a particular SSCP 140, based on the dialed access number from step 202. As stated, the debit card account associated with the caller's debit card is maintained on the particular SDP 132 that is coupled with the SSCP 140 in which the call is routed. Many architectural configurations are possible regarding the number of SSCPs 140 and SDPs 132 within a particular platform. For example, one embodiment may comprise multiple SSCPs 140 that access a single SDP 132. Another embodiment may comprise a single SSCP 140 that accesses multiple SDPs 132. Alternatively, another embodiment may comprises a one-to-one relationship between SSCPs 140 and SDPs 132. Other configurations are possible depending on the specific needs of a particular implementation of the present invention. In any case, such architectural relationships would be apparent to those skilled in the relevant art(s).

In step 206, the SSCP 140 receives and processes the call. First, the SSCP 140 uses the dialed access number as a key when querying the SDP 132 for an application. The SDP 132 replies to the query with instructions for the SSCP 140 to play a particular menu for the caller. During nominal processing, the SSCP 140 prompts the caller for a PIN and a destination number. The PIN is validated against a specific debit account that is maintained in the SDP 132.

During the processing of a debit card call, the caller may request operator or customer services. Typically, such a request can be made by the caller any time after the SSCP 140 plays the associated menu option for such services to the caller, but prior to the point when the SSCP 140 places an outgoing debit call.

In step 208, the caller requests either operator or customer services. Operator and customer services are requested by entering a specific DTMF signal corresponding to the appropriate menu option provided by the SSCP 140. Alternatively, such services can be requested by customer voice responses to appropriate menu options. In a preferred embodiment, customers are automatically transferred to a live operator or customer service representative upon the expiration of a predetermined time-out period in which no customer responses are detected.

After the SSCP 140 detects a request for operator or customer services, control passes to step 210. In step 210, the SSCP 140 generates a transfer key 211. In a preferred embodiment, the transfer key 211 comprises 10-digit number that is used to uniquely identify the SDP 132 and to uniquely identify a transfer record (described below). Specifically, the transfer key 211 comprises a 5-digit identifier for the specific SDP 132 and a 5-digit number used to identify the transfer record.

In step 212, a transfer record 213 (identified by the transfer key 211 from step 210), is constructed by the SSCP 140 and stored in the SDP 132. The transfer record 213 is used to store specific information about the particular call that is about to be transferred to the intelligent network 102. As described below, once the call is transferred to the intelligent network 102, the operator console 126 uses the transfer key 211 to extract the information about the call from the transfer record 213 stored in the SDP 132 in step 212.

Note that in a preferred embodiment, the SSCP 140 uses the dialed access number to identify the particular SDP 132 containing the customer's debit account. Thus, if a caller requests operator or customer services prior to step 206 where the SDP 132 is queried, the SSCP 140 can still identify the particular SDP 132 in the transfer key 211 based on the dialed access number.

In a preferred embodiment, the SSCP 140 updates a temporary "Call Transfer Table" in the SDP 132 in order to create the transfer record 213 for the call. Typically, the transfer record 213 contains: (1) the transfer key 211 generated in step 210; (2) the status of the call, including data pertaining to why the call is being transferred, and additional information (if any), such as the PIN or the calling number; (3) the dialed access number; and (4) possibly other information as needed, such as the caller's ANI, etc.

As described below, the transfer record 213 created in step 212 is retrieved by the SDP 132 in response to a query from the operator console 126, using the transfer key 211 as a key to the record.

In step 214, the SSCP 140 transfers the call to the ACD 116 in the intelligent network 102. Typically, the SSCP 140 outpulses an operator service number or a customer service number, (depending on the caller's selection in step 208) to the switch network 108. The switch network 108 routes the call to the ACD 116. Generally, SS7 is used for signaling and the SSCP includes the transfer key 211 in the SS7 Initial Address Message (IAM). In addition, other data such as the ANI, access number, and a billing record sequence number can be included in the IAM. Once the call is transferred by the SSCP to the intelligent network 102, control passes to step 216.

In step 216, the ACD 116 receives the call, along with the IAM containing the transfer kev 211. Based on the number used to transfer the call (i.e. the operator service number or customer service number), the ACD 116 queries the AP 118 for call distribution instructions. The AP 118 determines the operator console 126 group in which to route the call based on the operator or customer service number. The AP 118 responds to the ACD 116 with this selection.

As previously noted, in a preferred embodiment of the present invention, the same operator consoles 126 can be used to provide both operator and customer services. The selection of services to be performed is governed by the particular application program that is executed on the operator console 126. A particular application program is selected to be executed based on the telephone number provided to the ACD 116. Specifically, the AP 118 inserts the telephone number into a "call offered" message to the operator console 126. The operator console 126 determines which application to perform based on the telephone number received in the "call offered" message. Control then passes to step 218.

In step 218, the ACD 116 routes the call to an available operator console 126 within the group selected by the AP 118 in step 216. Typically, the transfer key 211 is also provided to the operator console 126 in the "call offered" message sent by the AP 118. Alternatively, the transfer key 211 can be provided to the operator console 126 by outpulsing the 10-digit number from the ACD 116. Control then passes to step 220, shown in FIG. 2B.

In step 220, the operator console 126 receives the call and sends a query message to the SDP 132 via the AIN Gateway 120 in the following manner. First, a formatted message is sent from the operator console 126 to the AIN gateway 120. The formatted message includes the transfer key 211 and a request for the transfer record 213. The AIN Gateway next resolves the network address of the particular SDP that processed the call by using the 5-digits of the transfer key to look up the network address for the SDP 132 from an internal look-up table. Once the network address for the SDP 132 is determined, the query message in step 220 is sent by the AIN gateway 120 to the SDP 132. The query message includes the transfer key 211 and is typically sent via a TCAP message using TCP/IP, as denoted by 130. Control passes to step 222.

In step 222, the SDP 132 receives the operator console's 126 query message from step 220 and retrieves the transfer record 213 from an internal Call Transfer Table. As stated, the transfer key is used to identify the particular transfer record associated with the particular call. The SDP 132 sends information from the transfer record 213 to the operator console 126 via a response message. This response message includes call status information, such as why the call was transferred and additional information pertaining to data that has already been collected during the automated portion of the call. Such information includes for example, the customer PIN and a calling telephone number. The response message is sent from the SDP 132 to the operator console 126, via the AIN gateway 120. The AIN gateway 120 converts the response message back into the format and communication protocol used by the operator console 126 over the LAN 124. The AIN Gateway then routes the response message to the particular operator console 126 that originated the corresponding query message.

In step 224, the operator console 126 receives the response message from step 222. The transfer record 213 is used to select a particular application program to be executed on the operator console 126 and which script (and the entry point therein), is to be performed by the operator]. For example, if the transfer record 213 indicates that a PIN has not been collected, the operator console 126 will perform a script that instructs the operator to collect a PIN from the caller. Similarly, if the transfer record 213 indicates that a PIN has been collected (and validated), the operator console 126 will perform a script that instructs the operator to collect a destination calling number from the caller.

Next, in step 226, the operator and the operator console 126 processes the call. The call processing is in accordance with the determination of script processing from step 224. In addition, in some embodiments, the call processing can differ depending on whether the caller originally requested operator or customer services. This factor is typically determined by the telephone number used to transfer the call to the operator console 126.

For example, if a call is transferred to an operator console 126 and the transfer record indicates a pre-PIN call (i.e. the caller has not entered a PIN), then the operator prompts the caller to collect a PIN. In this case, the operator sends a query message to the SDP 132 in order to validate the PIN against the PIN recorded in the SDP 132 debit account. The SDP 132 responds with a message indicating whether or not the PIN is valid. If so, the operator may collect a destination number from the caller and place the outbound call.

Other processing functions include SDP 132 account updates, such as PIN changes or PIN unlocks, as previously described. This typically involves the operator console 126 sending a message to the SDP to make the updates. Such updates are typically followed by the SDP 132 responding to the operator console 126 with a confirmation message. All communications between the operator console 126 and the SDP 120 is accomplished through the use of the AIN gateway 120.

Note that the processing step 226 may also include an operator console 126 transferring a call to another operator console 126. For example, if an operator receives a call that can be better handled by an operator console comprising a different skill set, such calls can be transferred to the appropriate operator console 126. An example of a specific skill set is a particular foreign language.

Examples of specific operator services that can be performed include obtaining and validating PIN numbers within the SDP 132, releasing the call back to the SSCP 140, transferring the call to another operator console 126, conferencing other operator console(s) 126 into the call, open trouble tickets for reporting errors and unlocking customer PINS. These are just a few examples of the many functions that can be provided by operator services.

Examples of specific customer services that can be performed include account balance inquiries, providing enhanced instructions, quoting rates for services and other general information, releasing the call back to the SSCP 140 for additional menu options, transferring the call to another operator console 126 conferencing other operator console(s) 126 into the call, opening trouble tickets, and recharging debit card accounts. These are just a few examples of the many functions that can be provided by customer services.

Although the operator consoles 126 are capable of providing both customer service and operator service applications, it may be desirable for a service provider to utilize different personnel for each. Therefore, it may be necessary for an operator console 126 that is performing customer services to transfer a call to an operator console 126 that is performing operator services. For example, operator service applications are used for call completions. If a caller is transferred from the SSCP 140 to an operator console 126 for customer services, and then requests that an outbound call be placed, the customer service operator console 126 would transfer the call to an operator service operator console 126.

Steps 228–236 illustrate specific examples of call processing functions that can occur in step 226. For each of the examples provided, a detailed description of process steps that can be used to implement the specific example process is subsequently presented below.

Accordingly, in step 228, the operator places an outbound call to a destination number provided by the caller. In this example, the caller provides the destination calling number to the operator, and the operator enters the number into the operator console 126. A process that can be used to implement this functions is presented below with reference to FIG. 5.

In step 230, the operator releases the call to the SSCP 140 for outbound call processing. A process that can be used to implement this function is presented below with reference to FIG. 6.

In step 232, the operator releases the caller to the SSCP 140 so the SSCP 140 re-plays the debit card main menu options. A process that can be used to implement this function is presented below with reference to FIG. 11.

In step 234, the operator recharges the caller's debit card account by collecting the caller's credit card and charging against it. A process that can be used to implement this function is presented below with reference to FIG. 7.

In step 236, the operator terminates the call. This occurs for example, when a caller has no further requests and does not wish to return to the debit card main menu at the SSCP 140.

1.42 Direct dial customer service

Figure 3:
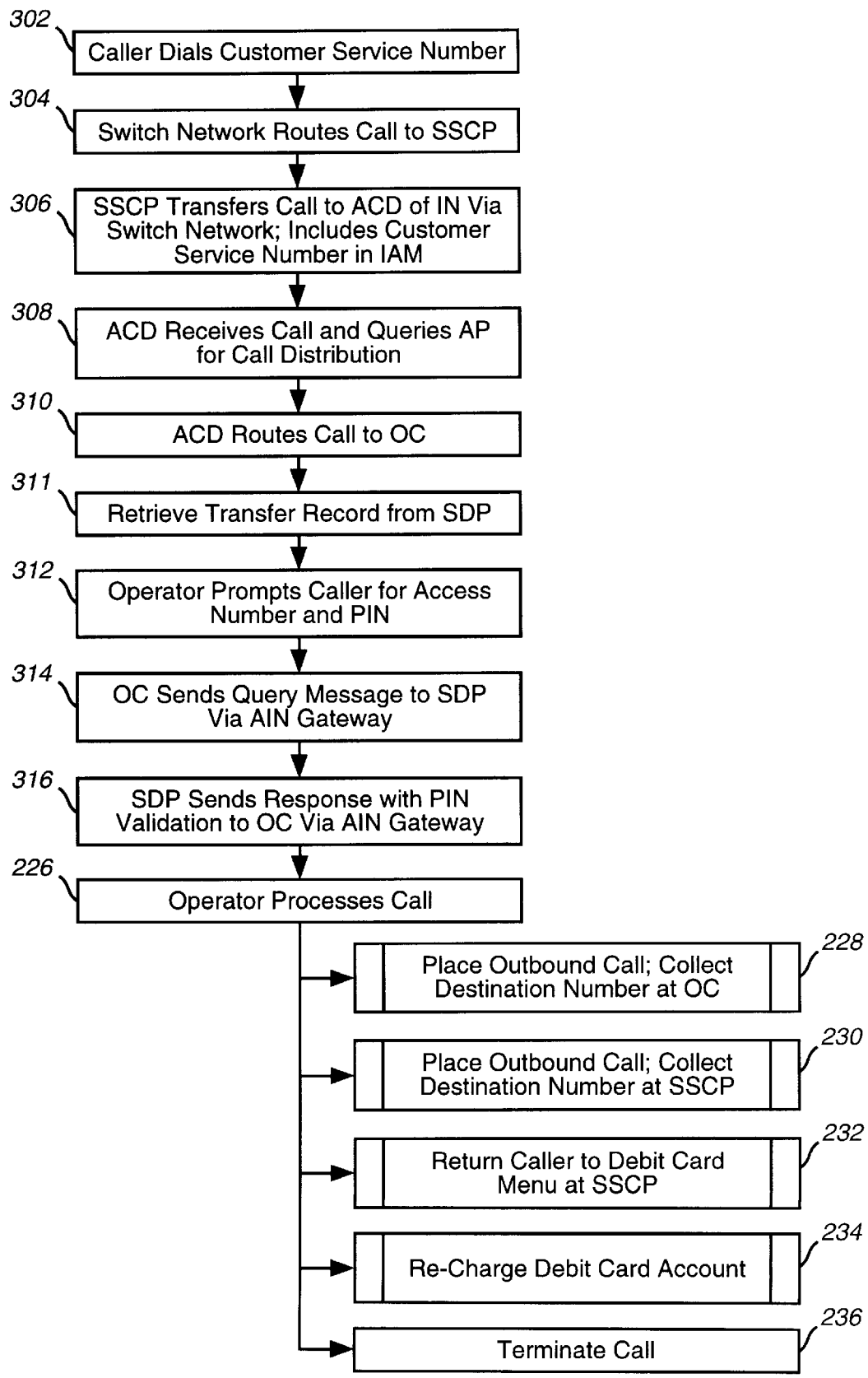
FIG. 3 is a flowchart illustrating a process that can be used in a preferred embodiment of the present invention when a caller directly dials a customer service number.

FIG. 3 is a flowchart illustrating a process that can be used in a preferred embodiment of the present invention when a caller dials a customer service number.

The process begins with step 302 where a caller dials a customer service number for debit card customer services. The telephone number is typically a toll-free number that is be printed directly on the debit card.

In step 304, the switch network 108 routes the call based on the dialed customer service number to a specific SSCP 140. In this case, the call will not be processed by the SSCP 140, because a customer service number was dialed in step 302. However, the call is still routed through the SSCP 140 so that the operator console 126 can optionally release the call back to the SSCP 140, in order to complete the outbound call. In a preferred embodiment of the present invention, all outbound calls for debit cards are placed from the SSCP 140. As will be shown with reference to FIG. 5 below, the SSCP 140 places the outbound call even when the call originates from the operator console 126.

In step 306, the SSCP 140 routes the call to the ACD 116 based on the dialed customer service number. As previously stated, the customer service number is included in the SS7 IAM to the ACD 116. Control passes to step 308.

In step 308, the ACD 116 receives the call and queries the AP 118 for call distribution instructions using the customer service number from the IAM. The AP 118 responds with an identifier for a group of operator consoles 126, for call routing purposes. In addition, the AP 118 sends a "call offered" message, via the LAN 124. to the operator console 126. This message instructs the operator console 126 which application to perform, based on the type of service requested. In this example, the type of service requested is a debit card service.

Next, in step 310, the ACD 116 routes the call to an available operator console 126 from the group selected by the AP 118. Control then passes to step 311. In step 311, the operator console 126 retrieves the transfer record as a result of executing the application program specified in the "call offered" message in step 308. Control then passes to step 312. In step 312, the operator console 126 executes the application program as specified in the "call offered" message in step 308. In this example, the operator console 126 performs a debit card customer service application that instructs the operator to prompt the caller for information such as a debit card access number and a PIN. The operator then enters such information into the operator console 126. Note, in this example, the access number identifies the specific SDP 132 that is coupled with the SSCP 140, wherein the account information is stored for this particular caller.

Next, in step 314, the operator console 126 sends a query message to the SDP 132 via the AIN gateway 120. This query message contains an identifier for the SDP 132 that is to handle the account, based on the access number provided in step 312. The AIN gateway 120 uses this identifier to obtain a network address for the SDP 132. The AIN gateway 120 sends the query message as a TCAP message over TCP/IP 130 to the SDP 132. Next, control passes to step 316.

In step 316, the SDP 132 uses the access number and PIN to access a debit card account. Further, the SDP 132 validates the PIN and sends a response back to the operator console 126 via the AIN Gateway.

Next, step 226 is performed as previously described with reference to step 226 with respect to the process depicted in FIG. 2. Accordingly, after the operator console 126 receives a response from the SDP 132 containing PIN validation from step 316, the operator can perform a variety of services for the customer. Examples of such services is depicted in steps 228–236.

1.43 Set-up for re-charging a debit card account

Figure 4A:
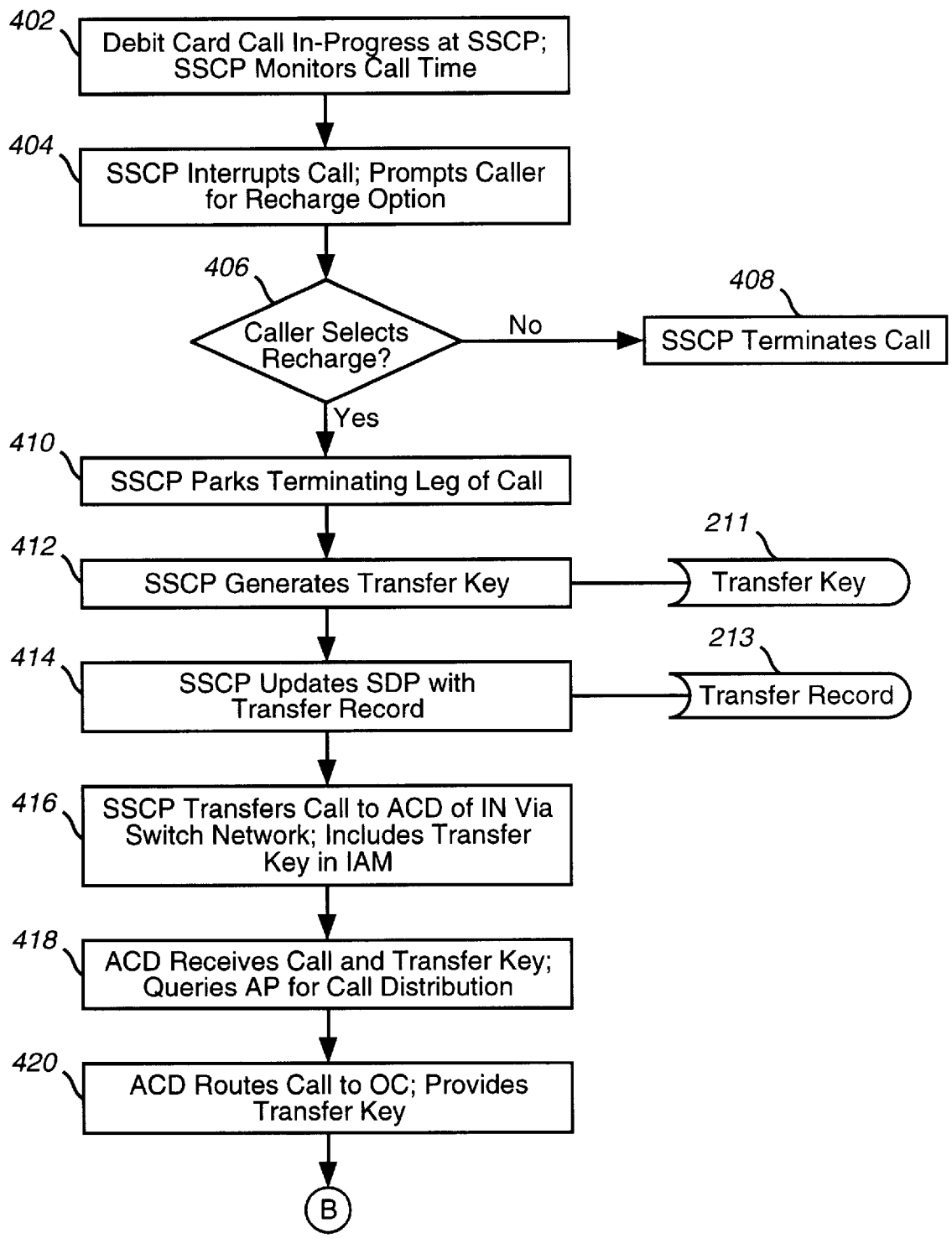
FIGS. 4a and 4b comprise a flowchart illustrating a process that can be used in a preferred embodiment of the present invention when a debit card account becomes extinguished during the processing of a debit card call.
Figure 4B:
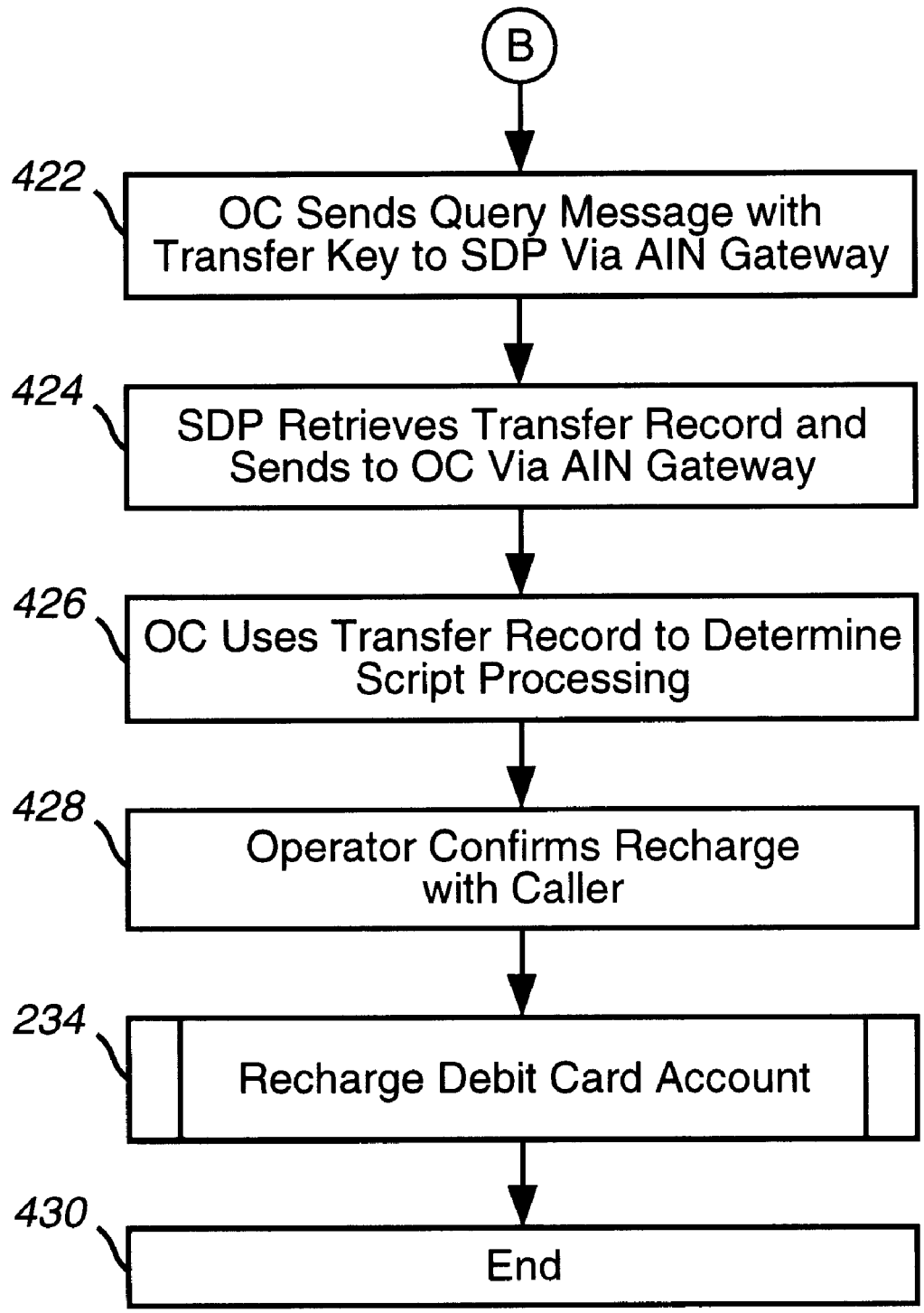

FIGS. 4a and 4b comprise a flowchart illustrating a process that can be used in a preferred embodiment of the present invention when a debit card account becomes extinguished during the processing of a debit card call at the SSCP 140. In this example, the caller uses customer services provided by an embodiment of the present invention to recharge the debit card account. In this example, because customer services, rather than operator services, is requested and used to recharge customer accounts, a customer service application is be performed by the operator console 126.

The process begins with step 402. In step 402, a debit card outbound call is in-progress at the SSCP 140. In this example, the SSCP 140 monitors the in-progress call for duration, and debits the debit card account within the SDP 132 accordingly. In one embodiment, the SSCP 140 provides the caller with a warning message whenever one minute of calling time remains on the account.

In step 404, the SSCP 140 detects that the debit card account has been extinguished. Accordingly, the SSCP 140 interrupts the call and prompts the caller with an option to recharge the debit card account.

As step 406 indicates, if the caller chooses not to recharge the account, control passes to step 408 where the call is terminated. Alternatively, if the caller does choose to recharge the debit card account, control passes to step 410. In step 410, the SSCP 140 parks the terminating leg of the call. That is, the terminating leg of the call, (i.e. the called party) is placed on hold.

Next, in step 412, the SSCP 140 generates a transfer key 211. As stated, in a preferred embodiment, the transfer key 211 comprises 10-digit number that is used to uniquely identify the SDP 132 and to uniquely identify a transfer record (described below). Specifically, the transfer key 211 comprises a 5-digit identifier for the specific SDP 132 and a 5-digit number used to identify the transfer record. Once a transfer key is generated, control passes to step 414.

In step 414, the SSCP 140 updates a call transfer table within the SDP 132 by creating a transfer record 213. A reason code is included in the call transfer record 213 indicating a reason for transfer. In this example, the reason for transfer is to recharge the debit card account. Control then passes to step 416

Next, in step 416, the SSCP 140 transfers the call to the ACD 116 within the intelligent network 102. The customer service number and the transfer key 211 are included in the SS7 IAM. Control then passes to step 418.

In step 418, the ACD 116 receives the call and queries the AP 118 for call distribution instructions. The AP 118 responds to the ACD 118 as previously described. In addition, the AP 118 also sends a "call offered" message to the operator console 126, as previously described. Control passes to step 420.

In step 420, the ACD 118 routes the call to an operator console 126. The transfer key 211 is provided either by the ACD 116 or the AP 118, depending on a specific embodiment of the present invention.

Next, in step 422 (FIG. 4b), after the operator console 126 receives the call and the transfer key 211, it sends a query message (including the transfer key 211) to the SDP 132 via the AIN gateway 132. In step 424, the SDP 132 retrieves the transfer record 213 using the transfer key 211. The SDP 132, then sends information from the transfer record 213 in a response message to the operator console 126 via the AIN gateway 120.

Next, in step 426, the operator console 126 receives the transfer record 213 information from the response message sent by the SDP 132. This information indicates that the call was transferred in order to recharge a debit account. Accordingly, the operator console 126 performs a script that corresponds with the recharge function. Control then passes to step 428.

In step 428, the operator confirms that the caller wishes to recharge their debit card account. If so, then the operator proceeds with the recharge process in step 234. A detailed description of this process is presented below with reference to the flowchart in FIG. 7. The process ends as indicated by step 430.

Figure 5:
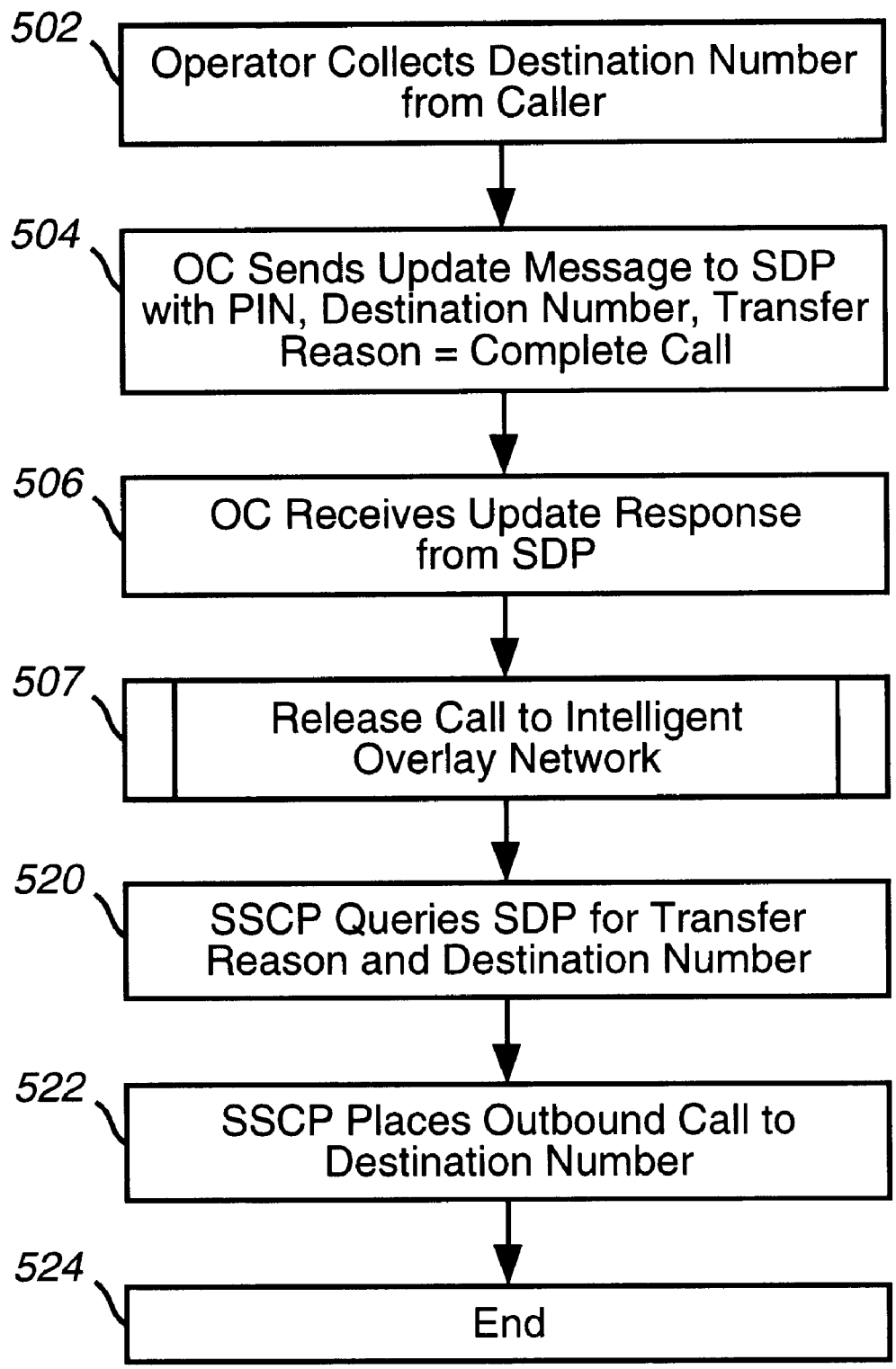
FIGS. 5 and 5a are flowcharts illustrating a process that can be used to perform the steps required for completing an outbound call from an operator console after a destination calling number has been collected from the caller, according to a preferred embodiment of the present invention.
Figure 5A:
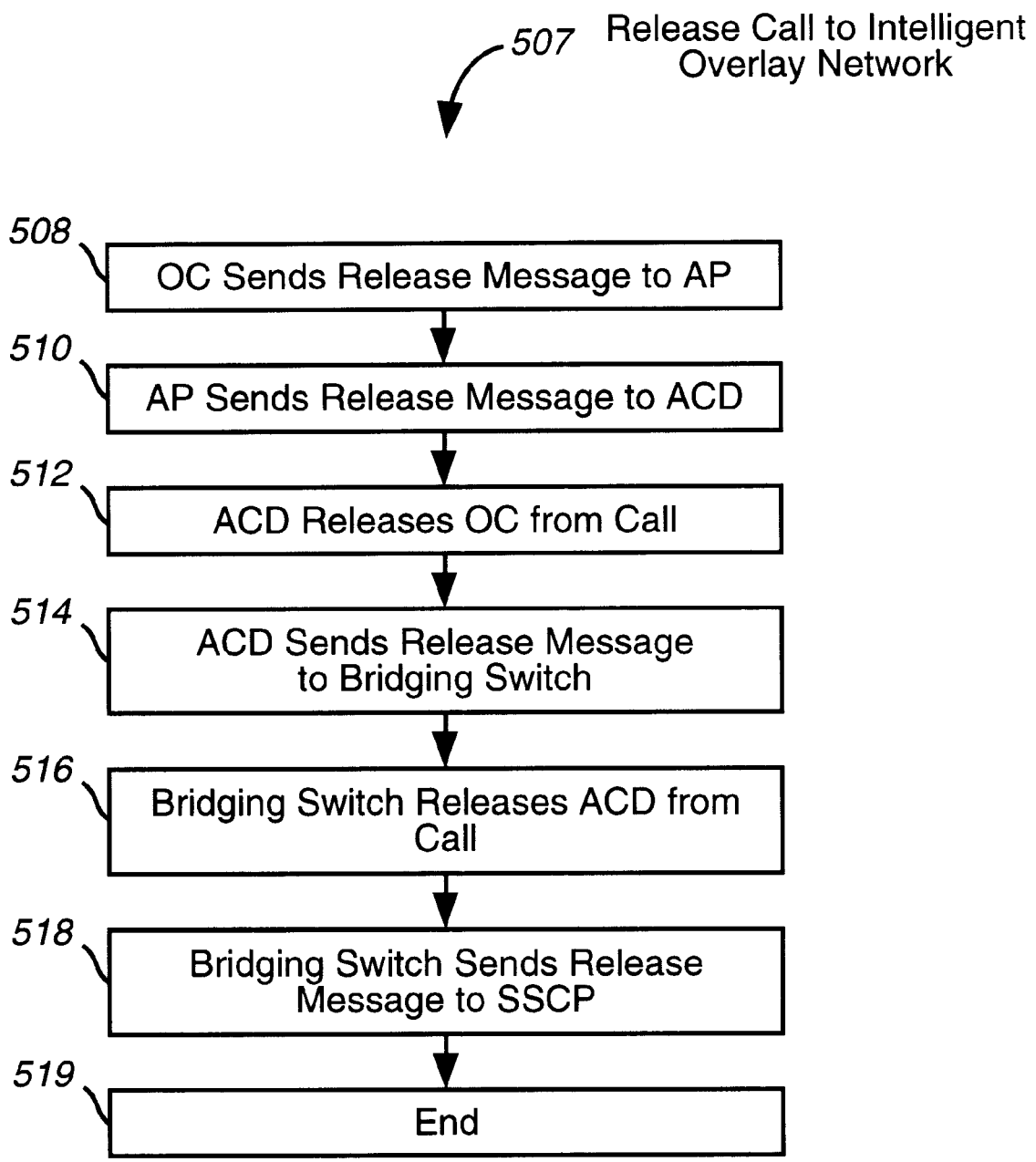

1.44 Originating an outbound call from operator console after destination number has been collected FIGS. 5 and 5a are flowcharts illustrating a process that can be used to perform the steps required for completing an outbound call from an operator console 126 after a destination calling number has been collected from the caller. This is the process depicted by step 228 in FIGS. 2 and 3. Specifically, in this example, the operator at the operator console 126, collects a destination number from a caller and originates an outbound call. As described below, in this example of a preferred embodiment of the present invention, the outbound call is actually placed by the SSCP 140.

The process begins with step 502, where the operator collects a destination number from the caller and enters it into the operator console 126. The collecting of a destination number may be performed in conjunction with collecting a caller's access number and/or PIN. In step 504, the operator sends all of this information to the SDP 132.

In step 504, the operator console 126 sends an update message to the SDP 132 via the AIN gateway 120. This message preferably contains the PIN, destination number, and a transfer reason indicating that the call will be transferred to the intelligent overlay network 104 in order to complete a call. It also contains an identifier for the SDP 132, which is derived at the operator console 126 from the access number provided by the caller. In response to this messages, the SDP 132 validates the PIN and sends a response back to the operator console 126.

Next, in step 506, the operator console 126 receives a response from the SDP 132. If the response indicates that the PIN is valid, the operator console 126 proceeds to release the call to the intelligent overlay network 104. Control then passes to step 507. In step 507, the call is released to the intelligent overlay network 104. The process to release the call to the intelligent overlay network 104 is described below with reference to FIG. 5A. Once the call is released to the intelligent overlay network 104, control passes to step 520.

In step 520, when the call has been released to the SSCP 140, the SSCP 140 queries the SDP 132 for the transfer reason. In this example, the SSCP 140 determines that the call was transferred (i.e. released) to complete an outbound call. Thus, the SSCP 140 retrieves the destination calling number from the SDP 132. Control then passes to step 522, where the SSCP 140 places the outbound call to the destination number. The process ends with step 524.

A process that can be used to release a call from the intelligent network 102 to the intelligent overlay network 104 is depicted by the flowchart in FIG. 5A. The process begins with step 508. In step 508, the operator console 126 sends a release message to the AP 118. Next, in step 510, the AP 126 sends a release message to the ACD 116 and control passes to step 512.

In step 512, the ACD 116 releases the operator console 126 from the call. Next, as indicated by step 514, the ACD 116 sends a release message to the bridging switch 110. In response to the release messages from step 514, the bridging switch 110 releases the ACD 116 from the call, as indicated by step 516. Next, in step 518, the bridging switch 110 sends a release message to the SSCP 140. The process ends with step 519.

Figure 6:
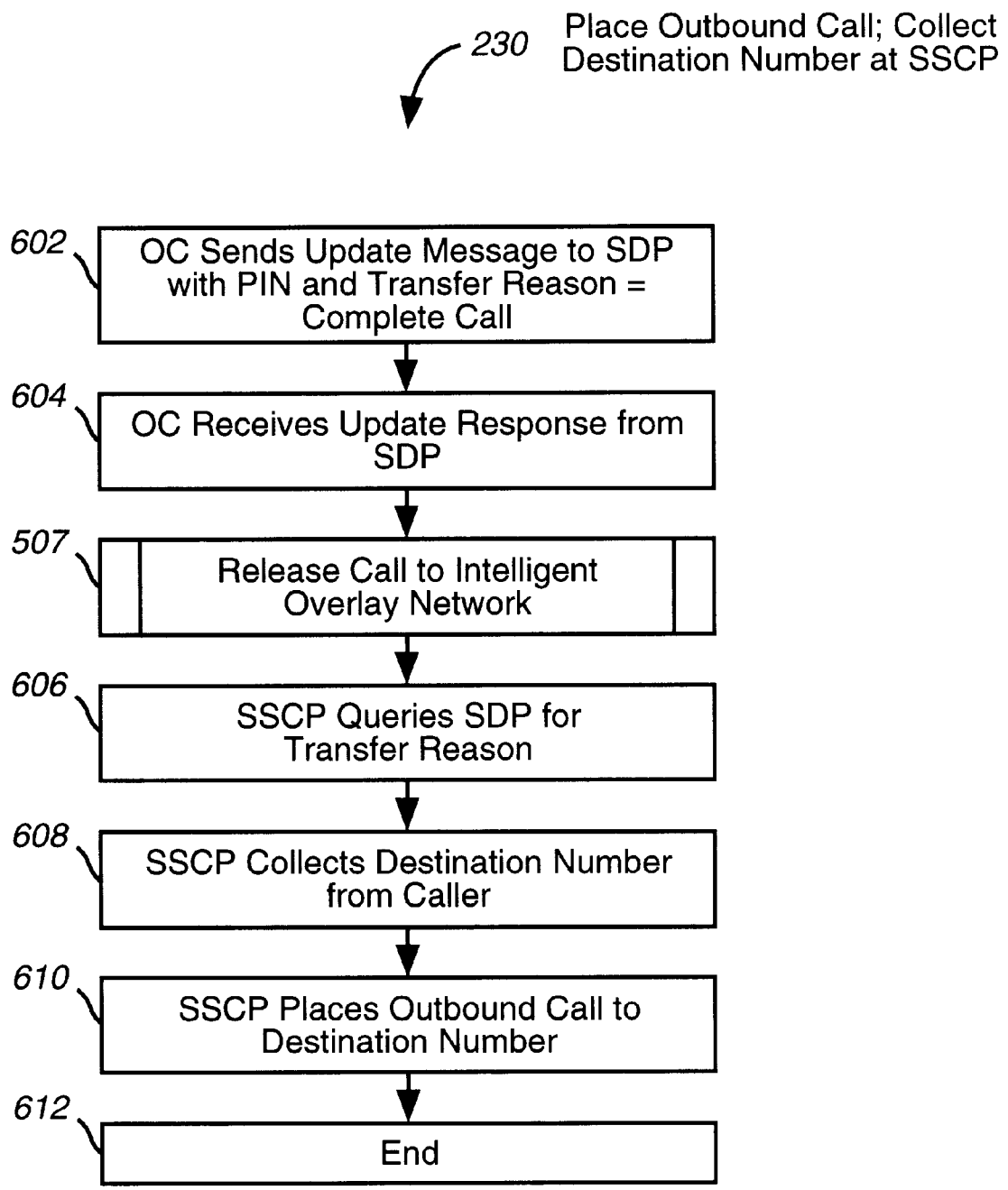
FIG. 6 is a flowchart illustrating a process that can be used to perform the steps required for completing an outbound call from an operator console before a destination calling number has been collected from the caller, according to a preferred embodiment of the present invention.

1.45 Originating an outbound call from operator console before destination number has been collected FIG. 6 is a flowchart illustrating a process that can be used to perform the steps required for completing an outbound call from an operator console 126 before a destination calling number has been collected from the caller, according to a preferred embodiment of the present invention. This is the process depicted by step 230 in FIGS. 2 and 3. Specifically, in this example, the operator at the operator console 126 releases the call to the SSCP 140. At the SSCP 140, the destination calling number is collected and the SSCP 140 competes the outbound call. In this example, it is assumed that the operator has determined that the caller wishes to place an outbound call (from step 226), and the caller has provided an access number and PIN.

In this process the operator console 126 sends an update message to the SDP 140. This message contains the PIN, access number, and a transfer reason indicating that a call completion is requested. The SDP 140 validates the caller's PIN, and returns a response to the operator console 126.

Specifically, the process begins with step 602 where the operator console 126 sends an update message comprising the PIN, access number and a transfer reason to the SDP 140. Next, in step 604, the operator console 126 receives the response from the SDP 140. If the response indicates a valid PIN, the operator console 126 proceeds to release the call to the intelligent overlay network 104., as indicated by step 507. The process to release the call to the intelligent overlay network 104 has been previously described with reference to FIG. 5. Once the call is released to the intelligent overlay network 104, control passes to step 606.

In step 606, when the call has been released to the SSCP 140, the SSCP 140 queries the SDP 132 for the transfer reason. In this example, the SSCP 140 determines that the call was transferred (i.e. released) to complete an outbound call. However, in this case, unlike the previous example in FIG. 5, the destination number has not been collected.

Accordingly, in step 608, the SSCP 140 prompts the caller for a destination number. In response to the prompt, the caller enters a number via DTMF digits. Control then passes to step 610.

In step 610, the SSCP 140 places an outbound call to the destination number collected from step 608 in a well known manner. The process ends with step 612.

1.46 Releasing a call from operator console to SSCP

Figure 11:
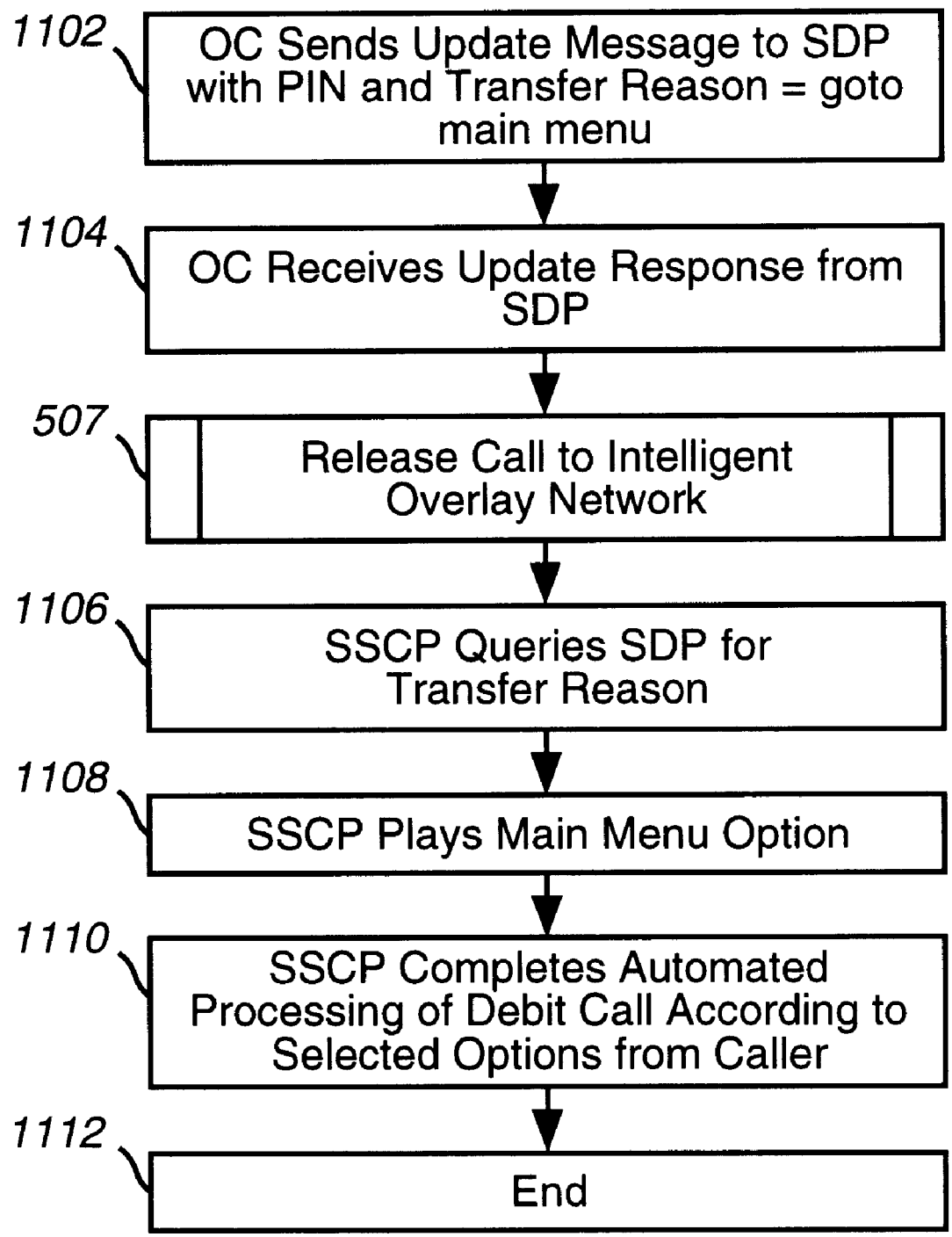
FIG. 11 is a flowchart illustrating a process that can be used to perform the steps for releasing a call from the operator console to the intelligent overlay network, for call processing that begins with the main menu options, according to a preferred embodiment of the present invention.

FIG. 11 is a flowchart illustrating a process that can be used to perform the steps for releasing a call from the operator console 126 to the SSCP 140, for call processing that begins with the main menu options, according to a preferred embodiment of the present invention. This is the process depicted by step 232 in FIGS. 2 and 3. Specifically, in this example, the operator releases the call to the SSCP 140, where the main menu is played for the caller. The steps that can be used to perform this process are similar to the steps previously discussed with reference to FIG. 6. Accordingly, only a brief discussion pertaining to the differences between the two processes is presented.

First, step 1102 is similar to step 602, except that in step 1102 the transfer reason is set to "go to main menu." In addition, step 1108 is similar to step 608, except that in step 1108 the SSCP 140 plays the main menu option to the caller. Finally, step 1110 is similar to step 610, except that in step 1110, the SSCP 140 completes the automated processing of the debit card call according to selected options provided by the caller.

1.47 Recharging a debit card account

Figure 7:
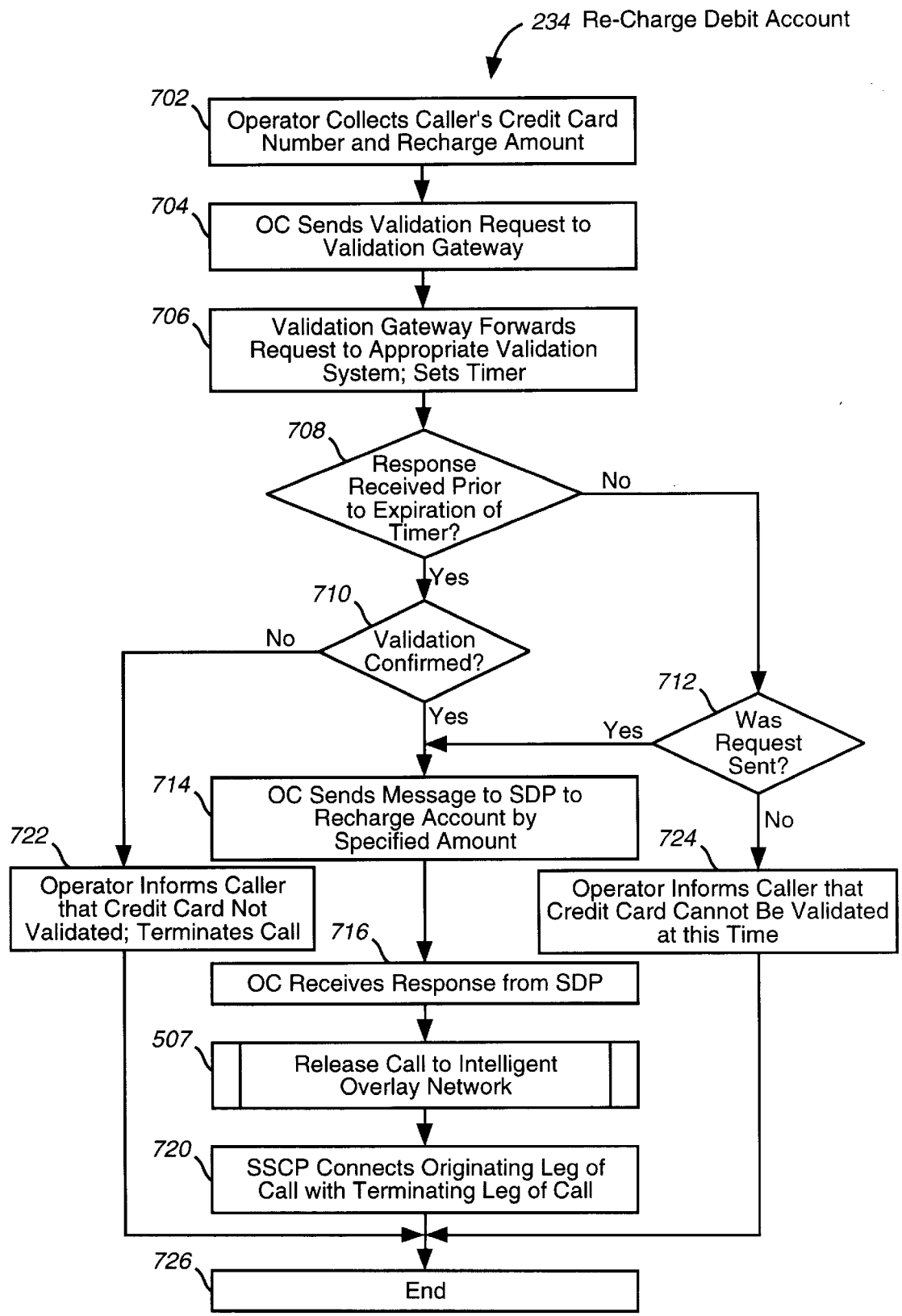
FIG. 7 is a flowchart illustrating a process that can be used to perform the steps required for recharging a caller's debit card from an operator console, according to a preferred embodiment of the present invention.

FIG. 7 is a flowchart illustrating a process that can be used to perform the steps required for recharging a caller's debit card from an operator console 126, according to a preferred embodiment of the present invention. This is the process depicted by step 234 in FIGS. 2, 3 and 4. Specifically, in this example, the operator recharges the caller's debit card by: (1) collecting the caller's credit card number; (2)validating charges against the credit card; and (3) sending a message to the SDP 140 to replenish the account.

The process begins with step 702 where the operator collects the caller's credit card number and a dollar charge amount. In a typical debit card service, a debit card is replenished with a predetermined range having a minimum number of units and a maximum number of units having a certain dollar value. For example, the caller can replenish their debit card with 60 minutes of call time for $15. The operator also collects any information that is needed to validate the credit card, such as an expiration date, zip code, etc.

Next, in step 704, the operator console 126 sends a validation request message to the validation gateway 122. The validation gateway 122 provides a means for components within the intelligent network 102 to interface with one or more credit card validation systems 114. The credit card validation systems 114 are typically provided by credit validation companies such as banks and the like. Typically such systems are coupled via an X.25 network, such as the X.25 network 112.

In step 704, the operator console 126 sends a request to one of the credit card validation systems 114 via the validation gateway 122. Preferably, the request contains the caller's credit card number and other validation information, such as the expiration date, zip code, merchant ID and the requested dollar amount.

Next, in step 706, the validation gateway 122 forwards this request to an appropriate credit card validation system 114. At the same time, a timer is started and used to keep track of the elapsed time since the credit card validation request.

In step 708, the process determines whether a response is received before expiration of the timer from step 706. If so, control passes to step 710. In step 710, the operator console 126 determines if validation was confirmed. If validation was confirmed, control passes to step 714, where the operator console 126 sends a message to the SDP 132 to replenish the debit card account by the requested amount. Next, in step 716, the operator console 126 receives a response from the SDP 140. Control passes to step 718.

In step 507, the operator console 126 releases the call back to the SSCP 140. The process to release the call back to the SSCP 140 has been previously described with reference to FIG. 5A. In this case, the transfer reason provided to the SDP 132 by the operator console 126, preferably indicates that the debit card has been replenished, there is a call in progress, and the originating and terminating legs of the call should be connected at the SSCP 140.

Accordingly, in step 720, the SSCP 140 re-connects the originating leg of the call, (i.e. the caller who has just replenished the debit card), with the terminating leg of the call, which has been parked at the SSCP 140 (see step 410 above).

Returning now to step 708, if a response is not received prior to the expiration of the timer started in step 706, control passes to step 712. In step 712, the validation gateway 122 determines whether the request message was actually sent to the credit card validation system 114. For example, if in step 712, the process determines that the X.25 link 112 was down when the request was made, it is clear that credit card validation request could not have been received by the credit card validation system 114. Thus, there is no chance that the customer will be charged as a result of the request.

Accordingly, in a preferred embodiment of the present invention, the process determines whether a credit card validation request was actually sent to the credit card validation system 114 in step 706. If it is determined that the request was actually sent, the service provider can optionally perform the recharge function for the customer, even though the service provider never received the expected response from the credit card validation system 114.

On the other hand, if it is determined that such a request was never sent in step 706 due to a failed X.25 link or a similar malfunction, the service provider can inform the customer that the recharge service cannot be provided at this time. Therefore, by performing this test in step 712, the service provider will not be put into a position where a customer is denied a recharge by the service provider and is ultimately charged by the credit card company.

Accordingly, in a preferred embodiment, the process proceeds with an assumed validation. This method may be preferable to re-sending the validation request and possibly causing a double charge to customers. That is, it may be preferably to err on the side of the customer. Therefore, if a response is not received and it is determined that request was successfully sent from the validation gateway 122 over the X.25 link 112, the process proceeds as if a validation response was received and validated in steps 708 and 710. Accordingly, the validation gateway 122 sends a message to the operator console 126 instructing it to proceed as if a confirmation of authorization was received. This prevents the operator console 126 from attempting another credit card charge which can result in double-charging the caller's credit card account.

On the other hand, if the process in step 712 determines that the request was not sent due to a malfunction, control passes to step 724. In step 724, the operator informs the caller that the credit card cannot be validated at this time and to try again later. Alternatively, if multiple validation gateways 122 are used in the intelligent network 102, the operator console 126 may resend the request using another validation gateway 122.

Referring back now to step 708, control passes to step 710 if a validation response was received from the credit card validation system 114 before the expiration of the time-out period from step 706. In step 710 the process determines whether the credit card validation system 114 forwards a response that indicates that the particular credit card account has been validated. That is, a positive response indicates that the charge has been approved. If the credit charge has not been approved, control passes to step 722 where the operator informs the caller that their credit card was not validated and re-prompts for a new credit card number or terminates the call.

If step 710 indicates that the charge has been approved, control passes to step 714 and processing continues with steps 714–726 as described above. The process ends with step 726.

1.5 Details of AIN Gateway, Validation Gateway and Operator Console

The AIN Gateway serves as a single point of interface between a plurality of operator consoles 126 and one or more SDPs 140. The AIN gateway 120 provides message and protocol conversion, message addressing and distribution, and communications management.

The operator consoles 126 are linked to the AIN gateway 120 via the LAN 124. In one embodiment, the operator consoles 126 and the AIN gateway 120 exchange Transaction Capabilities Application Part (TCAP) messages encoded in Abstract Syntax Notation (ASN.1). In this example, the messages are exchanged using NSPP/UDP/IP. NSPP is a specific protocol comprising a session-oriented packet exchange protocol that is transported over User Datagram Protocol/Internet Protocol (UDP/IP). UDP is a well known standard connection-less-oriented protocol implemented over IP. It is part of IP protocol suite that includes TCP. Other transportation and messaging protocols can be used with different embodiments of the present invention. As such, the use of the example transport and messaging protocols should not be construed to limit the scope and breadth of the present invention.

SDPs 132 are linked to the AIN gateway 120 via a TCP/IP network 130. Accordingly, the SDPs 132 and the AIN gateway 120 exchange TCAP messages using TCP/IP. In contrast to UDP, TCP is a connection-oriented protocol that guarantees delivery by re-sending unconfirmed messages in 500 ms intervals.

In other embodiments, the AIN gateway 120 may provide an interface to SS7 networks using standard SS7 TCAP messaging protocols. The SS7 network can be used to perform the same functions as the intelligent overlay network 104, as described herein. As should be apparent to those skilled in the relevant art(s), the components within the intelligent overlay network 104, are standard components that are typically found within SS7 networks. Indeed the intelligent overlay network 104 is a specific implementation of an SS7 network. Accordingly, any SS7 or similar type network can be used in place of the intelligent overlay network 104 of the present invention. As such, the use of the intelligent overlay network 104 should not be construed to limit the scope of the present invention. The use of other SS7 and similar type networks used in conjunction with the present invention would be apparent to those skilled in the relevant art(s).

1.51 Internal Architecture of AIN Gateway

Figure 8:
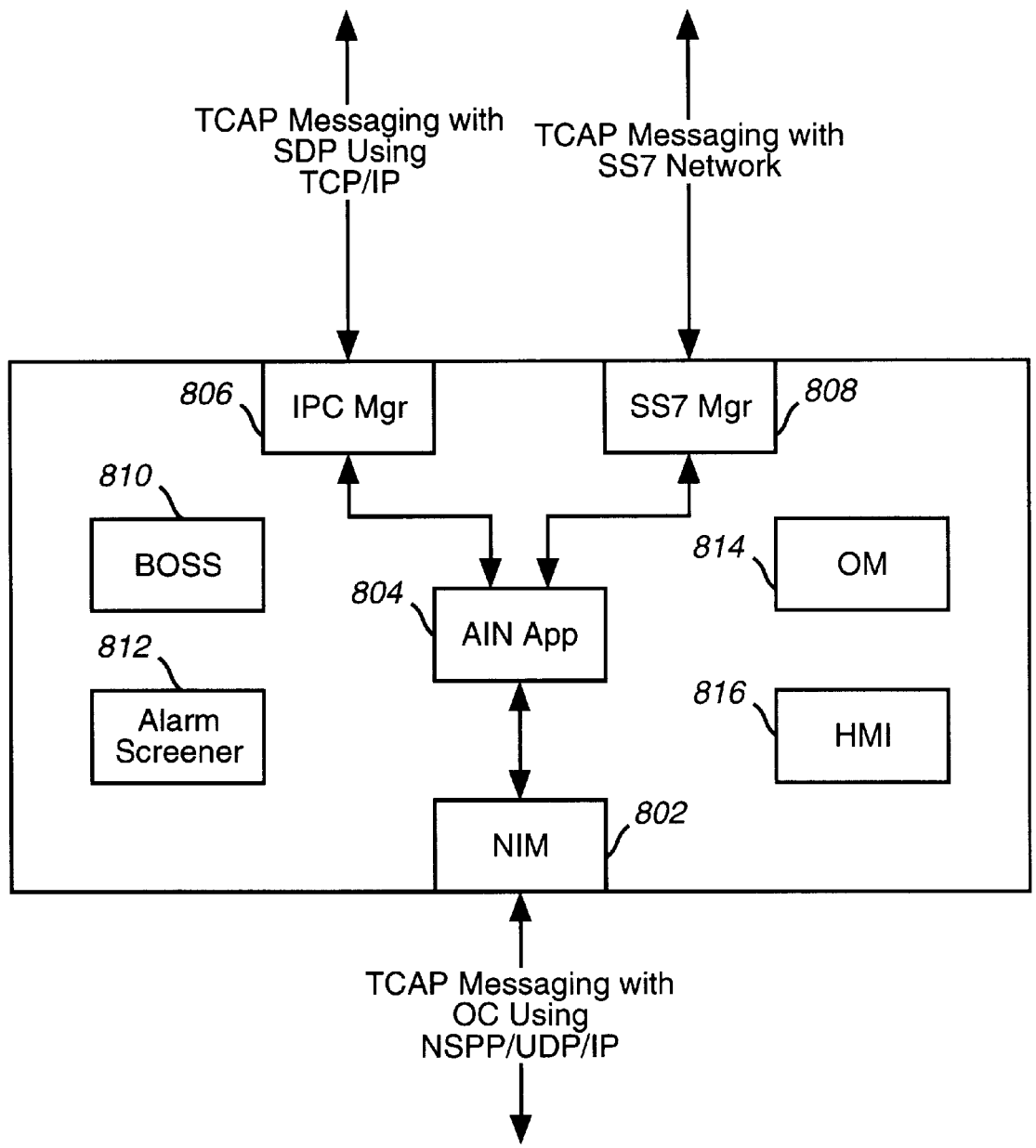
FIG. 8 is a block diagram illustrating the internal architecture of the AIN gateway according to a preferred embodiment of the present invention.

FIG. 8 is a block diagram illustrating the internal architecture of the AIN gateway 120 according to a preferred embodiment of the present invention. In a preferred embodiment, the AIN gateway 120 is implemented using a DEC Alpha with VMS. In this example, there are four primary software components in the mainline processing of the AIN gateway 120, namely: an NSPP Interface Module (NIM) 802; an Advanced Intelligent Network Application (AIN App) 804; an Inter-process Communications Manager (IPC Mgr) 806; and a Signaling System 7 Manager (SS7 Mgr) 808.

In this example, other supporting software components of the AIN gateway 120 include a BOSS 810, an Alarm Screener 812, an Operational Measurements (OM) component 814 and a Human Machine Interface (HMI) 816. Each of the above referenced software components are described below.

The NIM 802 provides the applications and services of the AIN gateway 120 with access to the NSPP-based Ethernet LAN 124. As stated, NSPP is an specific protocol. The NIM 802 allows both client and server applications to reside on the same hardware platform, thereby increasing the flexibility of the existing hardware. In this example, the NIM 802 provides an interface to a connection-less-oriented messaging network (i.e. the NSPP/UDP/IP 121 network connecting to the operator consoles). The IPC MGR 806 provides the interface to the connection oriented data stream network (i.e. the TCP/IP network 144 connected to the SDPs 132). The NIM 802 performs sequencing of messages and thus, may receive messages from the operator consoles 126 out of sequence.

Note that the IPC Mgr 806 and SS7 Mgr 808 perform the same function but interface with different networks. In this example, the IPC Mgr 806 interfaces with SDPs 140 using TCAP messaging over TCP/IP. Similarly, the SS7 Mgr 808 interfaces with SS7 components using standard SS7 TCAP messaging protocols.

The IPC Mgr 806 serves as the TCP/IP-based inter-process communications provider for the AIN gateway 120. It facilitates both intra-node and inter-node message exchange between the AIN gateway 120 processes, the SDPs 132, and other switch network components, such as the SSCP 140. It is also responsible for re-starting the BOSS 810 process should the BOSS 810 process terminate abnormally. Because the BOSS 810 is responsible for starting, monitoring, and re-starting the other AIN gateway 120 processes, including the IPC Mgr 806, the IPC Mgr in this capacity provides the AIN gateway 120 with a complete self-monitoring capability.

For further information pertaining the IPC Mgr 806, please refer to above referenced U.S. patent application entitled "System and Method for Inter-Process Communication", Ser. No. 08/671,027, filed on Jun. 25, 1996.

The SS7 Mgr 808, serves as the communications provider for the AIN gateway 120 when the AIN gateway 120 interfaces with an SS7 network. It a preferred embodiment DEC SS7 components are used within the SS7 network. Therefore, a commonly available DEC SS7 Mgr can be used for the SS7 Mgr 808. In this case, the SS7 Mgr 808 would not provide inter-process communications for the other AIN gateway 120 components, as does the IPC Mgr 806, as previously described.

In this example, the AIN App 804 processes the ASN. 1 encoded TCAP messages from the operator consoles 126. In addition, the AIN App reformats the TCAP header component of such messages to address them for the SDP 132. Finally, the AIN App 804 passes the messages to the IPC Mgr 806 so that it is sent to the SDP 132.

The AIN App 804 also receives response messages from the SDP 140, reformats the TCAP header, and sends the response back to the operator console 126 via the NIM 802. The AIN App 804 preferably contains Application Program Interfaces (API) for sending and receiving TCAP messages.

For messages received from operator consoles 126, the AIN App 804 retrieves an originating identifier from the TCAP header that identifies the specific operator console 126 sending the message. This originating identifier is stored and subsequently used as a destination identifier (in the TCAP header) when passing a response message from the SDP 132 back to the operator console 126. In addition, the AIN App 804 tracks messages sent to SDPs 132 from the operator consoles 126 and ensures that responses are received by the operator consoles 126. A timer is used to time-out responses.

In this example, the BOSS 810 process is responsible for starting, stopping, and monitoring processes within the AIN gateway 120. At startup, after reading a configuration file that indicates which processes should be started, the BOSS 810 starts those processes. After such processes have been started, the BOSS 810 establishes a lock on each process. The lock allows the BOSS 810 to detect a process termination so that the process can be restarted.

The Alarm Screener 812 process is used to accept event messages from other AIN gateway 120 processes via a VMS mailbox. All events are logged to a file, and based on an alarm number, certain treatments can be performed. Alarm treatments consist of thresholding and screening of alarms for downstream network monitoring processing.

The HMI 816 provides the primary access for operations and maintenance. Through a series of menus, the HMI permits the configuration, addition, or deletion of gateways within a node, linksets, links, destinations, routes, application and other configurable entities.

The OM 814 process collects operating data from the other processes and from the operating system of the AIN gateway 120. Such operating data generally indicates the performance of specific software processes and/or the operating system.

The NIM 802 operates as a server process so that operator consoles 126 can establish connection-less communication sessions therewith. Once a session is established, the operator console 126 selects a service. An example of a service is the AIN App service 804. It should be noted that the AIN gateway 120 can support many services other then the example AIN App service 804 described herein. In operation, the NIM 802 receives a TCAP message from the operator console 126 and forwards it to the AIN App 804. The AIN App 804 extracts application data, such as an SDP 132 PIN validation request, from the TCAP message.

For additional information pertaining the AIN gateway 120, please refer to the above referenced U.S. patent application entitled "Advanced Intelligent Network Gateway", filed concurrently herewith, Attorney Docket No. CDR-96-009 (1575.2240000).

1.52 Architecture of Validation Gateway

The validation gateway 122 enables authorization and settlement of charges to a credit card. Typically, this function is to be performed in real-time via a single message exchange.

Figure 9:
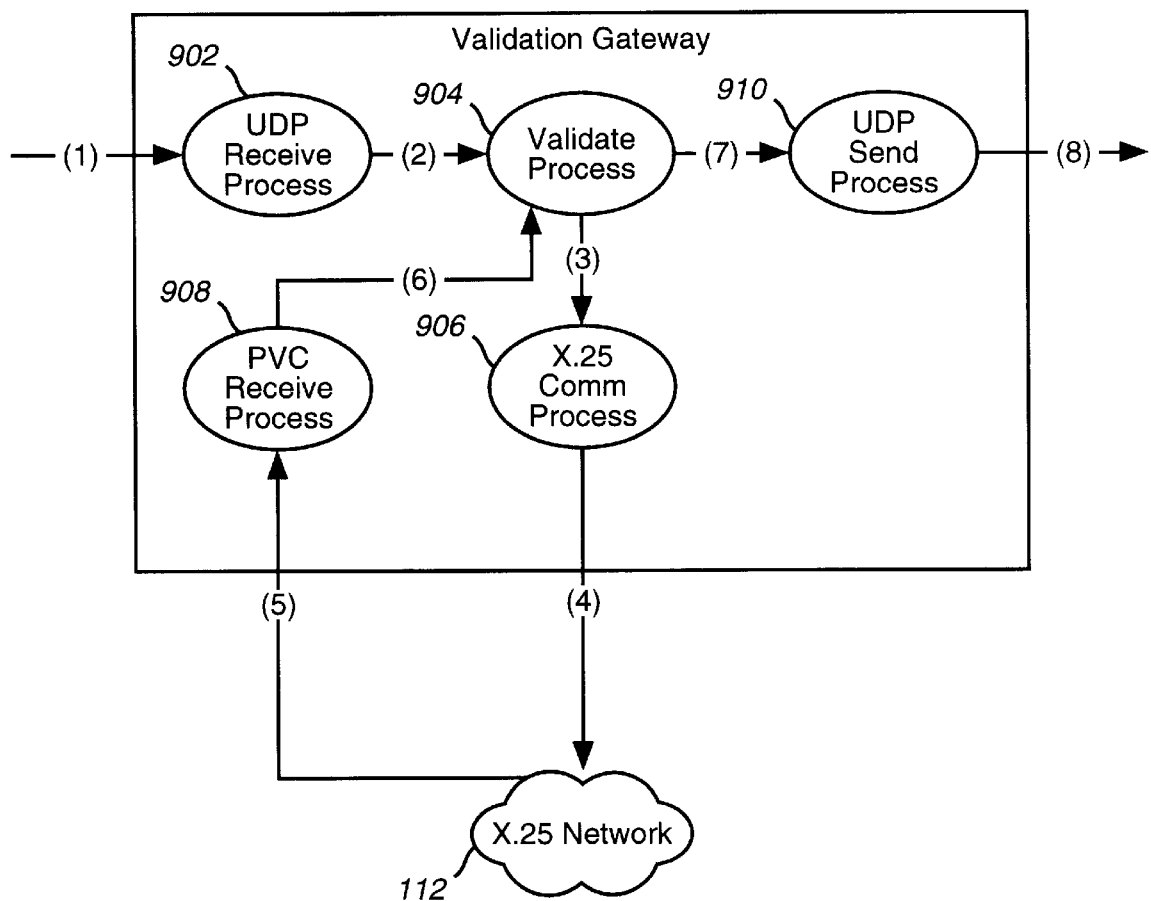
FIG. 9 is a block diagram illustrating the internal logical architecture of the validation gateway according to a preferred embodiment of the present invention.

FIG. 9 is a block diagram illustrating the internal logical architecture the validation gateway 122, according to a preferred embodiment of the present invention. In this example, the validation gateway 122 comprises 5 primary processes including: UDP receive process 902; validate process 904; X.25 comm process 906; PVC receive process 908; and UDP send process 910.

The operator console 126 operates as a client to the validation service performed by the validation gateway 122. In operation, the operator console 126 sends a request message to the validation gateway 122 to request authorization and settlement of charges to a credit card. Typically, this request message comprises a dollar amount to be charged, a credit card number, a PIN (if applicable), an expiration date, zipcode, and/or any other information needed for credit card validation. In addition, the request message includes a merchant identifier. The merchant identifier is typically used to identify a specific product or service, because the validation gateway 122 can be used for a variety of products and services in addition to debit card example described herein. Alternatively, the merchant identifier can be used for other purposes, depending on the specific implementation of the present invention.

Request messages from the operator console 126 to the validation gateway 122 are sent over the LAN 124 via NSPP/UDP/IP. Such messages are received by the UDP receive process 902 as depicted by step 1 in FIG. 9. In this example, the UDP receive process 902 is a communications manager for UDP/IP.

Continuing with the process depicted in FIG. 9, the request message is sent to the validate process 904, as indicated by step 2. The validate process 904 performs the primary processing for the validation gateway 122. An example a process that can be performed by the validate process according to a preferred embodiment of the present invention is described below with reference to FIG. 10.

The validate process 904 stores information from the request message. Note, this information is used by the validate process 904 to track responses from the credit card validation system 114. In addition, this information is subsequently used in order to respond back to the operator console 126 that originated the request. Once this information is stored, the validate process 904 creates an X.25 message comprising a request to the credit card validation system 114.

In step 3, the validate process sends the X.25 request message to the X.25 communications process 906. The X.25 comm process 906 manages communications between the validation gateway 122 and the X.25 network 112.

In step 4, the X.25 comm process 906 sends the request message to the credit card validation systems 114 over the X.25 network 112. The credit card validation system 114 processes the requested by authorizing the credit card and applying the requested charges. Applying the requested charges is referred to herein as settlement.

If authorization and settlement are successful, a positive response is returned to the validation gateway 122. If either authorization or settlement are not successful, a negative response is returned to the validation gateway 122 . Typically, a reason for an unsuccessful authorization and/or settlement is also returned. Examples of such reasons can include, invalid credit card number, invalid PIN, expired credit card, wrong expiration date, exceeded credit limit, or merchant identifier has been disabled to prevent fraud.

In step 5, a response from the credit card validation system is received by the PVC receive process. In a preferred embodiment, where the present invention is implement using the UNIX operating system, the PVC receive process 908 is a child process of the X.25 comm process 906.

As indicated by step 6, the PVC receive process sends the X.25 response message to the validate process 904. The validate process 904 extracts the authorization and settlement validation results from the X.25 message and interprets these results to a defined response code that is used by the operator console 126. The validate process 904 adds this response code to the original request message that it stored from step 2, above.

In step 7, the validate process 904 sends the request message with the response code to the UDP send process 910. The UDP sent process 910 functions as a communications manager for UDP/IP.

In step 8, the UDP send process 910 sends the request message with the response code to the particular operator console 126 that sent the original request message in step 1.

In a preferred embodiment, the UDP receive process 902, UDP send process 910, X.25 comm process 906 and PVC receive process 908 are all communications management processes. As stated, the primary processing logic in the validation gateway 122 is embodied within the validate process 904.

1.521 Example of a validate process for the Validation Gateway

Figure 10:
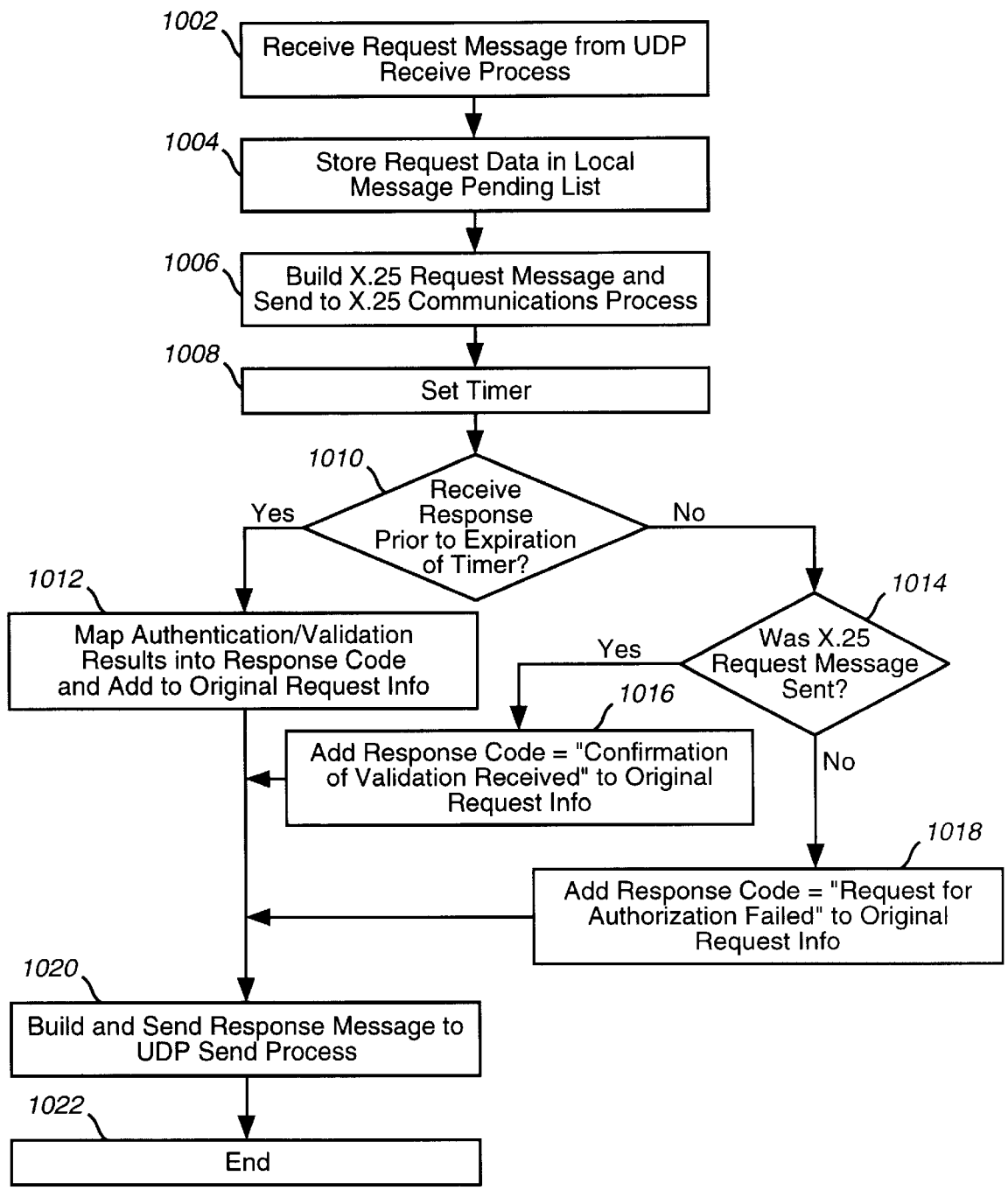
FIG. 10 is a flowchart illustrating a process that can be performed by the validate process within the validation gateway, according to a preferred embodiment of the present invention.

FIG. 10 is a flowchart illustrating a process that can performed by the validate process 904, according to a preferred embodiment of the present invention. The process begins with step 1002.

In step 1002, the validate process 904 receives the operator console's 126 request message from the UDP receive process 902. Next, in step 1004, the validate process 904 stores the information from this request message, including the message header that contains the address of the operator console 126 that originated the request. The information is stored in a local "message pending" list.

In step 1006, the validate process 904 builds an X.25 message with the request information and sends it to the X.25 comm process 906. At this same time, in step 1008, a timer is set.

Next, as indicated by step 1010, if a response from the credit card validation system 114 is received prior to the expiration of the timer, control passes to step 1012. In step 1012, the validation process 904 maps the results into an appropriate response code for the operator console 126. This step typically involves: (1) reading the response message; (2) determining whether authorization and validation of settlements have been confirmed; (3) determining reason codes (if any); (4) converting the data to a response code that is recognized by the operator console 126. Examples of such response codes are "authorization/validation confirmed" and "authorization failed due to invalid PIN." The response code is added to the original request information that was stored in step 1004.

Referring back now to step 1010, if a response from the credit card validation system 114 is not received prior to the expiration of the timer, control passes to step 1014. In step 1014, the validate process 904 determines whether the original X.25 request message was successfully sent. If so, control passes to step 1016. In this example, the validate process 904 is programmed such that it assumes that the credit card validation system 114 received the request, but the response is delayed for one reason or another. Accordingly, in step 1016, the validate process 904 adds a response code that indicates a confirmation of authorization and validation was received. This response code will instruct the operator console 126 to authorize the re-charge of the caller's debit card by the requested amount. As previously mentioned, this method is preferable to re-sending the request message and risk double charges.

Referring back now to step 1014, if the request message was not successfully sent, perhaps due to a failure in the validation gateway's 122 X.25 link, the validate process 904 assumes that the credit card validation system 114 never received the request. Thus, as step 1018 indicates, the validate process 904 adds a response code that indicates the request for authorization has failed. This response code instructs the operator console 126 to either try another validation gateway 122 (if multiple gateways exist in the specific implementation of the present invention), or inform the caller that the credit card authorization request failed and that a re-charge cannot be performed at this time.

Next, in step 1020, the validate process 904 uses the stored request message from step 1004 and the response codes from steps 1012 or 1016 to build a UDP response message. The response message is sent to the UDP send process 910 for delivery to the operator console 126. The process ends with step 1022.

1.53 Operator Console

The operator console 126 is a client to services provided by the AIN gateway 120 and the validation gateway 122. In operation, the operator console 126 sends query messages to the AIN gateway 120 in order to obtain call information from the SDP 132. In addition, the operator console 126 sends request messages to the validation gateway 122 in order to obtain authorization and settlement of credit card charges, as previously described.

1.531 Processes for Operator Console

Figure 12:
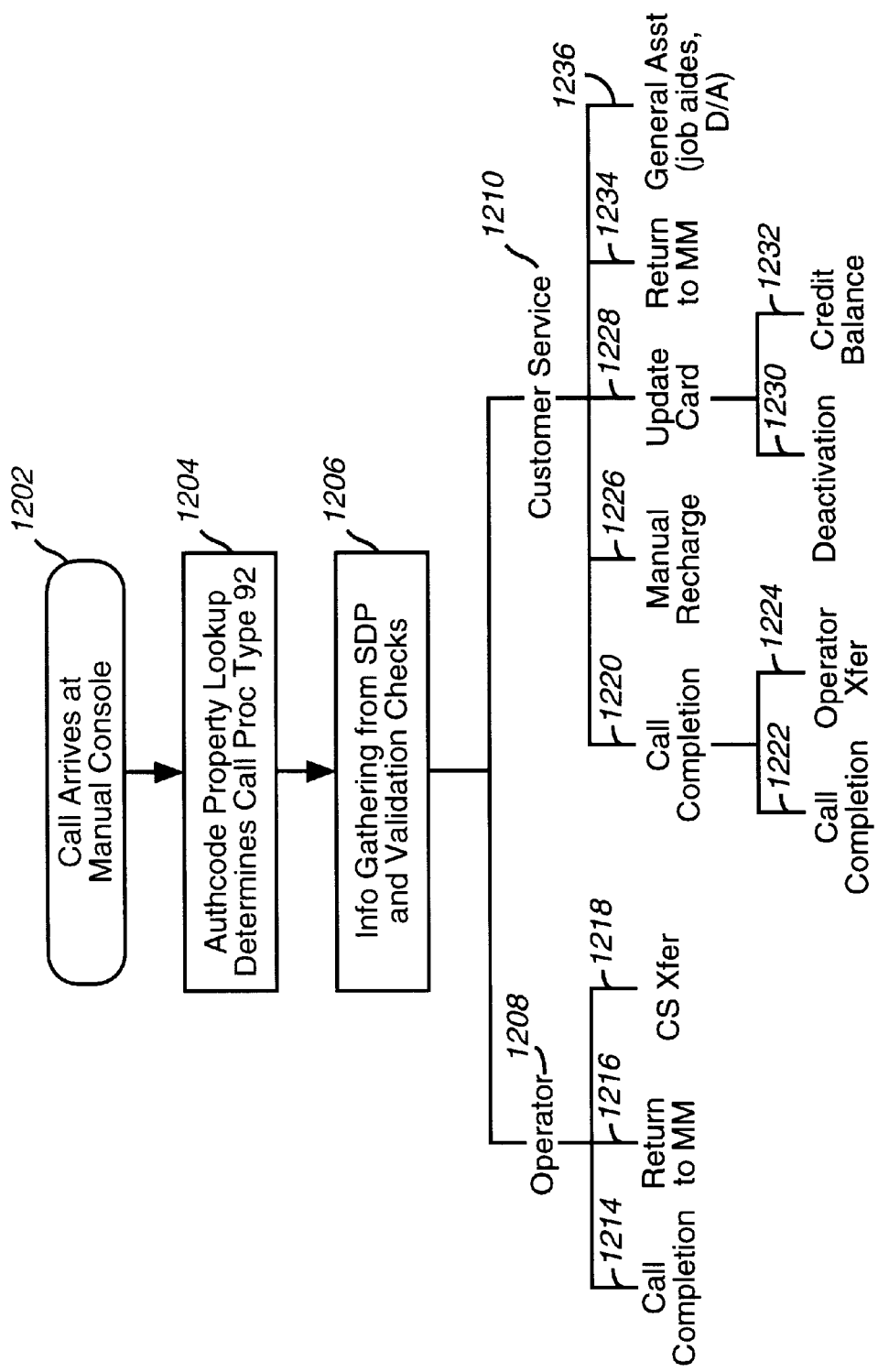
FIG. 12 is a block diagram depicting examples of functions that can be performed by the operator console to provide operator and customer services to customers, according to a preferred embodiment of the present invention.

FIG. 12 is a block diagram depicting examples of functions that can be performed by the operator console 126 to provide operator and customer services to customers, according to a preferred embodiment of the present invention.

Step 1202 represents a telephone call arriving at an operator console 126. In step 1204, the operator console determines what type of call is being received. In step 1206, the operator console communicates with the SDP 132 in order to determine information pertaining to the transferred telephone call received in step 1202.

The branches 1208 and 1210 represents operator and customer services that can be performed by the operator console 126. That is, the services 1214–1218 listed under the operator service branch 1208, represent typical services that are performed by operator services. Similarly, the services 1220–1236 listed under the operator service branch 1210, represent typical services that are performed by customer services.

Accordingly, services that can be performed by the operator services include call completion 1214, return to main menu 1216 and customer service transfer 1218. Similarly, services that can be performed by the customer services include call completion 1220, debit card recharge 1226, debit card account updates 1228, return to the main menu of the automated debit card service, 1234 and general customer assistance 1236.

The services that are listed under the call completion service 1220 are alternative call completion services that can be provided. For example, in one embodiment, a call is completed by the customer service representative directly as depicted by the service 1222. In another embodiment, the call is transferred to operator services where the call is completed. In yet another embodiment, the operator console 126 may determine whether to complete the call 1222 directly, or to transfer the call to operator services, depending on predetermined criteria.

In this example, the update card service 1228 comprises two sub-services, namely a deactivation service 1230 and a credit balance service 1232. For example, a deactivation service may be used if a customer depletes all credit remaining on the debit card account and does not wish to re-charge the debit card using the re-charge service 1226. In another example, an operator at the operator console 126 may use the deactivation service 1230 when fraud is suspected. Other customer service functions include manual recharge of the debit card as depicted by 1226, an update of the debit card 1228, returning to the main menu of the SSCP 140 as depicted by 1234, and general customer assistance as depicted by 1236. Subfunctions of the update card function 1228 include deactivation of the debit card 1230 and/or credit balance functions 1232. An example of a use for the credit balance service 1232 is when the customer requests debit card account balance information.

Figure 13:
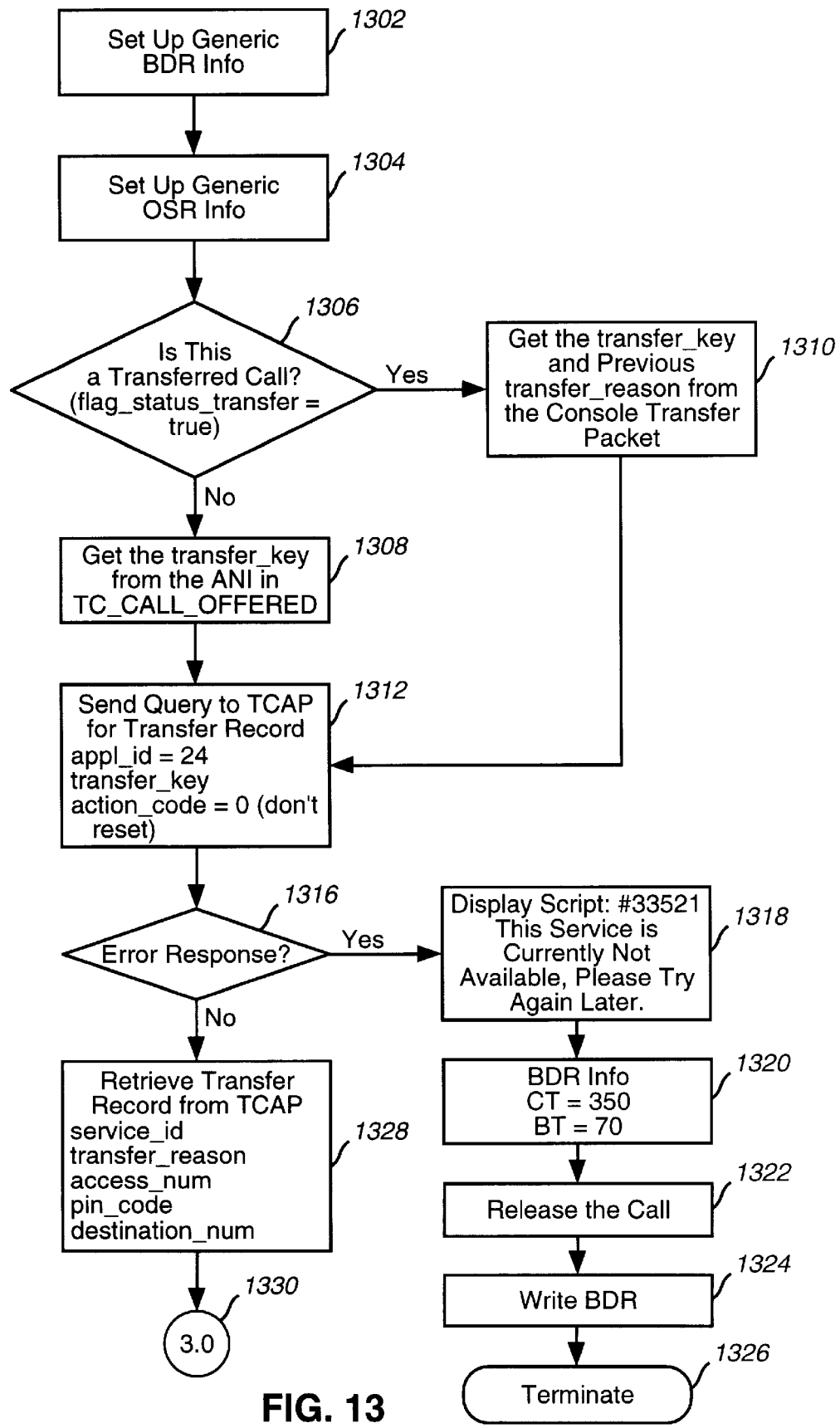
FIG. 13 depicts an example of a process that can be performed by the operator console, according to a preferred embodiment of the present invention.

FIG. 13 depicts an example of a process that can be performed by the operator console 126, according to a preferred embodiment of the present invention. The process begins with step 1302. In steps 1302 and 1304 the operator console 126 creates a billing detail record (BDR) and an operator service record (OSR), respectively. Control then passes to step 1306.

In step 1306 the operator console 126 determines whether the call has been transferred from another operator console 126. This is in contrast to a call that has been transferred by the SSCP 140 in the intelligent overlay network 104. If step 1306 determines that the call has been transferred from the intelligent overlay network 104, control passes to step 1308. In step 1308 the operator console 126 retrieves the transfer key 211 from the "called offered" message, as previously described. Control then passes to step 1312 which is subsequently described below.

Referring back to step 1306, if it is determined that the call had been transferred from another operator console 126, control passes to step 1310. In step 1310, the operator console 126 retrieves the transfer key 211 and the previous transfer reason from the console transfer packet. The transfer console packet is information that is received from the other operator console 126 upon the call transfer and is typically obtained from the SS7 IAM of the transferred call. Thus, is step 1306 determines that the call was transferred from another operator console 126, rather then from the SSCP 132, step 1310 is performed rather than step 1308. This is because the first operator console that received the transferred call directly from the SSCP 132, must have already extracted the transfer key 211 from the "call offered" message, in a similar process step as described above with reference to step 1308.

Accordingly, if an operator console 126 forwards such a call to another operator console 126, the transfer key and the transfer reason is forwarded via the transfer console packet. In any case, after the transfer key 211 and the transfer reason has been obtained (either from step 1310 or from step 1308), control passes to step 1312.

In step 1312 the operator console 126 sends a query to the SDP 132, in order to retrieve the transfer record 213 corresponding with the transfer key 211 obtained from step 1308 or 1310, as described above. Control then passes to step 1316.

In step 1316 the operator console 126 determines whether an error response was received from the SDP 132. An error response can occur whenever the SDP 132 is unable to comply with the request for a transfer record 213 from step 1312. For example, if the SDP 132 does not contain a transfer record 213 that corresponds with the transfer key 211 presented in step 1312, it responds with an error response.

Accordingly, if step 1316 determines that an error response was received from the SDP 132, control passes to step 1318. In step 318 the operator console 126 displays a message to the operator that indicates an error response was received. For example, as depicted in step 1318, a message is displayed to the operator that prompts the operator to inform the customer that the service is currently not available and to try again later. After the error indication is displayed to the operator on the operator console 126, control passes to step 1320.

In step 1320, the billing detail record is updated to reflect an appropriate call type indicator and a billing type indicator. Typically, the billing detail record is used downstream for processing and billing. Once the call and billing type indicators have been updated, control then passes to step 1322, where the call is released. Control then passes to step 1324. In step 1324, the operator consoles updates the billing detail record and the process ends as indicated in step 1326.

Referring back to step 1316, if an error response was not received by the SDP 132, control passes to step 1328. In step 1328 the operator console 126 retrieves the transfer record from the SDP 132. As previously stated, the transfer key 211 is used as a key for retrieving the transfer record 213 from the SDP 132. Preferably, the transfer record 213 comprises information including a service ID, a transfer reason, the access number used to dial into the service, a pin code (described below) and a destination calling number. Once the transfer record 213 is retrieved, control passes to process 1330, which is depicted in FIG. 14.

Figure 14:
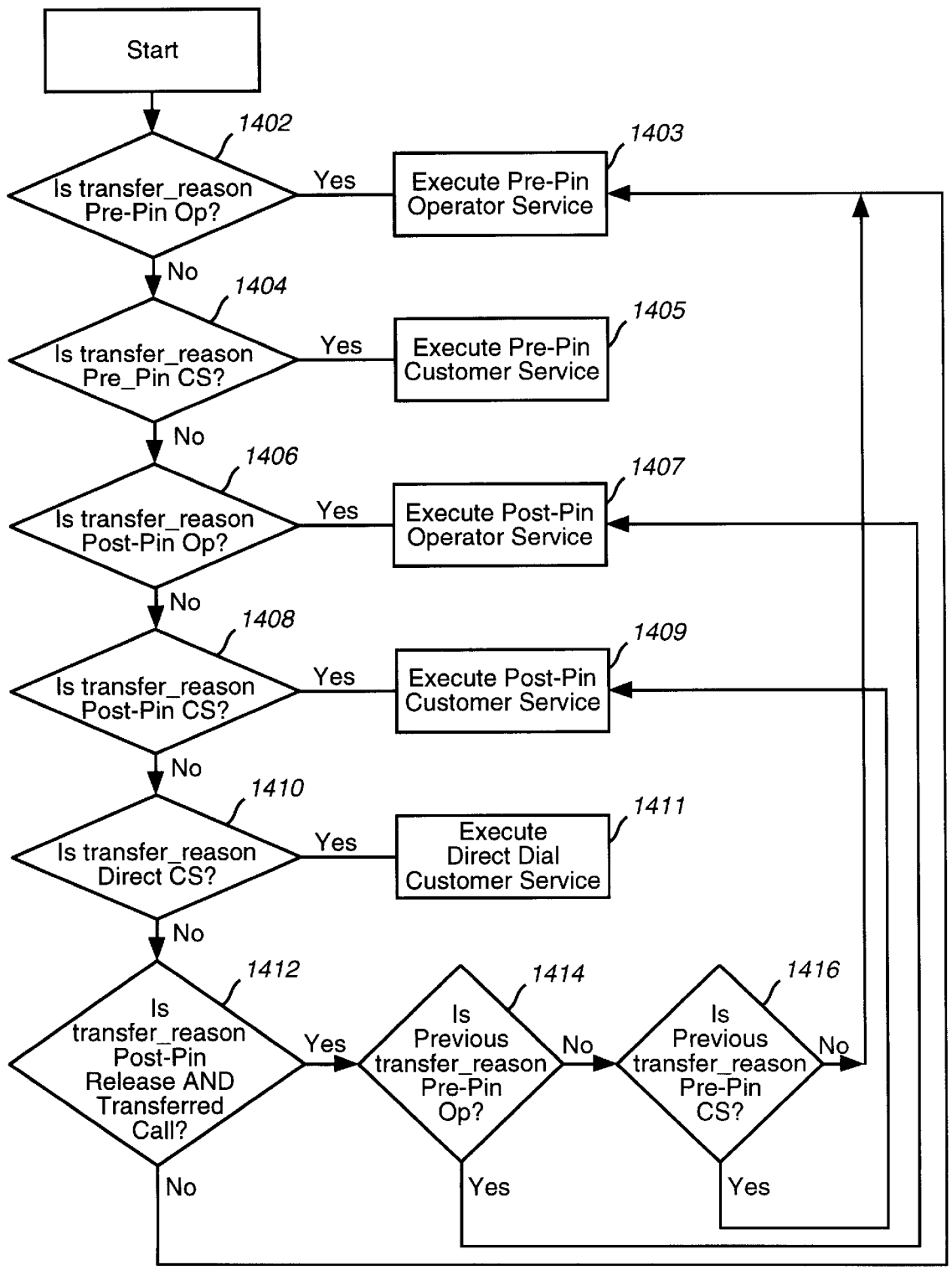
FIG. 14 is a flowchart depicting a process that can be used by the operator console to select a particular application program based on the transfer reason extracted from the transfer record, according to a preferred embodiment of the present invention.

FIG. 14 is a flowchart depicting a process that can be used by the operator console to select a particular application program that is based on the transfer reason extracted from the transfer record 213. In this example, the transfer reason can relate to criteria based on the one or more elements comprising the transfer record 213, and/or information from the "call offered" message. For example, the "pin code", comprises information related to whether or not the customer has entered their PIN into the system. In this example, a pin code of "Pre-Pin" indicates that the customer has not entered their PIN. Similarly, a pin code of "Post-Pin" indicates that the customer had entered their PIN and it has been validated by the system.

Accordingly, if the pin code indicates "Post-Pin", a particular application program is executed by the operator console 126, that prompts the operator to complete a debit card call without asking the caller to repeat their PIN. Similarly, if the pin code indicates "Pre-Pin", a particular application program is executed by the operator console 126 that prompts the operator to ask the caller for their PIN.

In this example, another field within the transfer record 213 indicates whether the customer requested operator or customer services. Note that in alternative embodiments, this information can be obtained from the call offered message, as described above.

Accordingly, referring back to FIG. 14, a pre-PIN operator service application program 1403 is executed on the operator console 126, if the transfer reason comprises values as indicated in the decision step 1402. If the transfer reason does not comprise such values control passes to step 1404.

In step 1404, a pre-PIN customer service application program 1405 is executed on the operator console 126, if the transfer reason comprises values as indicated in the decision step 1406. If the transfer reason does not comprise such values control passes to step 1406.

In step 1406, a post-PIN operator service application program 1407 is executed on the operator console 126, if the transfer reason comprises values as indicated in the decision step 1406. If the transfer reason does not comprise such values control passes to step 1408.

In step 1408, a post-PIN customer service application program 1409 is executed on the operator console 126, if the transfer reason comprises values as indicated in the decision step 1408. If the transfer reason does not comprise such values control passes to step 1410.

In step 1410, a direct dial customer service application program 1411 is executed on the operator console 126, if the transfer reason indicates that the customer directly dialed a customer service number. If the transfer reason does not so indicate, control passes to step 1412.

In step 1412, a pre-PIN operator service application program 1403 is executed on the operator console 126, if the transfer reason does not comprise the values as indicated in the decision step 1412. If the transfer reason does comprise such values, control passes to step 1414.

In step 1414, a post-PIN operator service application program 1407 is executed on the operator console 126, if the transfer reason comprises values as indicated in the decision step 1414. If the transfer reason does not comprise such values control passes to step 1416.

In step 1416, a post-PIN customer service application program 1407 is executed on the operator console 126, if the transfer reason comprises values as indicated in the decision step 1416. If the transfer reason does not comprise such values a Pre-Pin operator service application program 1403 is executed by the operator console 126.

The flowchart presented in FIG. 14, illustrates just one example of logic that can be used to select among different application programs according to information relating to the transferred call. As would be apparent to those skilled in the relevant art(s), many variations of this logic are possible, without departing from the basic principal disclosed herein—namely the selection of particular application programs executed on the operator console 126, according to the context of the transferred telephone call. Accordingly, the examples used herein should not be construed to limit the scope of the present invention.

1.532 Detailed Processes for Operator Consoles

The following figures, specifically, FIGS. 16–42 are process flowcharts illustrating functions that can be performed by the operator console 126 according to a preferred embodiment of the present invention. It should be noted that the flowchart depicted in FIG. 12, as described above, is similar to the flowchart depicted in FIG. 16, as described below. Similarly, the flowchart depicted in FIG. 13 above, is a composite of the flowcharts depicted in FIGS. 19, 20 and 26 below. In addition, the flowchart depicted in FIG. 14 above, is similar to the flowchart depicted in FIG. 20 below.

As stated, the flowcharts depicted in FIGS. 16–42 are processes that can be performed by the operator console 126, according to a preferred embodiment of the present invention. The flowcharts depicted in each of the FIGS. 16–42 are self-explanatory to those skilled in the relevant art(s). Accordingly, only a brief description for each of the flowcharts depicted in FIGS. 16–42 are presented below. However, after reading the following brief descriptions and the accompanying flowcharts, it will be apparent to those skilled in the relevant art(s) how to implement such processes in an embodiment of the present invention.

Figure 16:
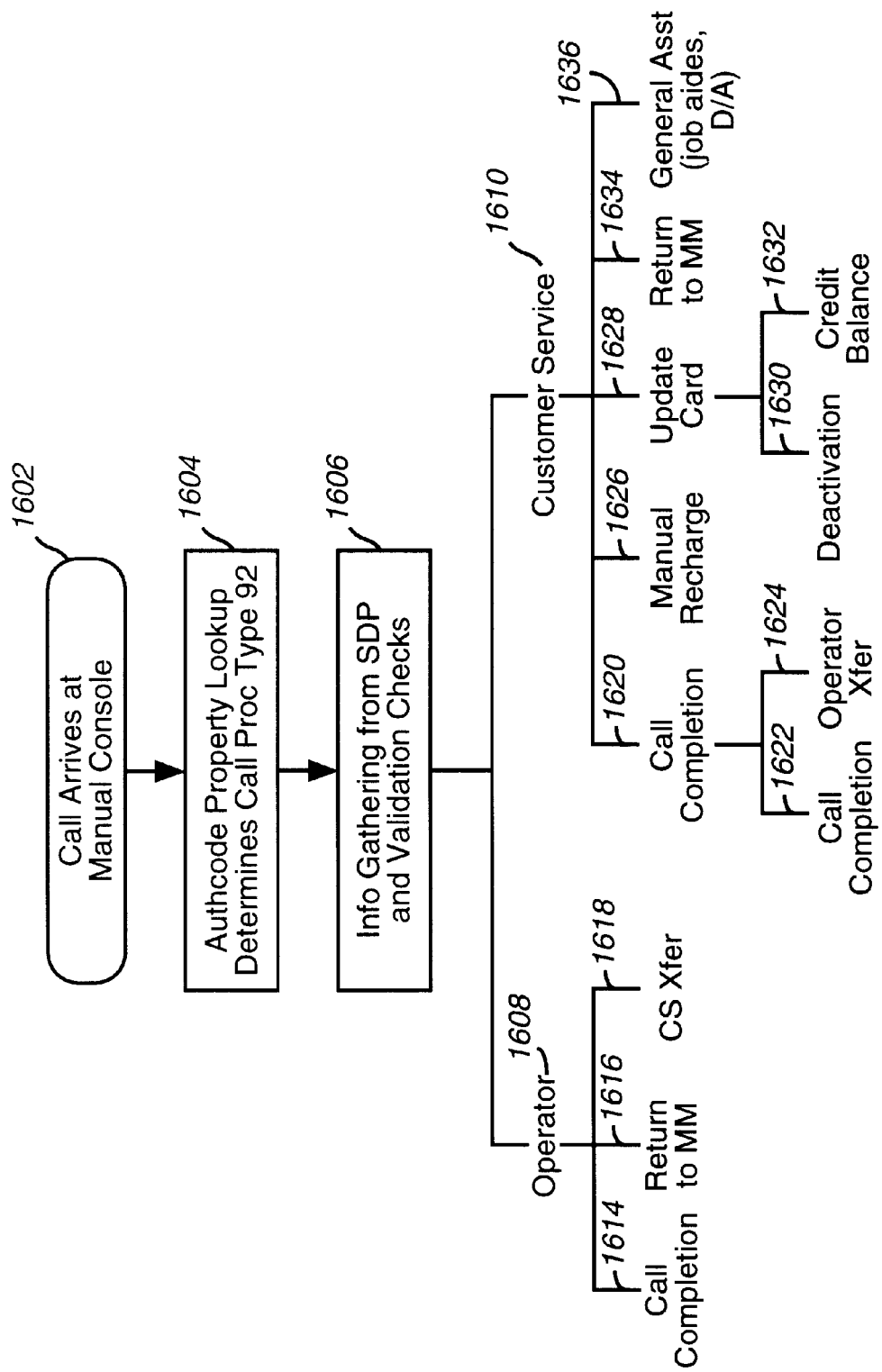
FIGS. 16–42 are flowcharts illustrating processes that can be run by the operator consoles according to a preferred embodiment of the present invention.

FIG. 16 depicts a flowchart 1602 showing a high-level view of functions that can be performed by the operator console in providing operator and customer services. As stated, the flowchart 1602 is similar to the flowchart depicted in FIG. 12 as described in detail above.

Figure 17:
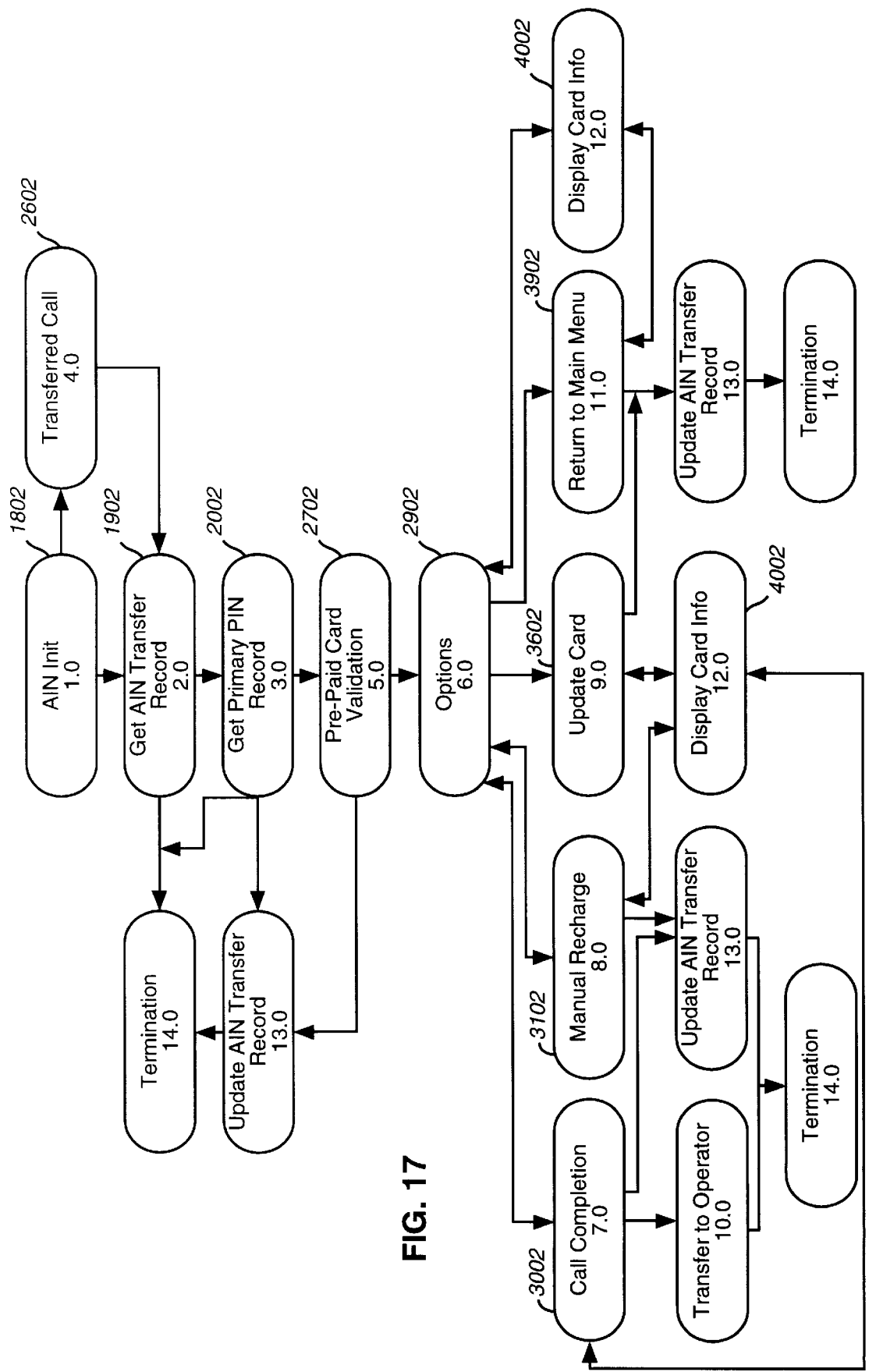

FIG. 17 shows various processes as depicted in the flowcharts in FIGS. 18–42 that can be used to perform the functions depicted in FIG. 16. Each process depiced in FIGS. 17 is represented by a separate flowchart in a subsequent figure that corresponds with the first two digits of the reference number associated with the process. For example, the flowchart for the process "AIN Init" 1802 can be found in FIG. 18. Similarly, the flowchart for the process "Get AIN Transfer Record" 1902 can be found in FIG. 19. In a similar fashion, FIGS. 19–42 may comprise process steps that are represented by a separate flowchart depicted in another figure.

Referring back to FIG. 17, the process steps 1802, 1902, 2002 and 2702 are each performed automatically by the operator console 126 without involvement or awareness of an operator. The process steps beginning with the step 2902 and below, represent screens that are displayed in order to prompt the operator to collect information from the caller, and to provide services to the caller.

Figure 18:
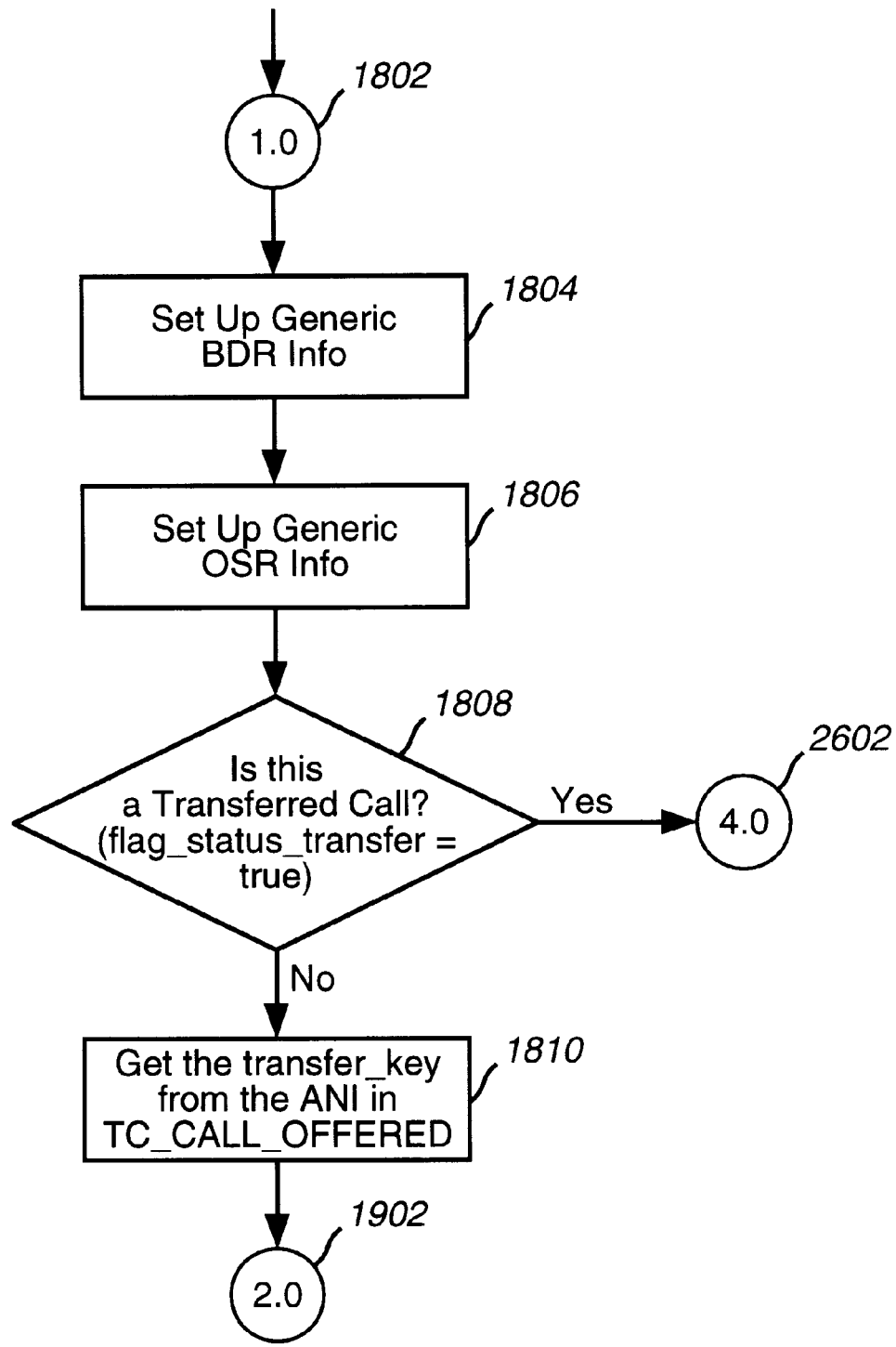

FIG. 18 is a flowchart 1802 depicting an initial process that can performed by the operator console 126 when a call is received. Information for a billing detail record (BDR) and an operator service record (OSR) are created in steps 1804 and 1806 respectively. As step 1808 indicates, a process 2602 is performed to obtain a transfer key 211 for calls that have been transferred from the intelligent overlay network 104. Conversely, if step 1808 indicates that call has not been transferred, step 1810 is executed where a transfer key 211 is derived from the ANI of the caller. Control then passes to step 1902, which is represented by the flowchart in FIG. 19.

Figure 19:
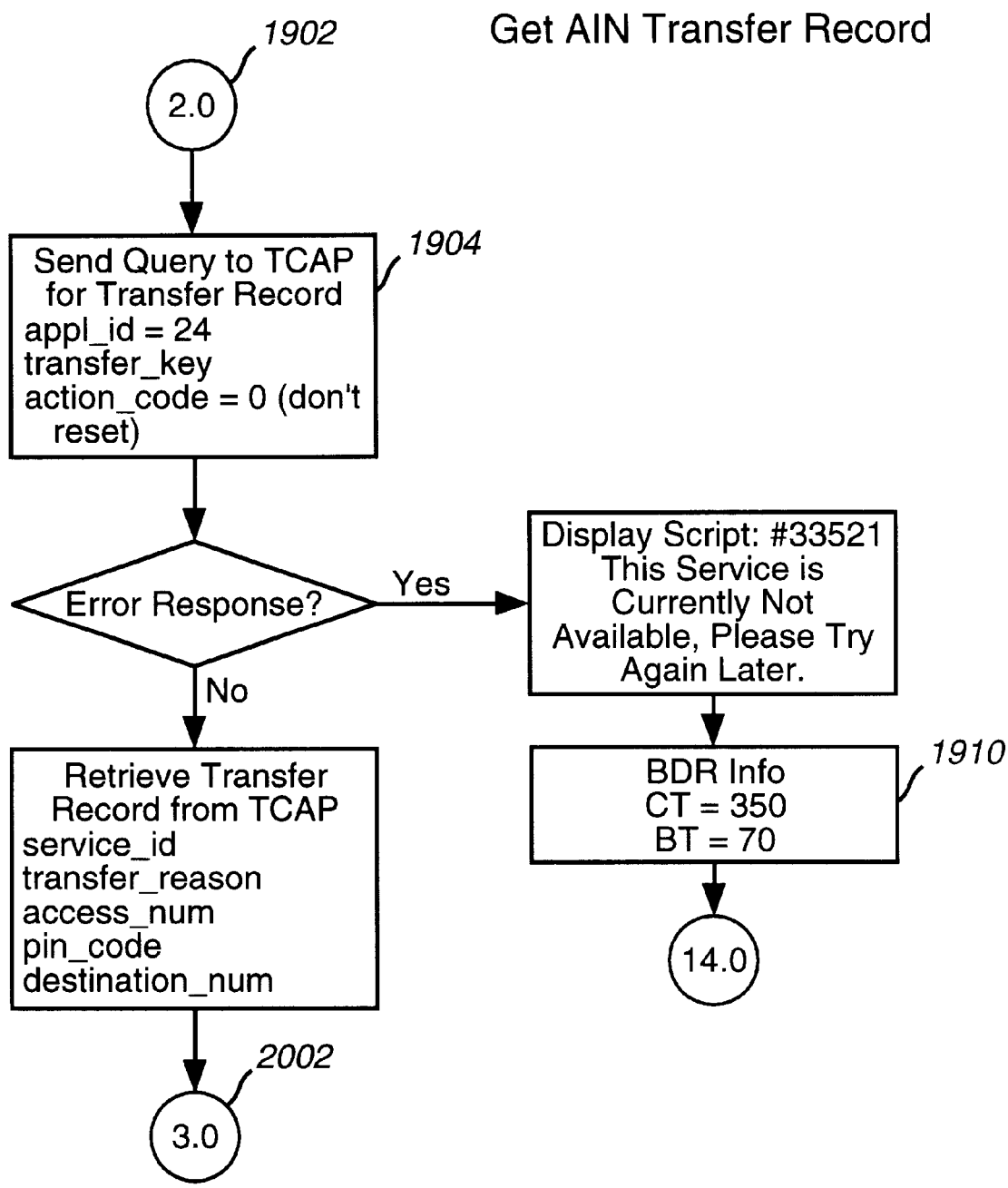

FIG. 19 is a flowchart depicting a process 1902 of the operator console 126 that can be used to obtain the transfer record 213 from the SDP 132. This is accomplished by sending a query to the AIN gateway 120, as indicted by step 1904. The term "send query to TCAP" in step 1904 refers to the AIN gateway 120 service. That is, a TCAP message is sent by the operator console 126 to the AIN gateway 120, to be routed to the SDP 132.

In step 1910, the term "CT" refers to a call type indicator and the term "BT" refers to a billing type indicator. Such indicators are typically used for downstream processing such as billing etc.

Figure 20:
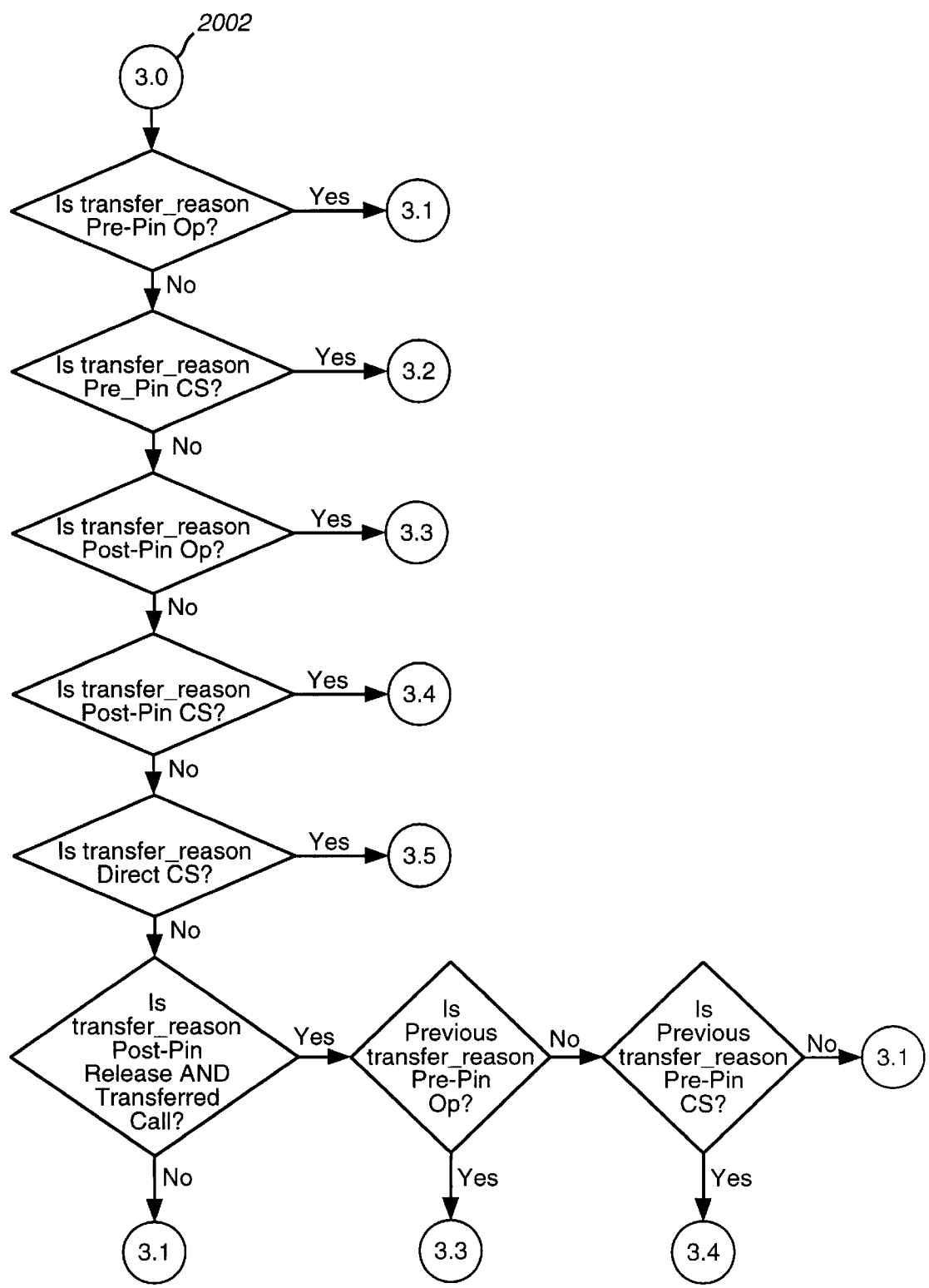
Figure 21:
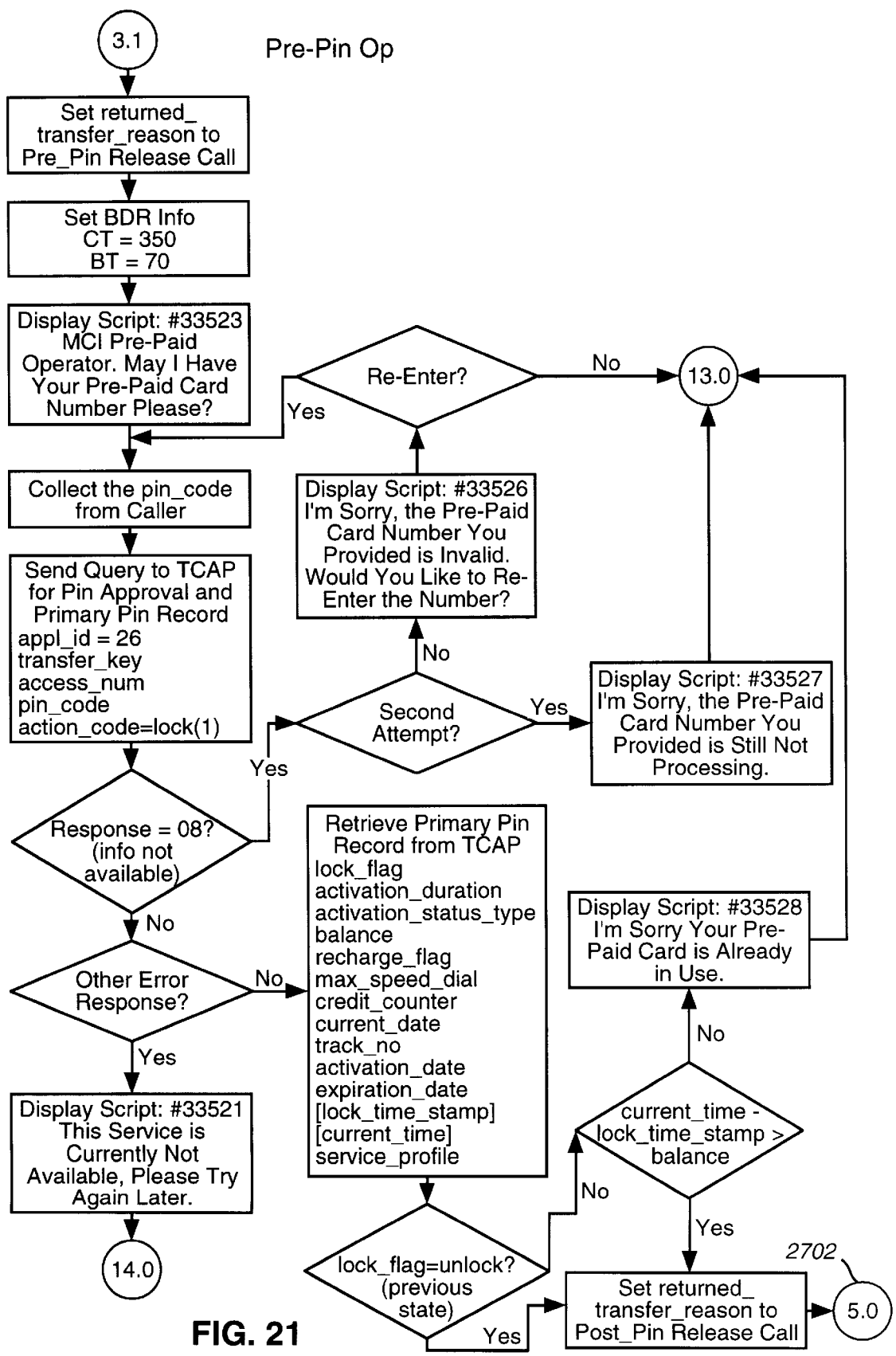
Figure 22:
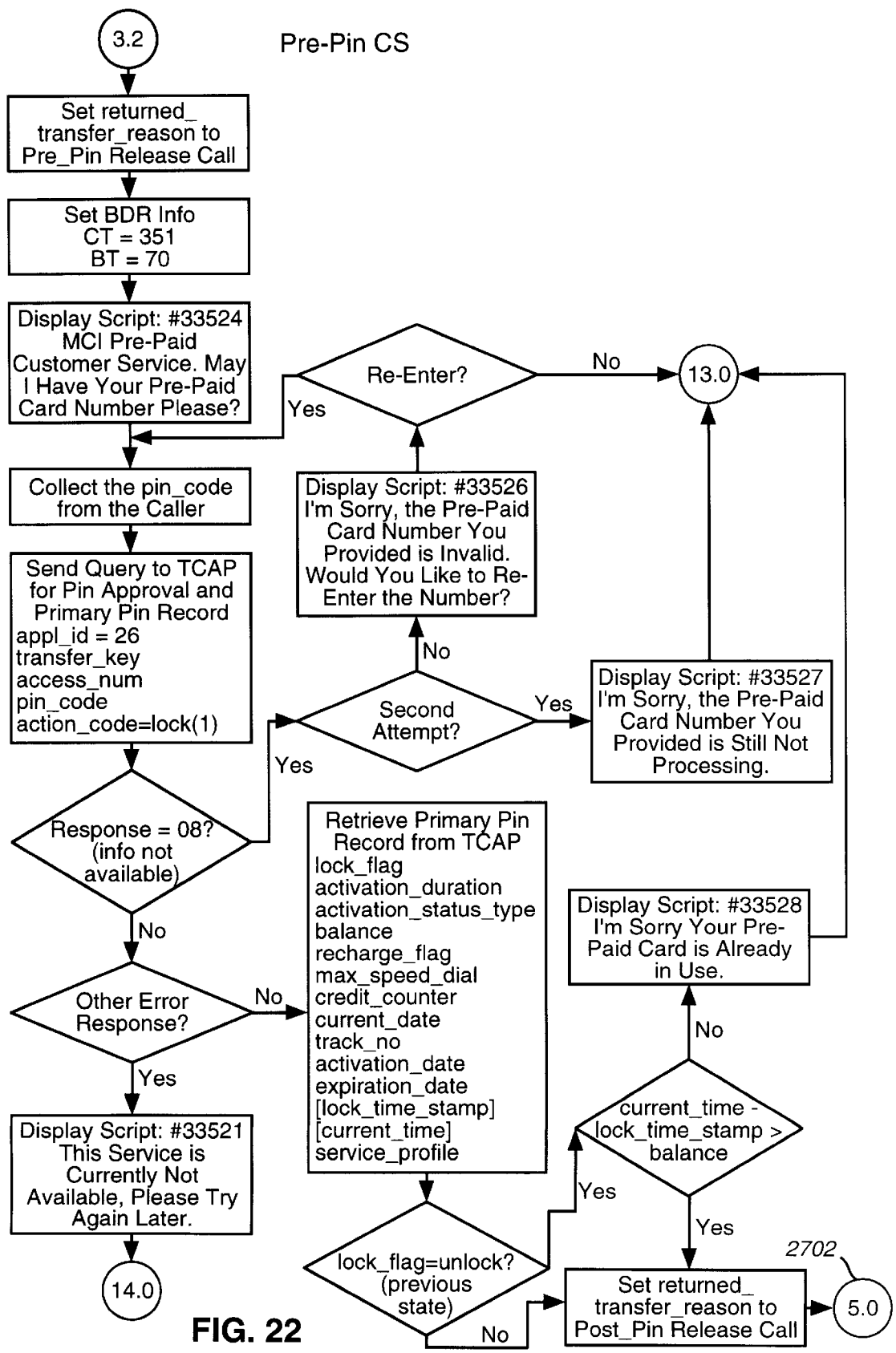
Figure 23:
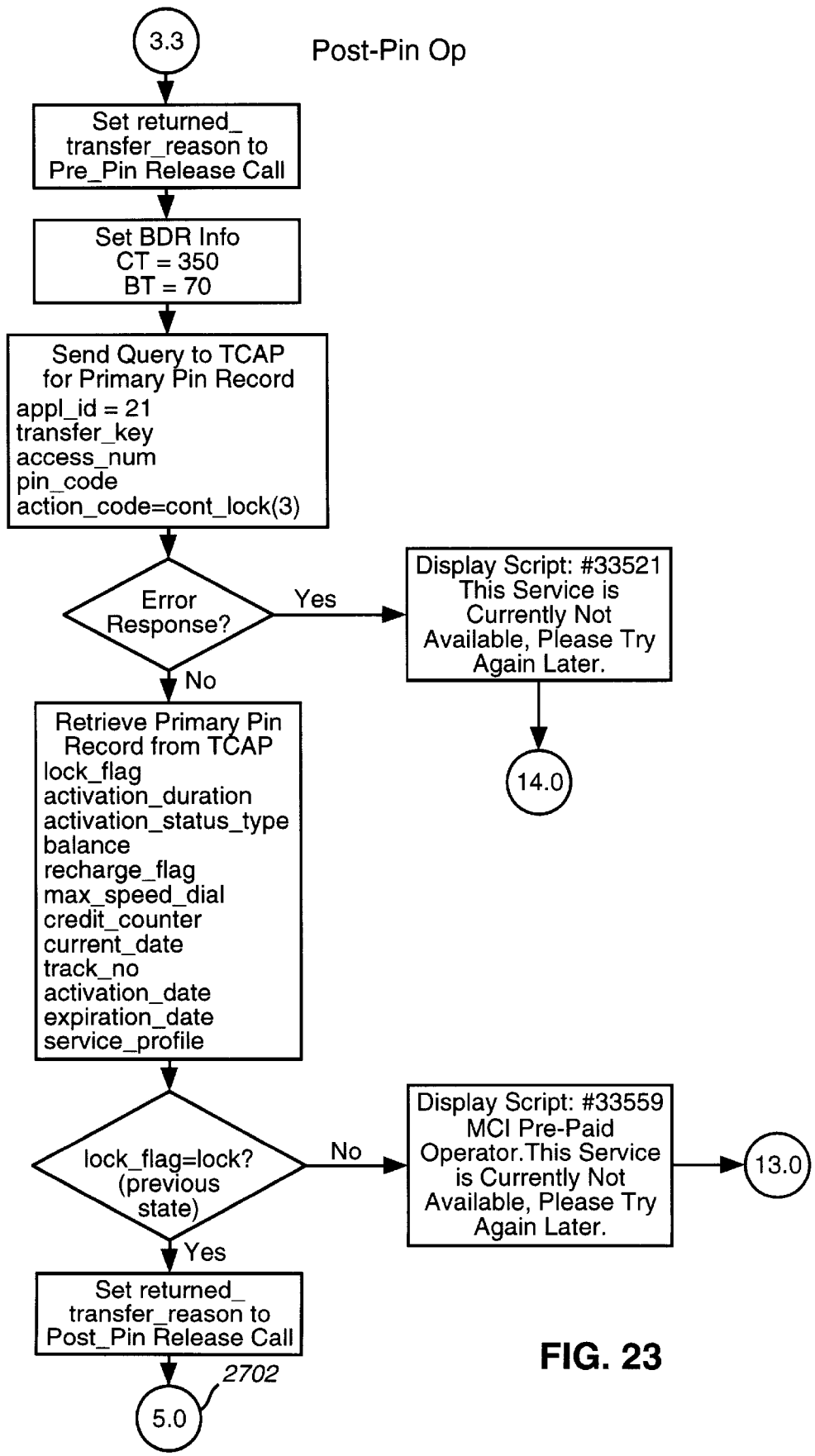
Figure 24:
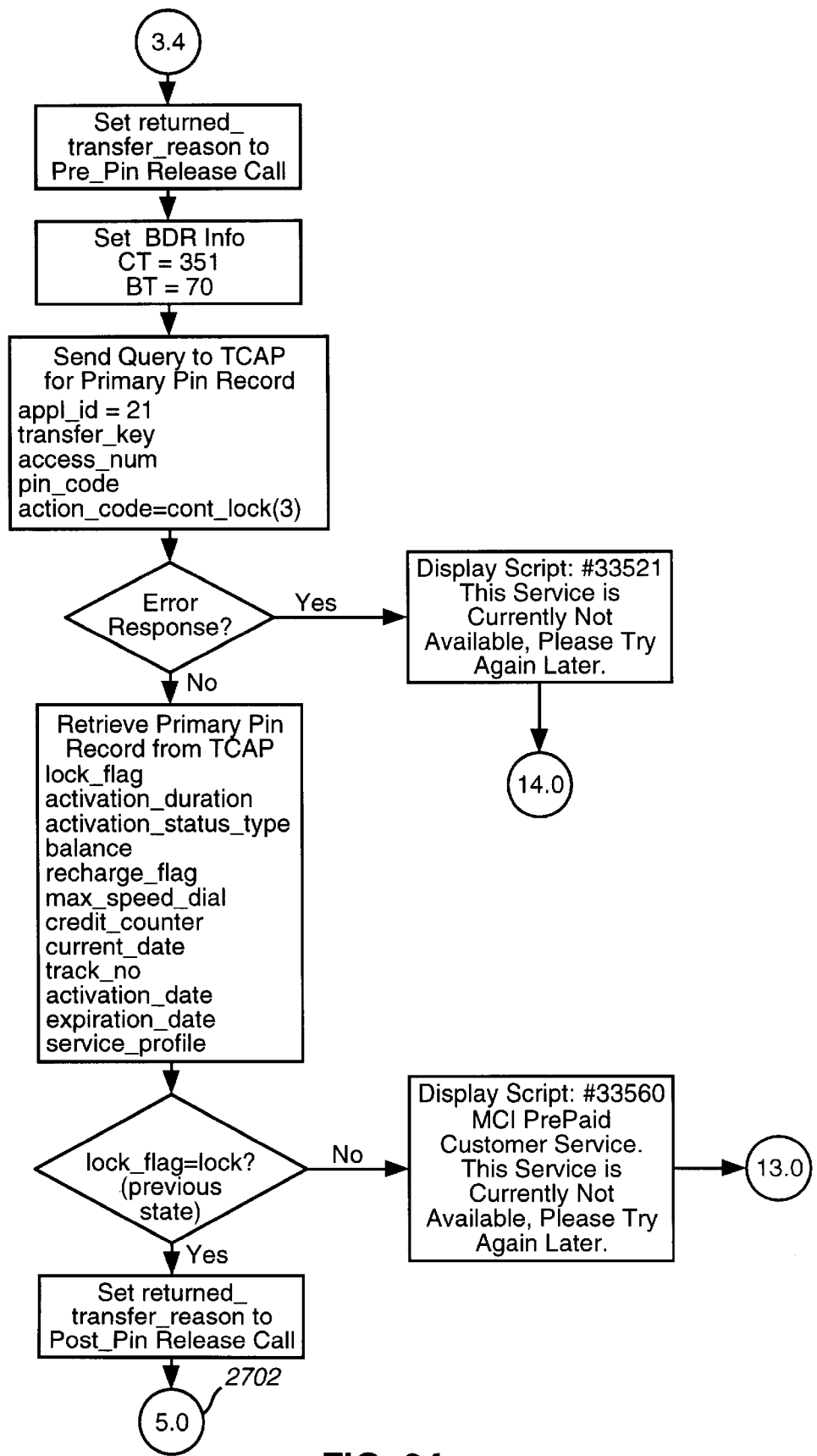
Figure 25:
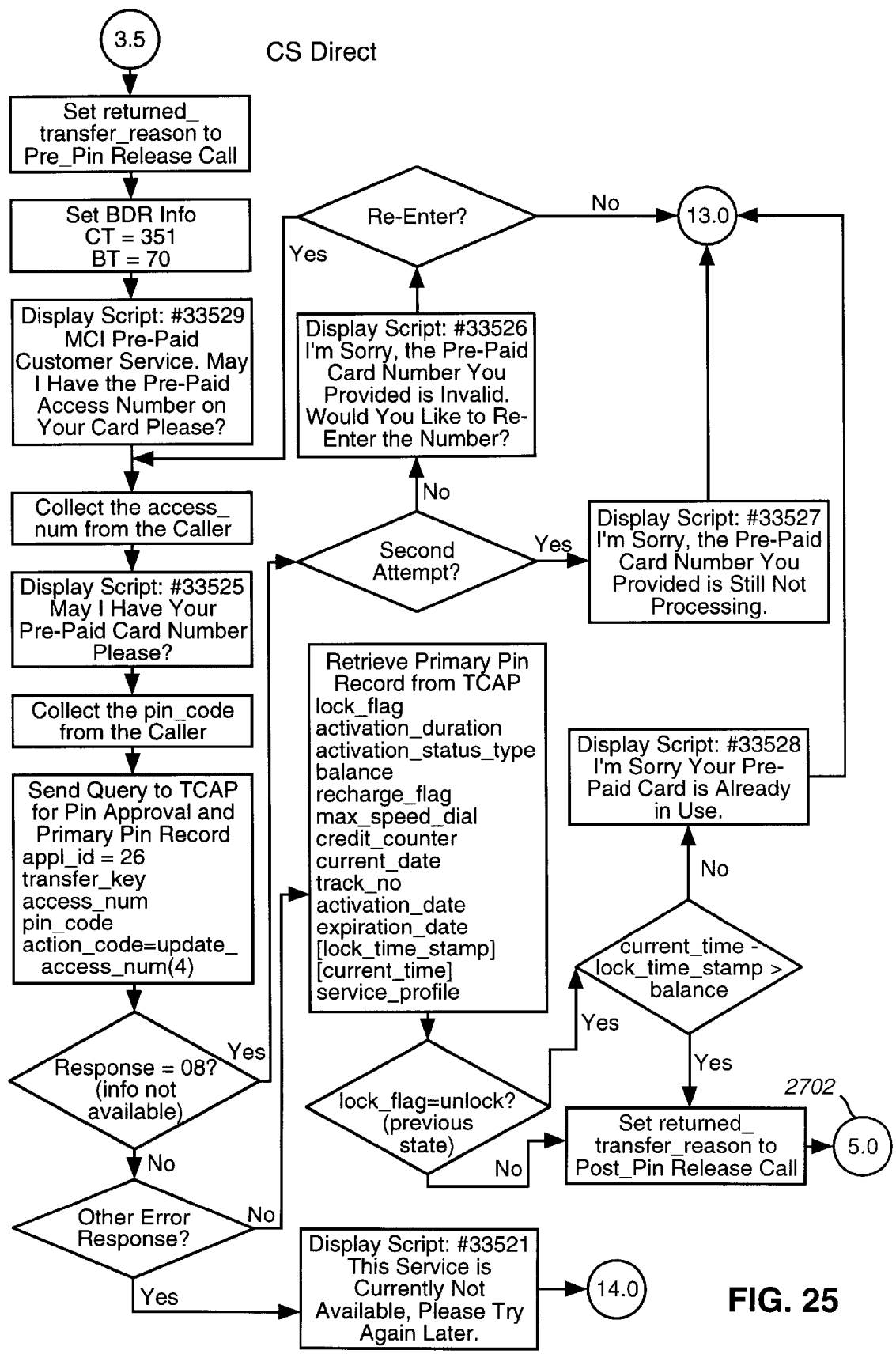

FIG. 20 is a flowchart depicting the use of transfer reasons (obtained from the transfer record 213), to direct operator console 126 processing. This flowchart is described in detail above, with reference to FIG. 14.

FIGS. 21–25 are flowcharts depicting examples of processing as a result of specific transfer reasons as shown in FIG. 20.

Figure 26:
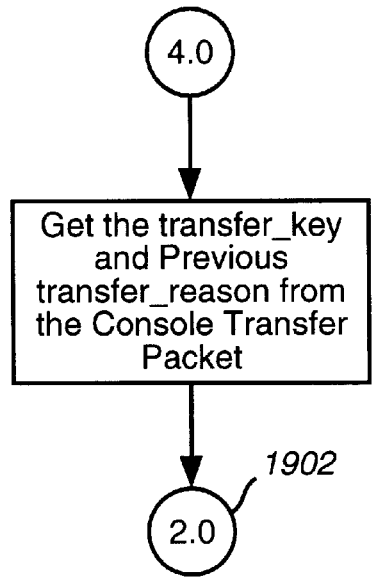

FIG. 26 is a flowchart depicting a step in which the operator console 126 gets a transfer key 211, for calls that have been transferred from a console transfer packet. A console transfer packet is typically obtained from the SS7 IAM of the transferred call.

Figure 28:
Figure 27:
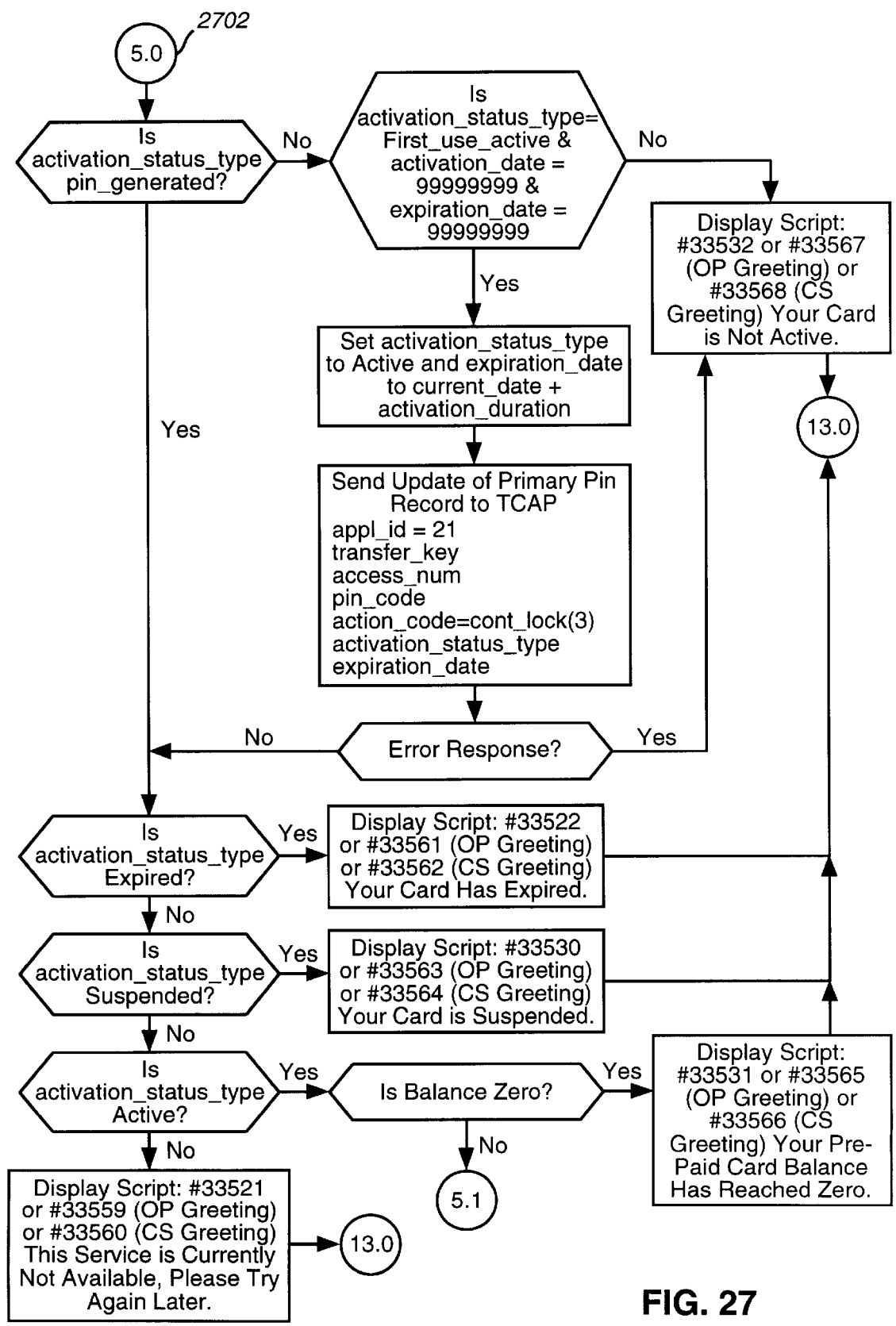

FIGS. 27–28 is a flowchart depicting a process for validating a debit card after receiving account information from the SDP 132.

Figure 29:
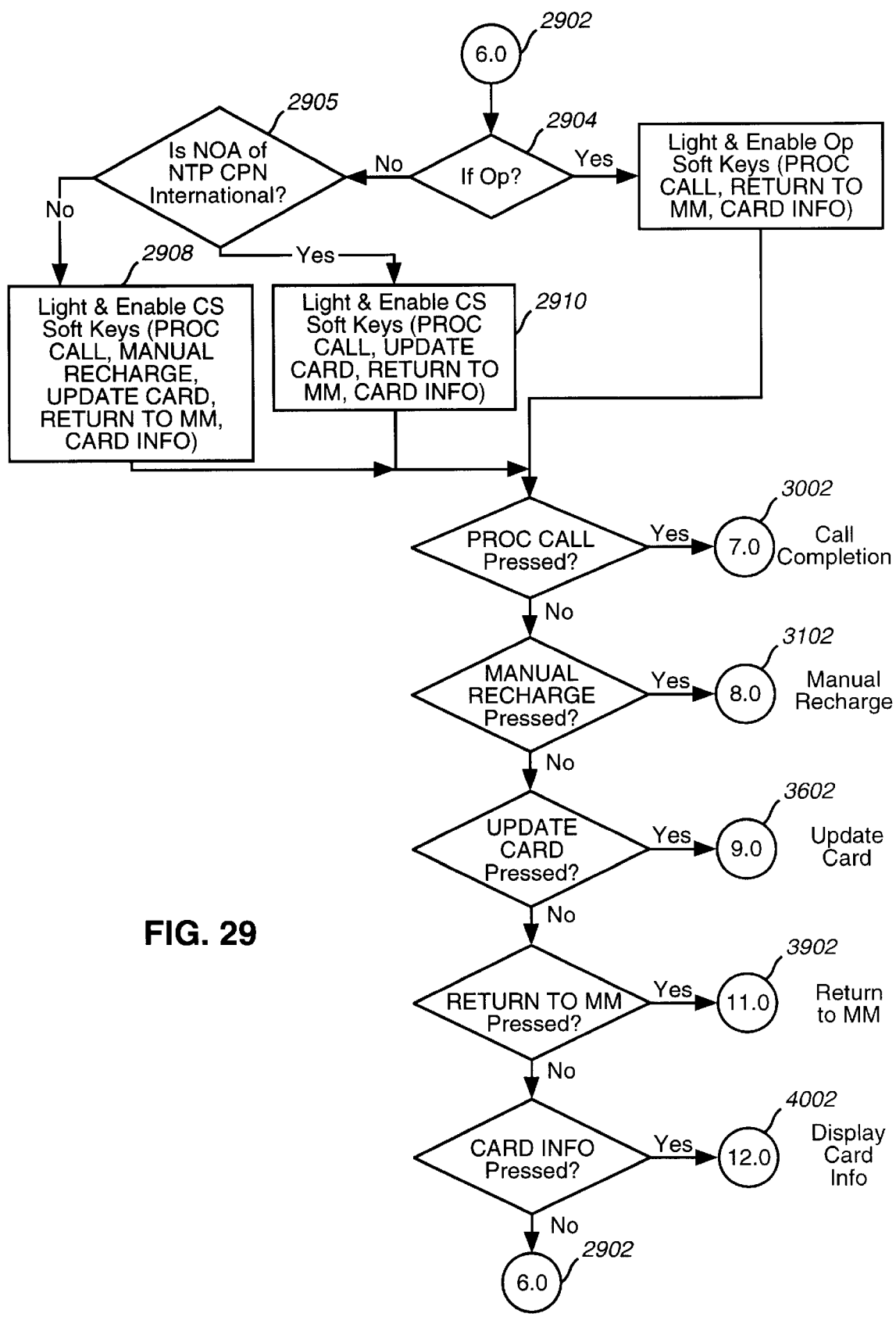

FIG. 29 is a flowchart depicting examples of options provided to the operator at the operator console 126 after a debit card has been validated. In this example, the operator console 126 determines if the application is to provide operator or customer services. The application program running in the operator console 126 then provides soft keys that allows the operator or customer service representative to press a single key on the operator console 126 keyboard to provide service options. Such service options are shown as processes 3002, 3102, 3602, 3902 and 4002.

For example, as can be seen by the decision step 2904, if a call is being handled by an operator, the service options "call completion" 3002, "return to main menu" 3902 and "display card info" 4002 are allowed, as indicated by step 2906. If, on the other hand, the call is being handled by a customer service representative, the representative determines whether the call is originating from outside of the country. If not, the service options "call completion" 3002, "manual recharge" 3102, "update card" 3602, "return to main menu" 3902, and "display card info" 4002 are allowed, as indicated by step 2908. If step 2905 indicates that the call is originating from outside the country, the service options "call completion" 3002, "update card" 3602, "return to main menu" 3902, and "display card info" 4002 are allowed, as indicated by step 2910. In this example, an international caller is not allowed to recharge their debit card.

Figure 30:
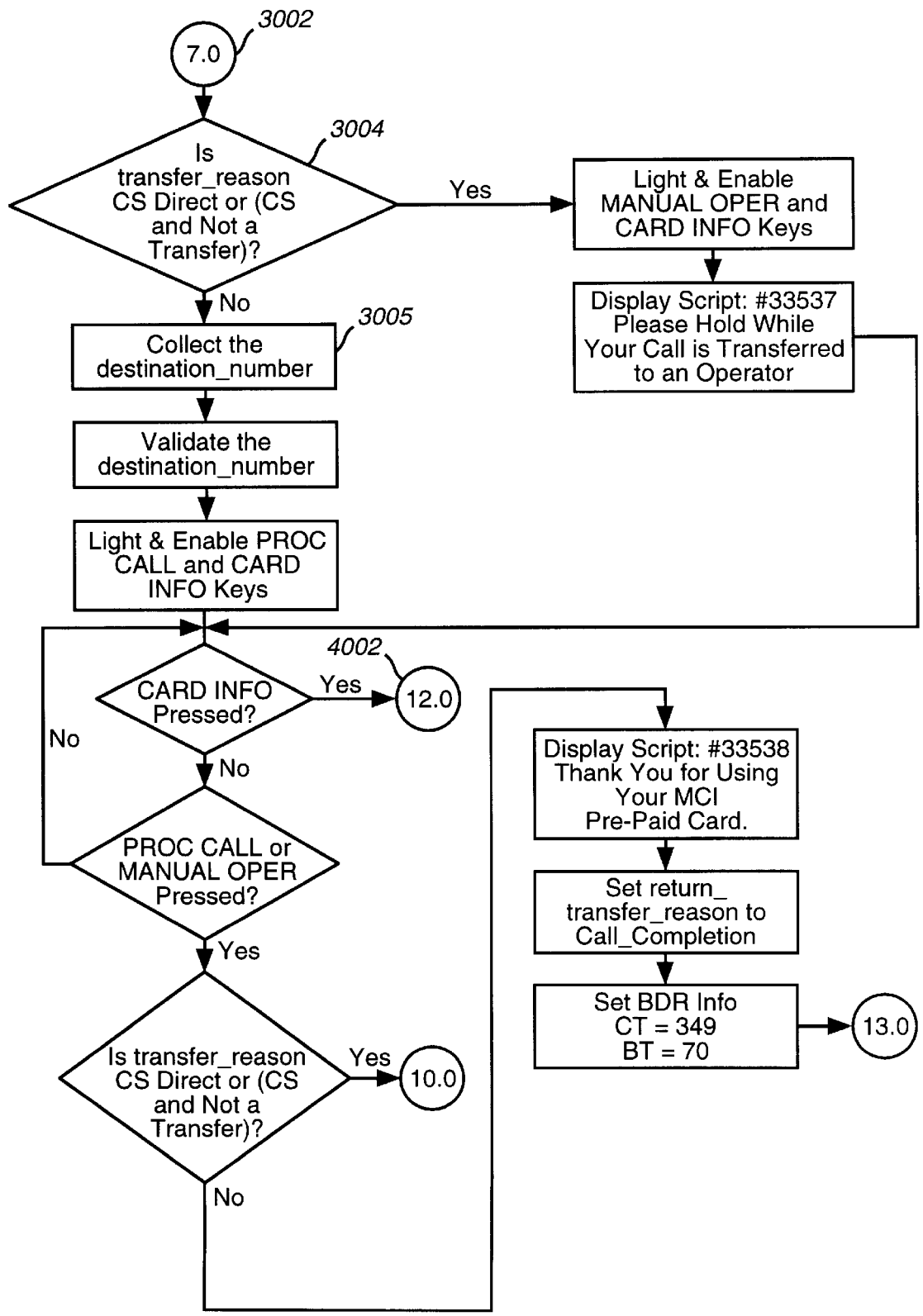
Figure 31:
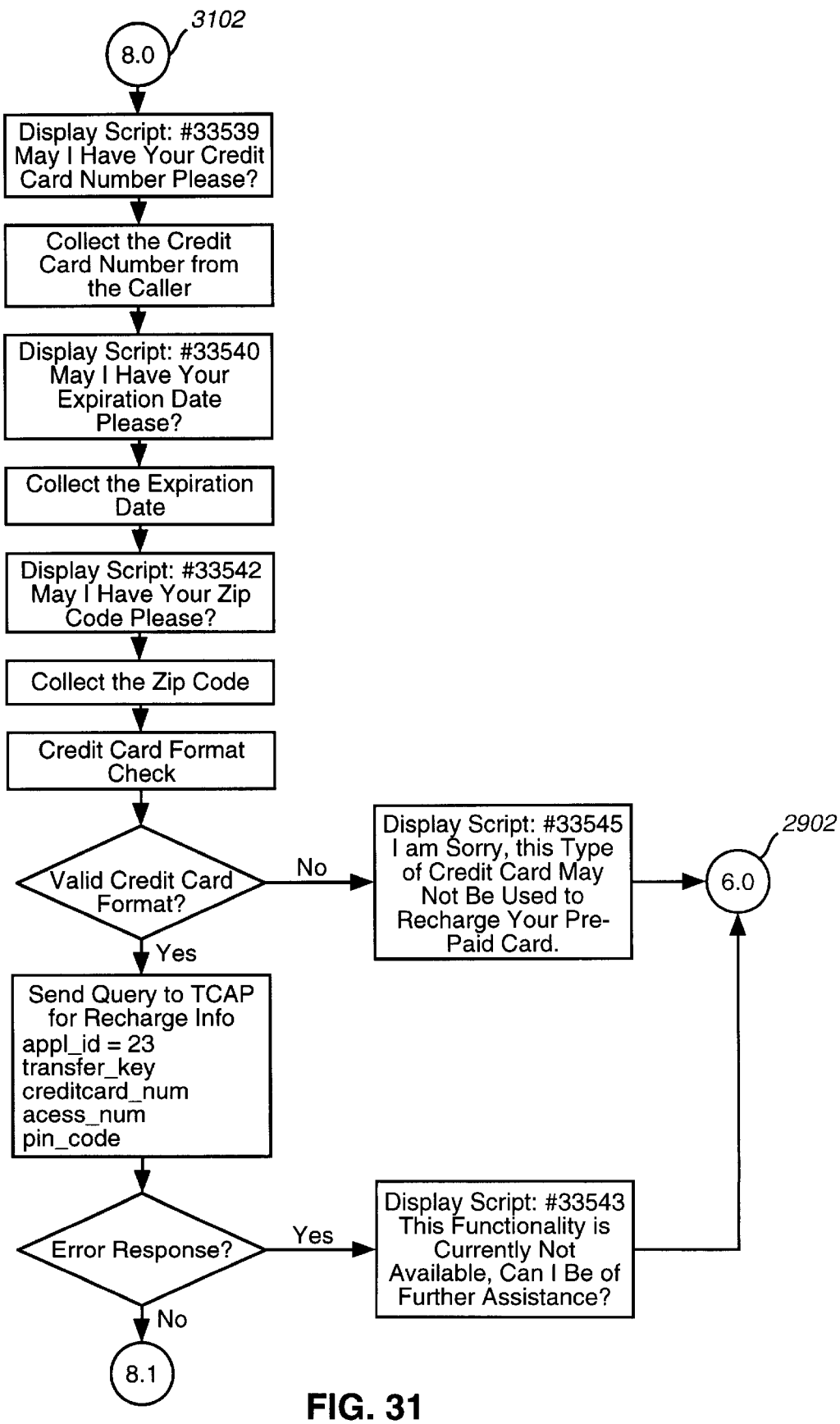
Figure 32:
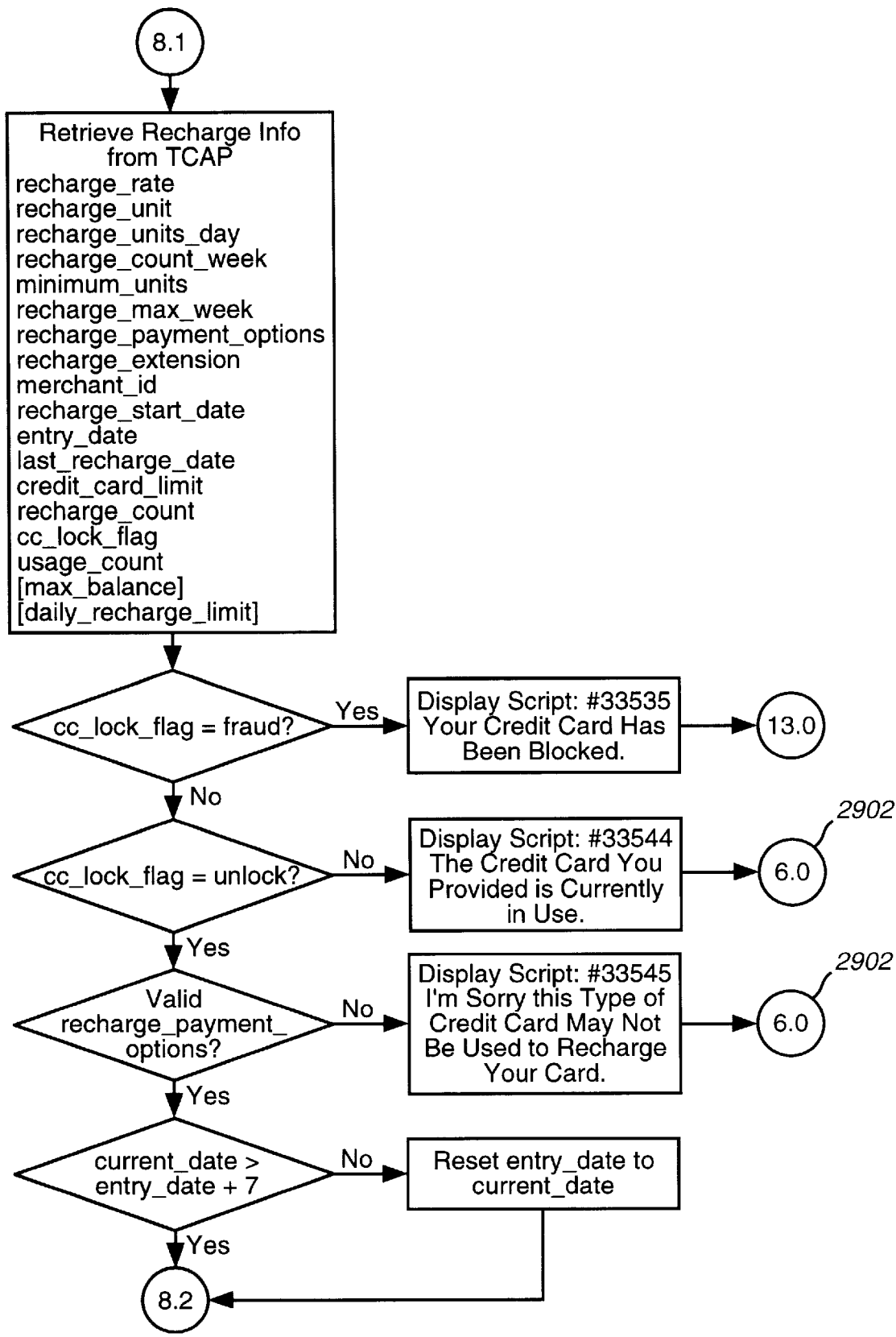
Figure 33:
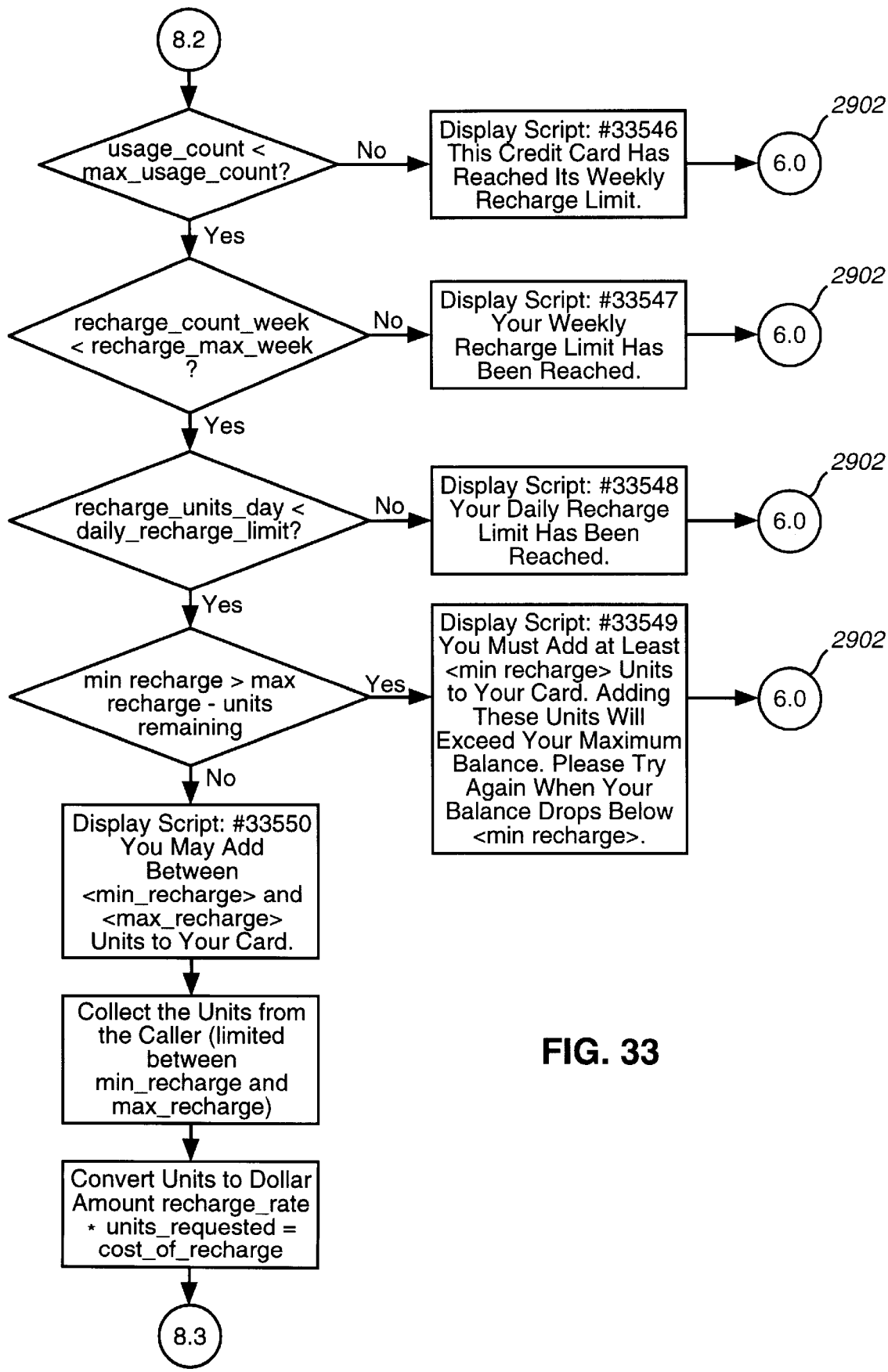
Figure 34:
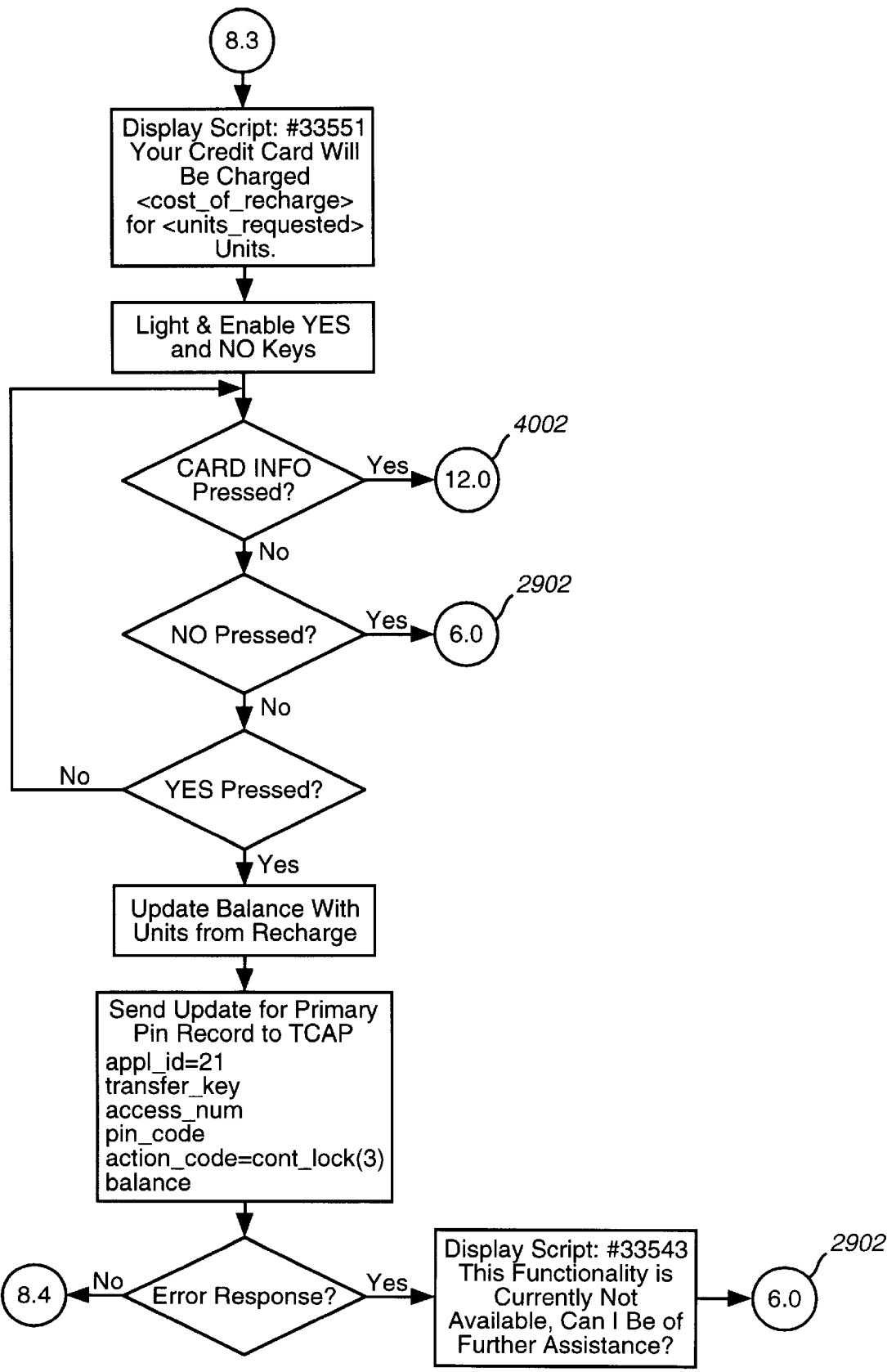
Figure 35:
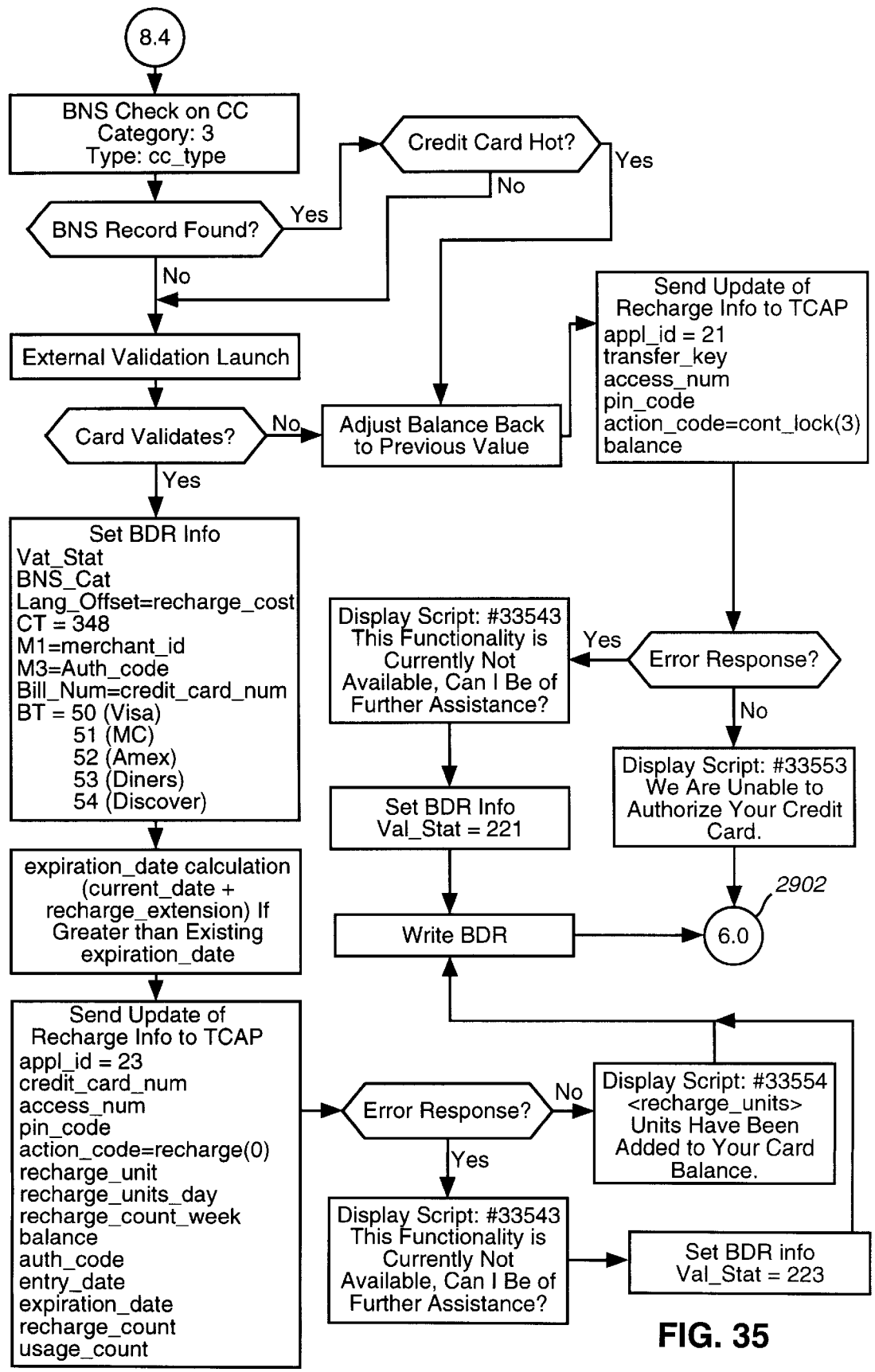

FIG. 30 is a flowchart depicting a process that can be used by the operator console 126 in setting up a call completion. For call completions, the operator console 126 first determines if the caller has been processed by an operator. In this example, this step is performed in order to meet a specific requirement to distinguish operator services from customer services. As indicated by step 3004, this is accomplished by reading the transfer reason from the transfer record 213 to determine if the call has been made directly to customer services. In this example, if the call has been made directly to customer service it is transferred to an operator service console, as indicted by step 3006. On the other hand, if the call was transferred to an operator by the SSCP 140, or the call was transferred to a customer service representative from an operator service console 126, the operator or customer service representative is prompted to collect a destination number (step 3005), so that a call can be completed.

FIGS. 31–35 are flowcharts depicting a process for the operator console 126 to perform a manual recharge of a debit card. In this example, the term "send query to TCAP" in step 3104, refers to the validation gateway 120 service. That is, a TCAP message is sent by the operator console 126 to the validation gateway 120 to be routed to a credit card validation system 114.

Figure 36:
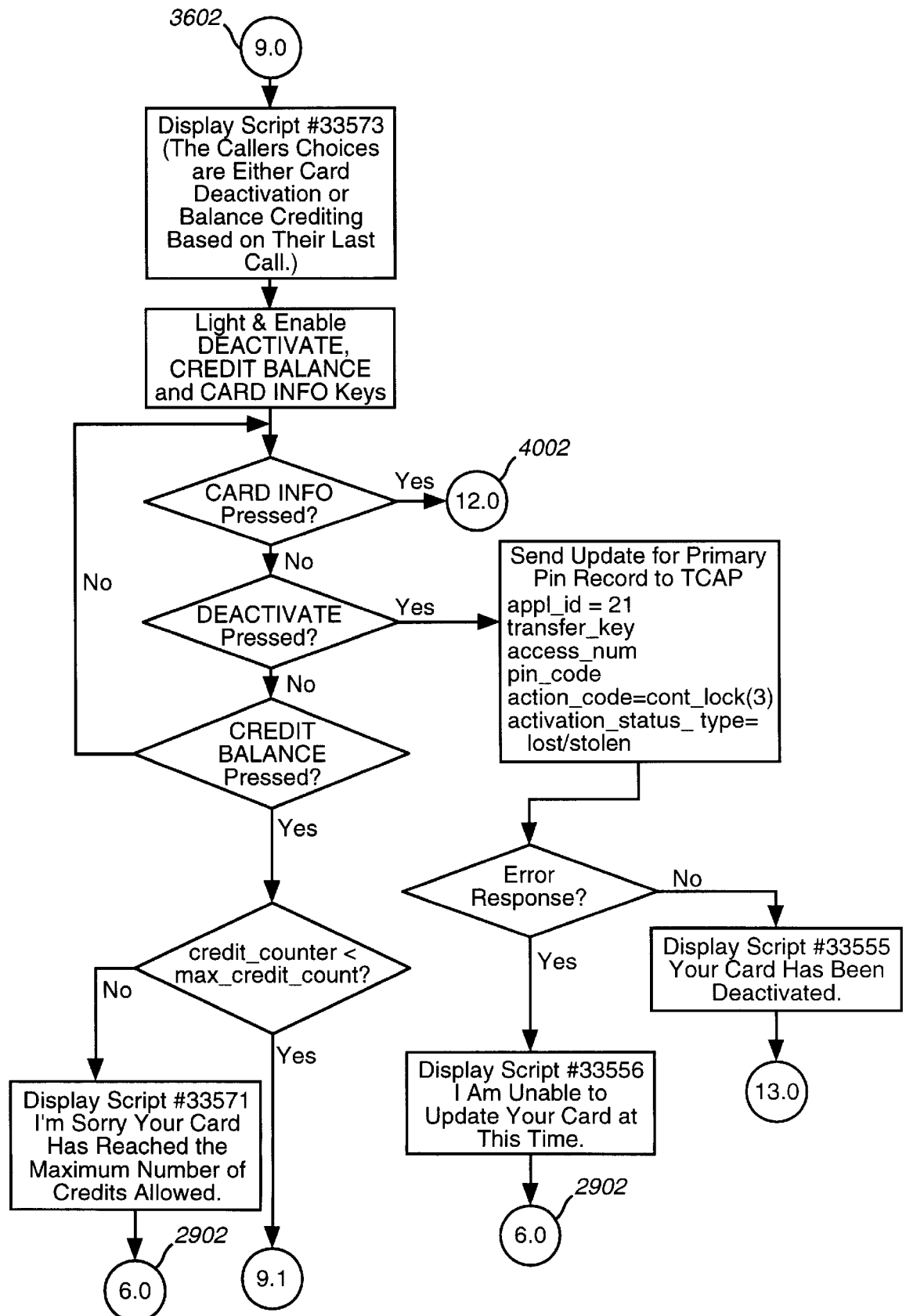
Figure 37:
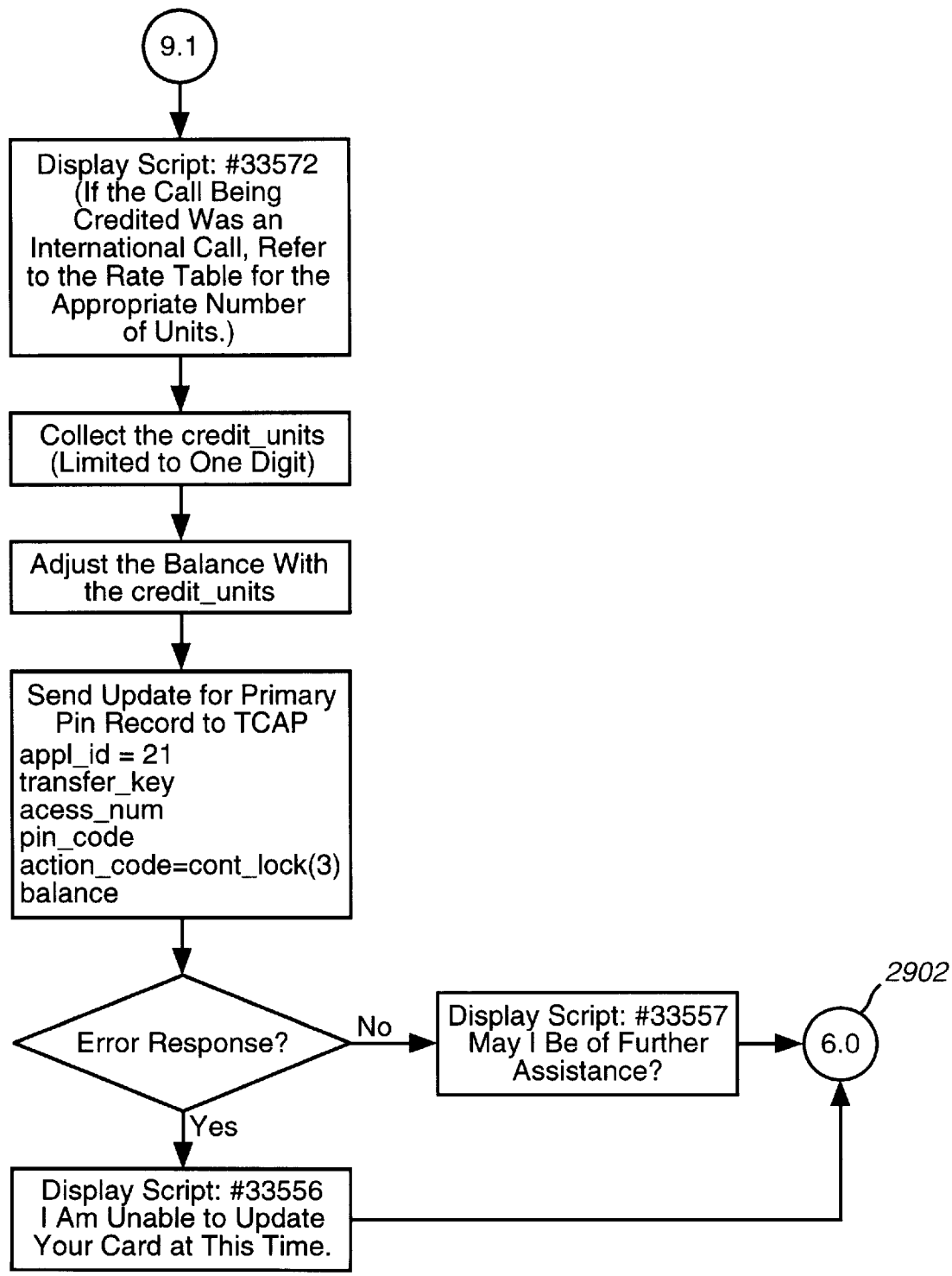

FIGS. 36–37 are flowcharts depicting a process for the operator console 126 to update a debit card account. For example, the operator console 126 can deactivate a card or retrieve current balance information. Debit card account updates are performed via message exchanges with the SDP 132.

Figure 38:
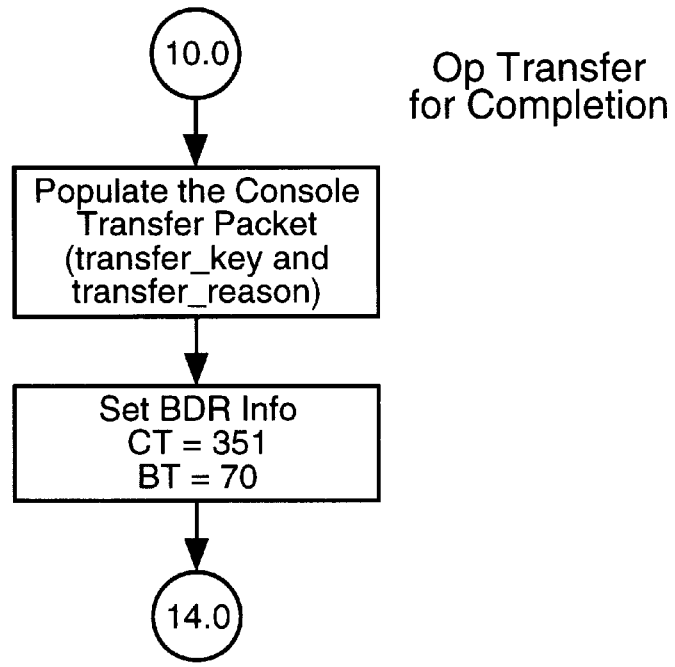

FIG. 38 is a flowchart depicting a process for the operator console 126 to set up a call to be transferred to the main menu of debit card services at the SSCP 140.

Figure 39:
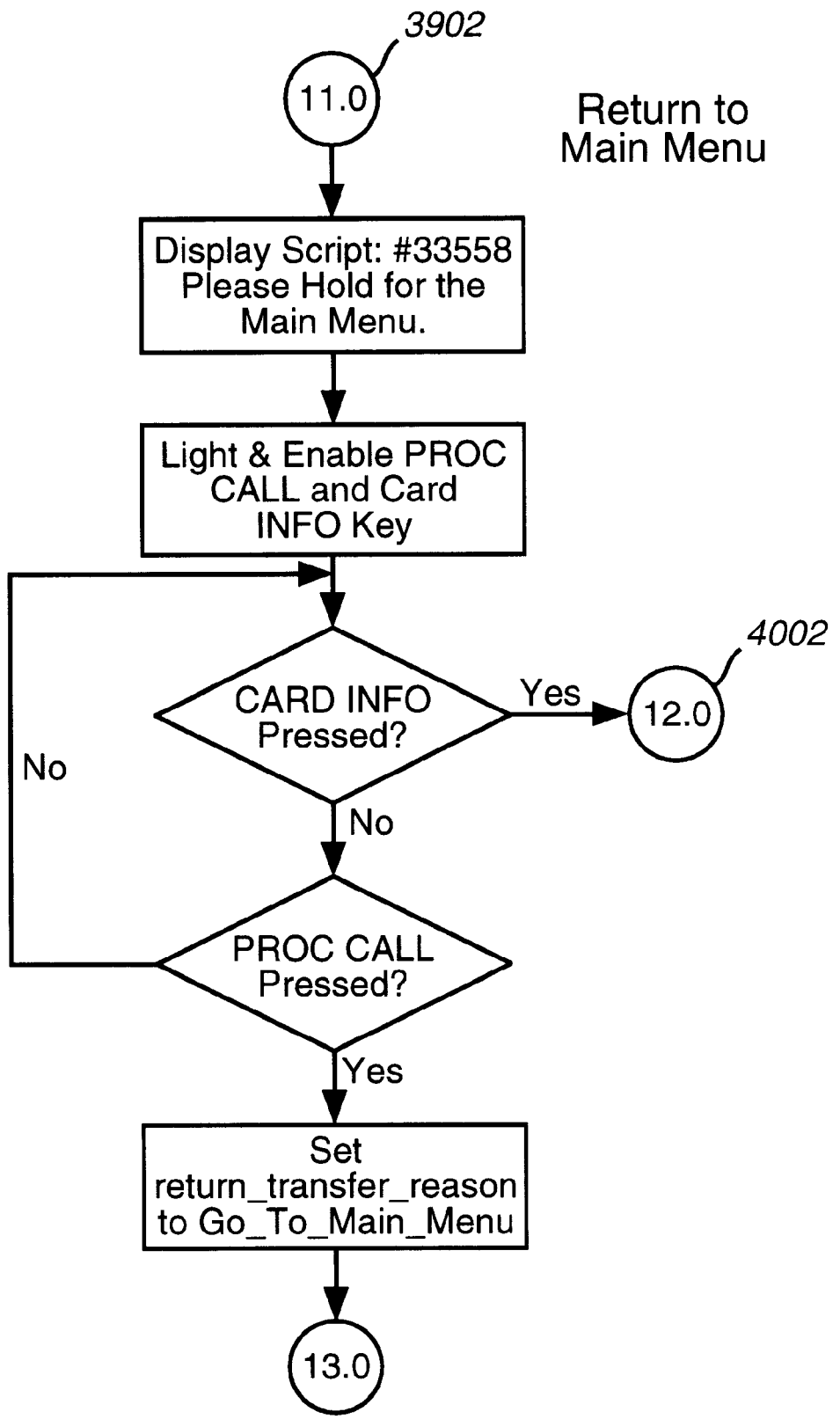

FIG. 39 is a flowchart depicting a process for the operator console 126 to return to the main menu.

Figure 40:
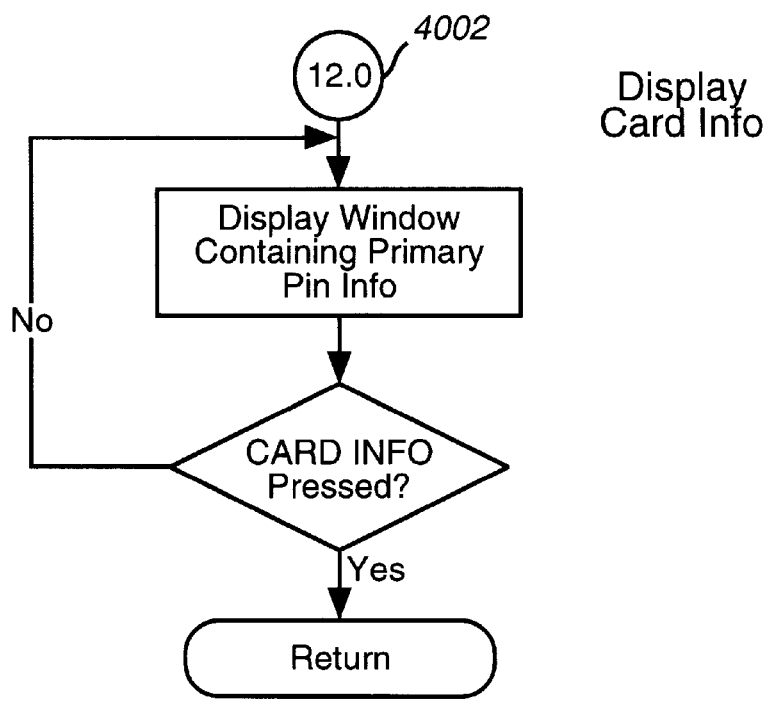

FIG. 40 is a flowchart depicting a process for the operator console 126 to display information related to the debit card.

Figure 41:
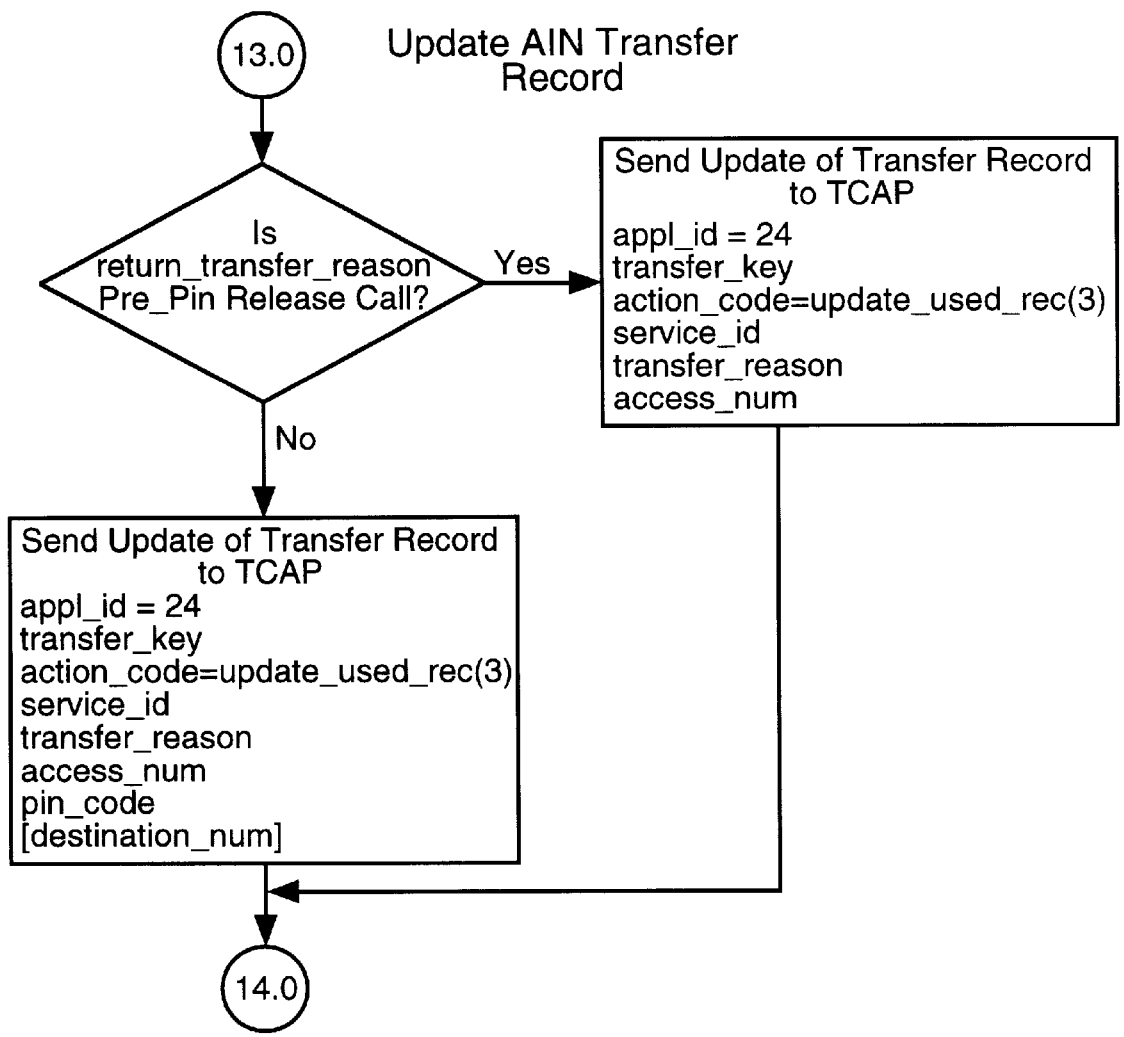

FIG. 41 is a flowchart depicting a process for the operator console 126 to update the transfer record 211.

Figure 42:
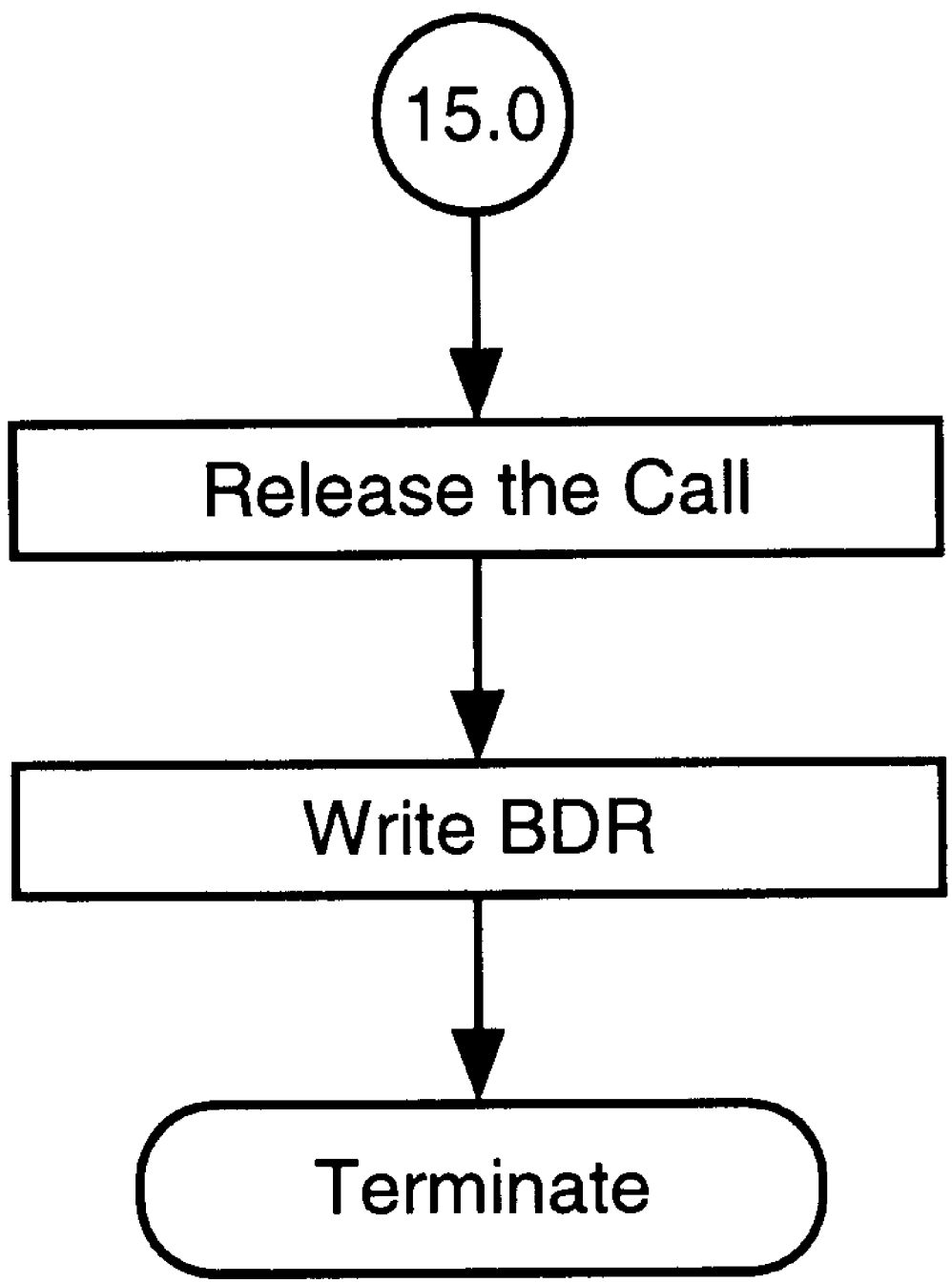

FIG. 42 is a flowchart depicting a process for the operator console 126 to terminate a call.

Figure 15:
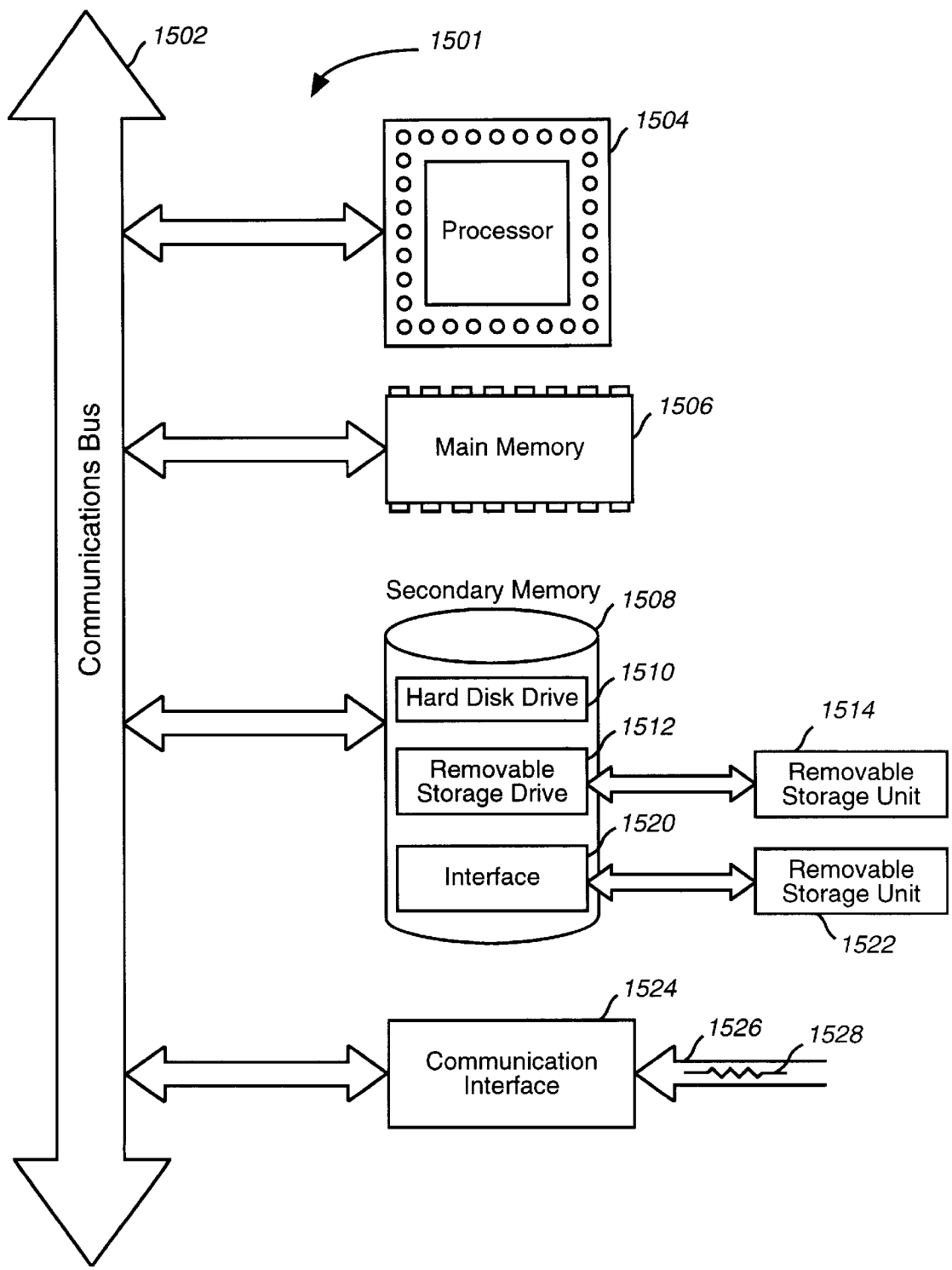
FIG. 15 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1501 is shown in FIG. 15. The computer system 1501 includes one or more processors, such as processor 1504. The processor 1504 is connected to a communication bus 1502. Various software embodiments are described in terms of this example computer system. After reading this description, it will become apparent to a person skilled in the relevant art how to implement the invention using other computer systems and/or computer architectures.

Computer system 1502 also includes a main memory 1506, preferably random access memory (RAM), and can also include a secondary memory 1508. The secondary memory 1508 can include, for example, a hard disk drive 1510 and/or a removable storage drive 1512, representing a floppy disk drive, a magnetic tape drive, an optical disk drive, etc. The removable storage drive 1512 reads from and/or writes to a removable storage unit 1514 in a well known manner. Removable storage unit 1514, represents a floppy disk, magnetic tape, optical disk, etc. which is read by and written to by removable storage drive 1512. As will be appreciated, the removable storage unit 1514 includes a computer usable storage medium having stored therein computer software and/or data.

In alternative embodiments, secondary memory 1508 may include other similar means for allowing computer programs or other instructions to be loaded into computer system 1501. Such means can include, for example, a removable storage unit 1522 and an interface 1520. Examples of such can include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1501.

Computer system 1501 can also include a communications interface 1524. Communications interface 1524 allows software and data to be transferred between computer system 1501 and external devices. Examples of communications interface 1524 can include a modem, a network interface (such as an Ethernet card), a communications port, a PCMCIA slot and card, etc. Software and data transferred via communications interface 1524 are in the form of signals which can be electronic, electromagnetic, optical or other signals capable of being received by communications interface 1524. These signals 1526 are provided to communications interface via a channel 1528. This channel 1528 carries signals 1526 and can be implemented using wire or cable, fiber optics, a phone line, a cellular phone link, an RF link and other communications channels.

In this document, the terms "computer program medium" and "computer usable medium" are used to generally refer to media such as removable storage device 1512, a hard disk installed in hard disk drive 1510, and signals 1526. These computer program products are means for providing software to computer system 1501.

Computer programs (also called computer control logic) are stored in main memory and/or secondary memory 1508. Computer programs can also be received via communications interface 1524. Such computer programs, when executed, enable the computer system 1501 to perform the features of the present invention as discussed herein. In particular, the computer programs, when executed, enable the processor 1504 to perform the features of the present invention. Accordingly, such computer programs represent controllers of the computer system 1501.

In an embodiment where the invention is implemented using software, the software may be stored in a computer program product and loaded into computer system 1501 using removable storage drive 1512, hard drive 1510 or communications interface 1524. The control logic (software), when executed by the processor 1504, causes the processor 1504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for providing an operator console in an intelligent network with enhanced operator and customer services for calls transferred from an automated service provided by an intelligent overlay network, said method comprising the steps of:

receiving a transferred call from the intelligent overlay network;

receiving a transfer key from the intelligent overlay network;

using said transfer key to retrieve a transfer record from said intelligent overlay network;

using said transfer record to select a particular application program to be executed by the operator console; and executing said particular application program.

2. The method of claim 1, wherein said transfer key is provided to the operator console via an initial message sent pursuant to transferring said transferred call.

3. The method of claim 2, wherein said initial message is a Signaling System 7 Initial Address Message.

4. The method of claim 1, wherein said step of using said transfer key comprises the steps of:

submitting a query to a database within the intelligent overlay network, wherein said transfer key is used to identify said transfer record within said database; and retrieving said transfer record from said database.

5. The method of claim 1, wherein said step of using said transfer record comprises the steps of:

extracting a transfer reason from said transfer record; and selecting said particular application program according to a predetermined criterion based on said transfer reason.

6. The method of claim 5, wherein said predetermined criterion includes a personal identification number (PIN) code.

7. The method of claim 1, further comprising the step of:

communicating with a validation gateway to validate a customer's credit.

8. The method of claim 1, further comprising the step of transferring said transferred call to another operator console.

9. The method of claim 1, wherein said automated service is a debit card service.

10. The method of claim 1, wherein said operator services include the functions of at least one of:

completing a telephone call according to a telephone number provided by a customer;

releasing said transferred call back to the intelligent overlay network; and transferring said transferred call to another said operator console.

11. The method of claim 1, wherein said operator services include the functions of at least one of:

completing a telephone call;

re-charging a debit card account;

updating a debit card account;

releasing said transferred call back to the intelligent overlay network; and general customer assistance.

12. The method of claim 1, wherein said particular application program includes at least one of:

a pre-PIN operator service program, wherein pre-PIN designates a time prior to entering a personal identification number (PIN);

a pre-PIN customer service program;

a post-PIN operator service program, wherein post-PIN designates a time after entering and validating a PIN; and a post-PIN customer service program.

13. A computer program product, comprising:

a computer useable medium having computer program logic stored therein, said computer program logic for enabling a computer to provide an operator console in an intelligent network with enhanced operator and customer services for calls transferred from an automated service provided by an intelligent overlay network:

wherein said computer program logic comprises:

means for enabling the computer to receive a transferred call from the intelligent overlay network;

means for enabling the computer to receive a transfer key from the intelligent overlay network;

means for enabling the computer to use said transfer key to retrieve a transfer record from said intelligent overlay network;

means for enabling the computer to use said transfer record to select a particular application program to be executed by the operator console; and means for enabling the computer to execute said particular application program.

14. The computer program product of claim 13, wherein said transfer key is provided to the operator console via an initial message sent pursuant to transferring said transferred call.

15. The computer program product of claim 14, wherein said initial message is a Signaling System 7 Initial Address Message.

16. The computer program product of claim 13, wherein said means for enabling the computer to use said transfer key further comprises:

means for enabling the computer to submit a query to a database within the intelligent overlay network, wherein said transfer key is used to identify a particular said transfer record within said database; and means for enabling the computer to retrieve said particular said transfer record from said database.

17. The computer program product of claim 13, wherein said means for enabling the computer to use said transfer record further comprises:

means for enabling the computer to extract a transfer reason from said transfer record; and means for enabling the computer to select said particular application program according to a predetermined criterion based on said transfer reason.

18. The computer program product of claim 17, wherein said predetermined criterion includes a personal identification number (PIN) code.

19. The computer program product of claim 13, wherein said computer program logic further comprises:

means for enabling the computer to communicate with a validation gateway to validate a customer's credit.

20. The computer program product of claim 13, wherein said computer program logic further comprises:

means for enabling the computer to transfer said transferred call to another operator console.

21. The computer program product of claim 13, wherein said automated service is a debit card service.

22. The computer program product of claim 13, wherein said operator services include the functions of at least one of:

completing a telephone call according to a telephone number provided by a customer;

releasing said transferred call back to the intelligent overlay network; and transferring said transferred call to another said operator console.

23. The computer program product of claim 13, wherein said operator services include the functions of at least one of:

completing a telephone call;

re-charging a debit card account;

updating a debit card account;

releasing said transferred call back to the intelligent overlay network; and general customer assistance.

24. The computer program product of claim 13, wherein said operator services include the functions of at least one of:

a pre-PIN operator service program, wherein pre-PIN designates a time prior to entering a personal identification number (PIN);

a pre-PIN customer service program;

a post-PIN operator service program, wherein post-PIN designates a time after entering and validating a PIN; and a post-PIN customer service program.

\* \* \* \* \*